INVENTORS.
HANS B. MARX
EDWARD W. MOLL
BRUCE W. NUTTING
MEYER SCHILDER

BY Joseph P. Kates
ATTORNEY

INVENTORS.
HANS B. MARX
EDWARD W. MOLL
BRUCE W. NUTTING
MEYER SCHILDER
BY
Joseph P. Kates
ATTORNEY INVENTORS
HANS B MARX
EDWARD W. MOLL
BRUCE W. NUTTING
MEYER SCHILDER
BY
Joseph P. Kates
ATTORNEY

INVENTORS.
HANS B. MARX
EDWARD W. MOLL
BRUCE W. NUTTING
MEYER SCHILDER

BY Joseph P Kates
ATTORNEY

United States Patent Office 3,426,329
Patented Feb. 4, 1969

3,426,329

CENTRAL DATA PROCESSOR FOR COMPUTER SYSTEM HAVING A DIVIDED MEMORY

Hans B. Marx, Bromall, Edward W. Moll, King of Prussia, Bruce W. Nutting, West Chester, and Meyer Schilder, Plymouth Meeting, Pa., assignors to Burroughs Corporation, Detroit, Mich., a corporation of Michigan Filed Feb. 14, 1966, Ser. No. 527,123
U.S. Cl. 340—172.5 20 Claims
Int. Cl. G11b *13/00;* G06f *1/00, 7/00*

ABSTRACT OF THE DISCLOSURE

A data processor for use in a computer system including a plurality of memory units and incorporating arithmetic and program execution elements and a plurality of memory selection registers responsive to command bits fewer in number than that required to count the memory units, to enable access to a selected one of them.

The present invention relates to a computer which may be the central data processor incorporated in a computer system which may be modular and may be employed with a memory divided into modules or units, or other memory divisions. More particularly, the present invention relates to a synchronous computer comprising the arithmetic and program execution unit of an expansible modular computer system in which parallel arithmetic operations and parallel transfers are effected and wherein primary and secondary register means are incorporated to provide capability of addressing a plurality of memory units with command words in which a relatively few bits can select one memory unit of a larger number of memory units than is possible from the count afforded by the fewer number of bits. For example, using a single bit of a command word the inventive data processor may address up to eight memory units. The present invention further provides time-saving circuitry enabling by-pass of paths through certain registers thus providing time-saving and eliminating time delay which would otherwise occur due to utilization of the register logic in operations where such registers are not employed. The computer of this invention is relatively light, rugged and otherwise suitable for incorporation into a system intended to be transportable over various types of terrain, in or on water, in the atmosphere, or in outer space. The central data processor of the invention described herein incorporates improvements in many of the features and circuits described in copending application Ser. No. 527,374, for "Central Data Processor," filed simultaneously by the same inventors and assigned to the assignee of the present invention. However, the computers of this invention and of the simultaneously filed application are separately developed computers and perform functions several of which are similar and possess some circuits and features which are similar but the implementing circuits and structure also differ considerably in many aspects and the present invention provides several new and several improved features additional to those provided by the invention of the copending patent application.

Data processors wherein computing functions are separately performed are incorporated as portions of large scale computer systems. Examples of such large scale computers are the modular computers of the systems of Burroughs Corporation, known popularly as the D825 and B8500 Burroughs' computer systems, the computer portion of a system known as the S2000 Transac Computer and the so-called Master and Slave computer of a system known as the RW400, polymorphic computer. However, these systems are essentially larger scale and more permanently located systems and are not directed essentially to uses which require features of the present invention which, for example, make it adaptable for portable use on land including rugged terrain, in the air, on and under water, and in space. While these computers present refinements which are very desirable for many applications, they do not provide some features of the present invention which make it adaptable to communication selectability within and without the central data processor modules. They do not have certain features of the present invention which because of some of its intended uses require high concentration of circuitry and avoidance of redundant circuits and circuits essential to the purposes of this invention, and which avoid time delay in the performance of certain commands and the execution of certain phases and processes.

The data processor of the present invention overcomes the disadvantages of other computers and is adaptable to be made rugged and portable, it employs reduced circuitry for the functions accomplished, it provides for lesser numbers of bits required in the instruction words to perform the same functions and it avoids time delay or specific command execution.

The central data processor of the invention presents advantages in its incorporation of improvements in interconnection and in circuitry such that a substantial saving in intermodular wiring and communication circuits is effected. The invention advantageously employs selection registers to provide selection of one of a plurality of memory modules wherein only one bit of the instruction word is required by the programmer for that purpose. The present invention further provides special logic and time saving circuitry wherein inputs of certain registers are carried along further provided paths rather than from the output and through their internal logic where time delay would otherwise be deleterious, thereby gaining time advantage when necessary without sacrifice of the advantages of the operation facilities of these registers when they are required to be in the path of execution.

Accordingly, an object of the present invention is to provide a central data processor for a modular computer system which is reliably employable in space, on and under water, in the air and on the ground, in a movable vehicle despite variations of ambient conditions, which is suitable both for commercial and military use, which is light, portable and provides economy in circuits and in the avoidance of many of the circuits utilized, and which avoids time delay.

Another object of the present invention is to provide a data processor unit incorporating circuitry providing flexible indexing wherein indexing may be automatically accomplished without additional program steps except specifying indexing and incorporating improved features of relocating index registers in memory under program control.

Another object of the data processor or computer module of the present invention is to provide simplified and improved circuitry which enables execution of instructions wherein only a single bit of the instruction, rather than a plurality of at least three bits, can specify a particular one of a plurality, for example, up to eight memory modules, and similarly, a lesser number of bits than would normally be required by ability to count from the number of bits can specify one or a group within a greater plurality of memory units.

Another object of the invention is to provide circuitry wherein a plurality, for example, two registers, a primary and a secondary selection register, etc., may be set up under program control and may be used to define the two, for example, memory units which may be directly accessed by the command word and to enable specifying without increasing the amount of bits required in the command the one or ones of all the memory units which are selected for access.

Still another object of the present invention is to provide a flexible means of automatically addressing any one of a plurality, for example, up to eight memory units, wherein one of two memory units may be selected by a single bit of a word, and wherein structure is provided such that if one of the six additional memory modules is desired to be selected, this may be accomplished by indexing or indirect addressing, and which flexible means may be means utilizing a comparatively lesser number of bits in a word than would define the total number of memory units available to be accessed to identify which one or ones of all the memory units is selected for access.

Another object of the present invention is to provide a central data processor in which is incorporated a special logic unit, for example, a program counter and/or address field register logic and attendant mechanisms whereby the time normally consumed and/or the extra logic circuits normally provided for the contents of these logic units, is saved by providing means connecting the logic unit inputs, of the program counter and the address field register, for example, directly into a memory address multiplex unit, rather than causing delay by processing the outputs of these logic units with consequent loss of time and/or additional apparatus required.

Another object of the invention is to provide a central data processor which incorporates logic and circuits such that a programmer can provide a large number and variation of commands with a relatively small amount of circuitry.

While the novel and distinctive features of the invention are particularly pointed out in the appended claims, a more expository treatment of the invention, in principle and in detail, together with additional objects and advantages thereof, is afforded by the following description and accompanying drawings in which:

Figure 1:
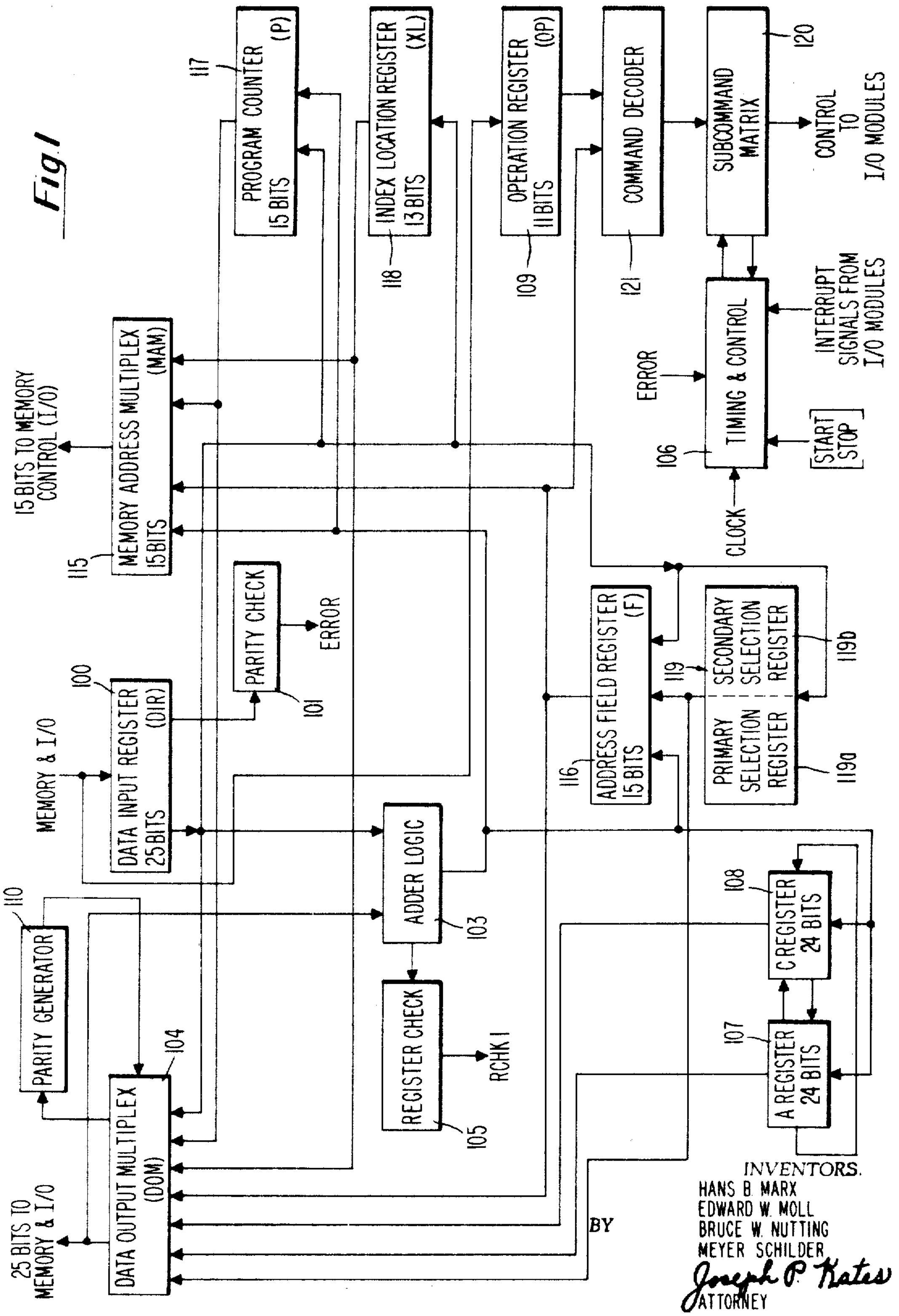
FIGURE 1 is a block diagram of a first preferred illustrative embodiment of the central data processor of the present invention.
Figure 4A:
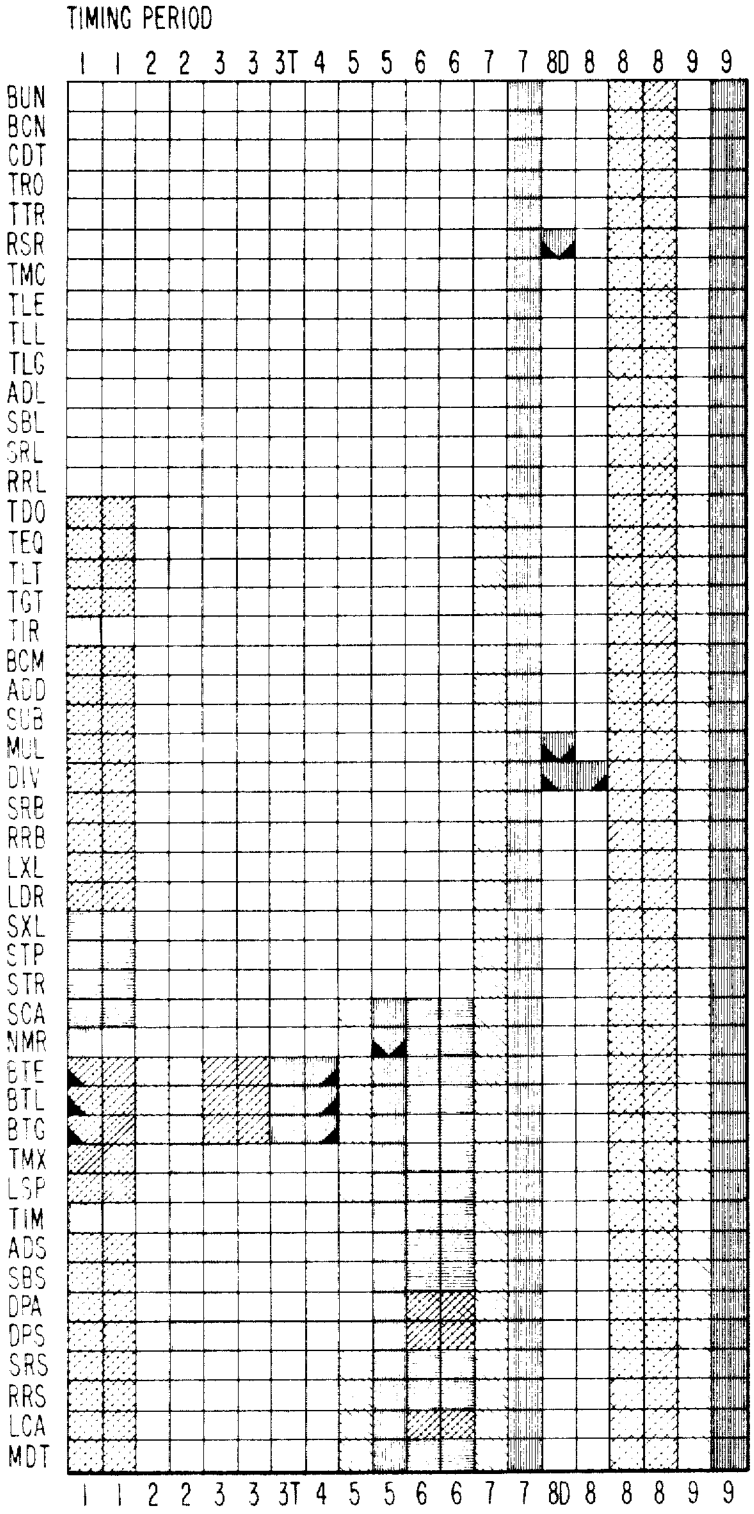
Figure 4B:
Figure 4C:
Figure 4D:
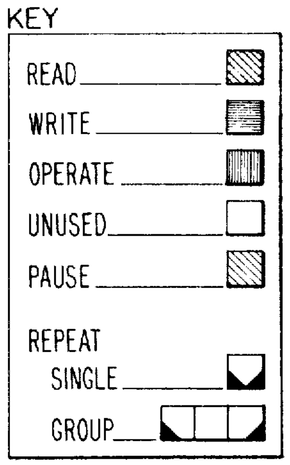
Figure 5:
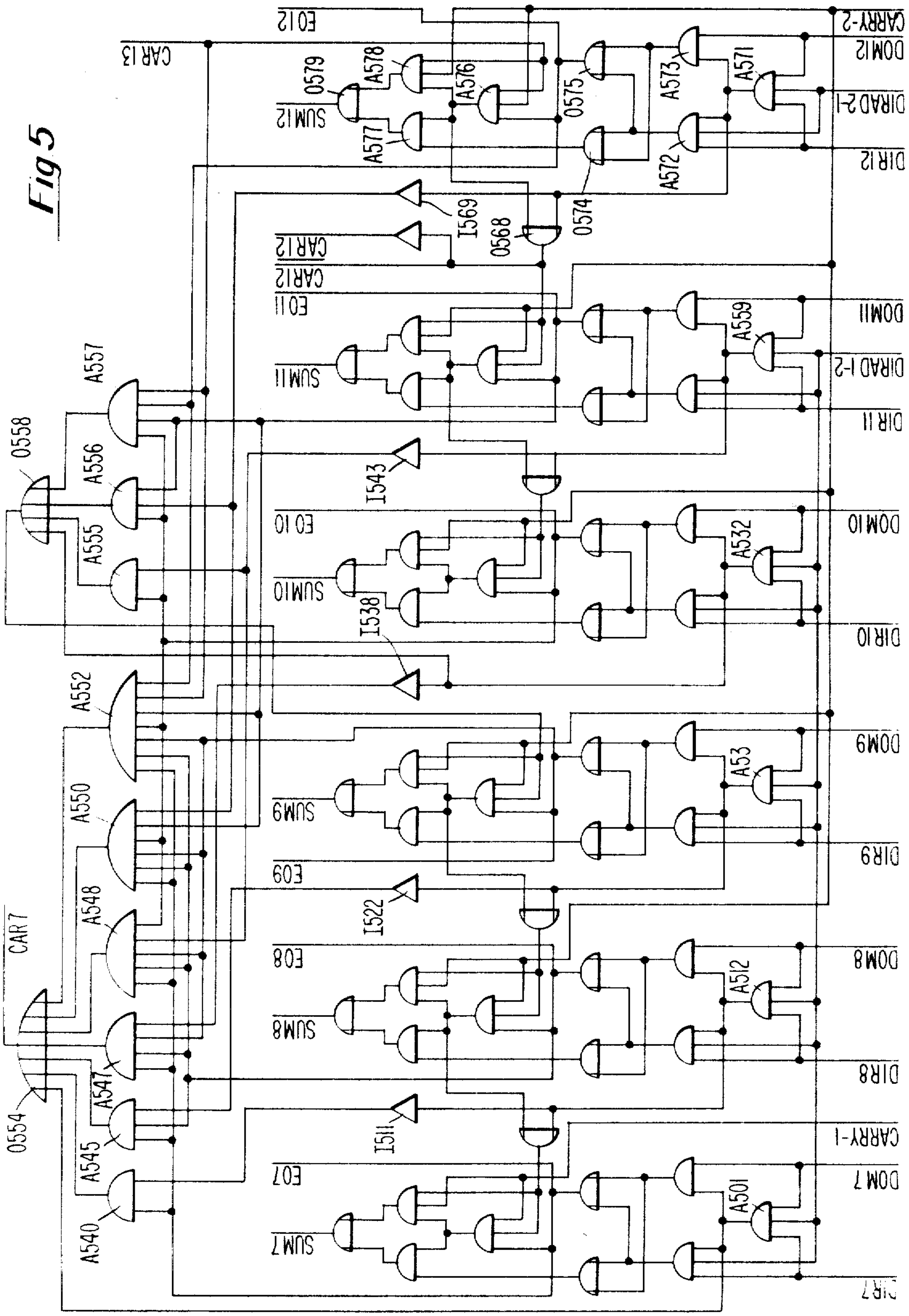
Figures 6, 7, 8, 9:
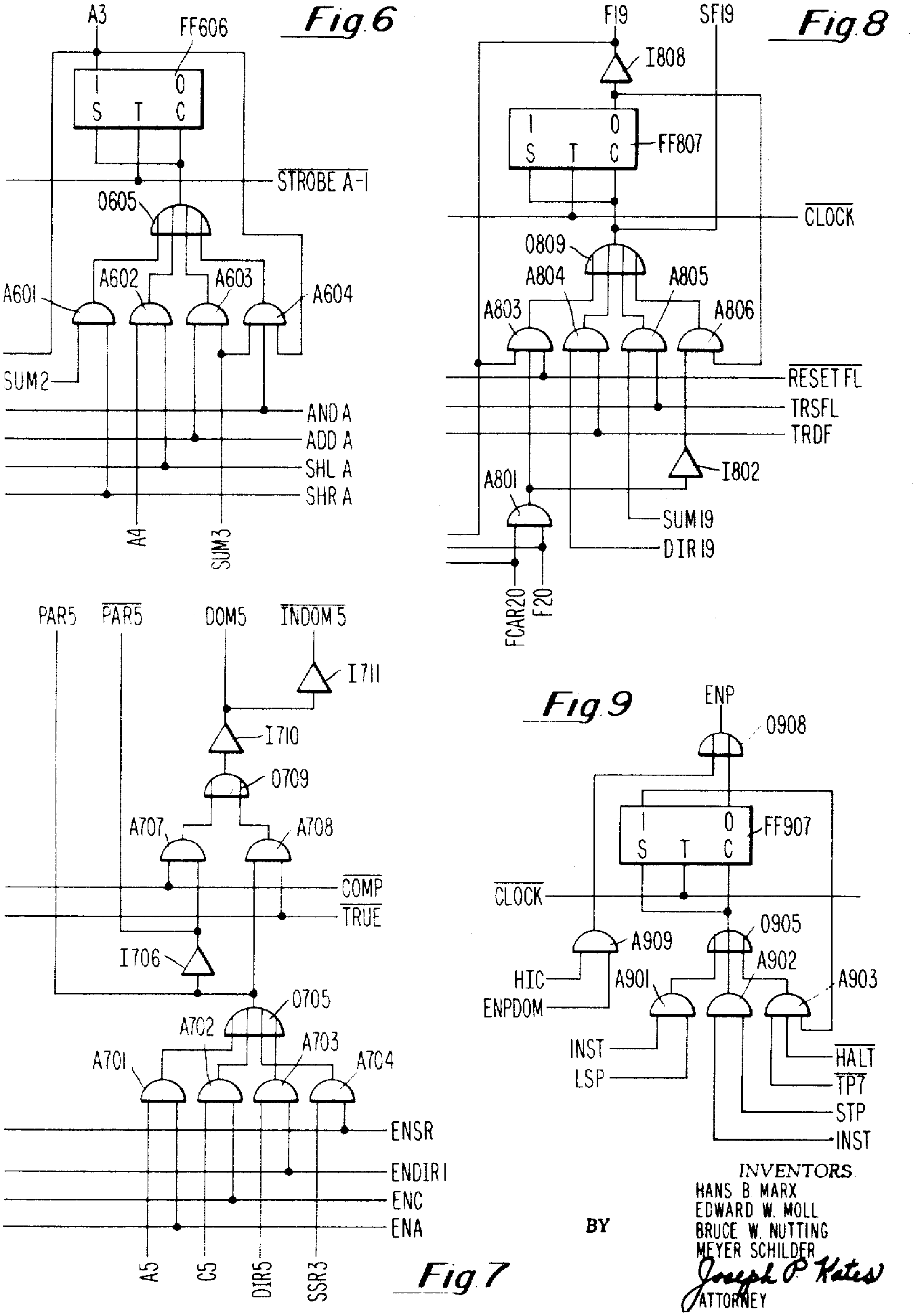

FIG. 4A is a master chart comprising a grid with subdivision corresponding to the timing intervals employed in instruction execution and plotting the timing intervals employed for execution versus particular commands in the illustrative embodiment of FIG. 1 and showing adaptation to a memory having a four-microsecond cycle time by way of example of employment of one possible type of memory with the illustrative embodiment of FIG. 1;

FIG. 4B is a diagrammatic representation illustrating an indexing modification cycle for the system of FIG. 1 and in accordance with FIG. 4A;

FIG. 4C is a diagrammatic representation illustrating an indirect addressing cycle for the system of FIG. 1 and in accordance with FIG. 4A;

FIG. 4D is a representation of the key describing the command-timing interval subdivision component boxes of the chart of FIG. 4A;

FIG. 5 is a logic diagram of the circuits of bits 7 through 12, for example, of the adder of the illustrative embodiment of FIG. 1;

FIG. 6 is a logic diagram of the bit 3 circuit, for example, of the A register of the illustrative embodiment of FIG. 1;

FIG. 7 is a logic diagram of the bit 5 circuit, for example, of the circuits of the data output multiplex unit of the illustrative embodiment of FIG. 1;

FIG. 8 is a logic diagram of the bit 19 circuit, for example, of the address field register of the illustrative embodiment of FIG. 1; and FIG. 9 is a logic diagram illustrating a portion of the circuit for look-ahead subcommand generation of the illustrative embodiment of FIG. 1.

The term "I/O" is used throughout the specification and drawings as an abbreviation of "input and output." Now refer to the drawings and in particular to FIG. 1.

As shown in FIG. 1, the block diagram of the illustrative embodiment of the central processor of the invention, there are provided a data input register (DIR) 100, a parity check device 101, an adder logic circuit 103, a data output multiplex (DOM) unit 104, a register check circuit 105, a timing and control unit 106, an A register 107, a C register 108, an operation register 109, a parity generator 110, a memory address multiplex unit 115, an address field register 116, a program counter 117, an index location register 118, primary and secondary selection registers 119, a subcommand matrix 120, and a command decoder 121.

The data input register (DIR) 100 may comprise 25 flip-flops and associated drivers. The data input register 100 holds (as 25-bit words) all data coming to the central data processor from all external sources including memory and I/O sources. The 25-bit words include 24 bits, which is the basic word length of the words in the machine plus a parity check bit. The parity check device 101 is responsive to the parity check bit in the data input register 100. The parity check device 101 checks the register 100 for odd parity and if parity does not check it provides an error signal to the timing and control logic 106 which will be described hereinafter. The adder logic circuit 103 is a 23-bit adder which is connected to and responsive to the 23-bit output from the data input register 100. Adder logic circuit 103 is also connected to and responsive to the output of data output multiplex unit 104. The 23 bits the adder logic circuit device 103 looks at are the least significant 23 bits from the data input register 100 and from the data output multiplex unit 104. By the 23 least significant bits is meant the 23 least significant bits of the actual 24-bit word (less parity); the 25-bit word includes the parity bit which really is in the least significant bit position. The most significant bit of a computer word in the illustrative embodiment machine is usually the sign bit. The adder 103 is a parallel adder incorporating both ripple carry (ripple down carry) and group carry in groups of 8, 7 and 8 (a total of 23). Within these 8-, 7- and 8-group carries, a subgroup carry of 4 bits is provided, as will be described hereinafter. The adder logic 103 comprises exclusive OR circuitry. The register check circuit 105 is connected to be responsive to the exclusive OR outputs of adder logic 103. The register check circuit 105 detects a condition where all 23 bits of the exclusive OR output of adder logic 103 are ones ("1") and sends a signal in that event to the timing and control unit 106. The register check circuit 105 checks the equality of any input to the data input register 100 with the contents of a register selected by the data output multiplex unit 104 for comparison. This check is used in many instructions, for example, wherein a condition is imposed, if equal.

The arithmetic unit of the central data processor comprises two registers: the A register 107 and the C register 108. The circuit of each of the A register 107 and C register 108 comprises 24 flip-flops and the associated gate circuitry. The input gates to each of the A register 107 and the C register 108 permit data input, shift right, shift left and an ANDing of the contents of the A or C register 107 or 108 and the data input. Although the A register 107 and the C registor 108 are utilized as two separate accumulators for the adder logic 103, they can be combined for double precision operation. Not only the multiply and divide operations which conventionally are executed using double precision may be so employed, but in addition, double precision add and subtract may be effected utilizing the A register 107 and the C register 108.

The data output multiplex unit (DOM) 104 comprises two sections: One section is a multiplex section which is capable of enabling one or more of the registers of the machine to provide outputs to it; that is, the DOM 104 enables the gates to receive the contents of any of the registers of the machine into it, except an operation register (OP) 109 which will be described. The other section of the data output multiplex unit 104 selects either the true state or the complement state of the data provided by the first described multiplex section. When it is decided to accept inputs from one of the other registers in the central processor, the second section of the data output multiplex unit 104 either communicates the true contents of the register straight through the data output multiplex unit 104 or communicates the inverse of the contents of the register which is fed into a succeeding unit. The second section of the data output multiplex unit 104 can also be used to inhibit all inputs even though the first section of the data output multiplex unit 104 has enabled a register to provide inputs to the data output multiplex unit 104. This provides a dual control feature. The data output multiplex unit 104 also comprises drivers which provide power to send the data to the external units from the central data processor such as to the memory and I/O control units of the system. As mentioned hereinabove, the data output multiplex unit 104 also supplies one of the inputs to the adder logic unit 103. The parity generator circuit 110 generates odd parity on all words coming from the data output multiplex unit 104 and provides the 25th or parity bit required for transfers into memory and into the I/O control modules. Thus, any time data is sent from the central data processor, the word has parity.

The address and control section is shown generally in the right-hand portion of FIG. 1. The memory address multiplex unit 115 comprises a 15-bit multiplex unit with associated driver circuits. It is used for sending all addresses from the central data processor through a register in the I/O control unit from whence they are sent to the memory modules. This transfer is further described in the co-pending application Ser. No. 527,350 filed Feb. 16, 1966, for "Modular Computer System," of Hans Marx, and assigned to the assignee of the present invention. This co-pending application is incorporated by reference in the present application and supplements the disclosure herein.

Each bit of the 15 bits inserted in the memory address multiplex unit 115 can come from any one of four registers within the computer. These registers are the data input register 100, the address field register 116 to be described, the program counter 117 to be described, or the index location register 118 to be described. Provision is made within the memory address multiplex unit 115 to inhibit any output from this unit. This line is generally not used in the central data processor except when the central data processor is one of several processors which will be utilized in the system, all of which have access to the memory such that the memory is shared. This line of the memory address multiplex unit 115 is also used if a buffered I/O channel is sharing access to memory with the central data processor. This occurs in some of the systems which employ the computer of this invention and which are described in the above-mentioned co-pending application of Hans Marx for "Modular Computer System."

The address field register 116 is a 15-bit flip-flop register which incorporates circuitry to give it a capability of being used as a counter. The address field register 116 contains either the address of a data word to be operated upon, or where there is no data word required it contains variation bits which modify a command word such that different options of the command may be executed. When employed as a counter the address field register 116 is used to count sequential addresses for block testing or it counts iterative steps for logic operations (in the divide operation or multiply operation, for example) and in both cases the address field register 116 counts up from zero until a preselected number is detected. Thus, in a divide operation it is known in 116 counts up from zero until a preselected number is detected. Thus, in a divide operation it is known in advance by the divisor how many steps there are, e.g., 23 steps. The address field register 116 is used in this application as an adjunct to the timing counter which is a portion of timing and control unit 106. The address field register 116 is fed from (1) the primary and secondary selection registers unit 119, (2) the output of the adder logic 103, and (3) the output of the data input register 100. Primary and secondary selection registers 119 comprise two 3-bit flip-flop registers. These registers are used to define the two active memory modules which may be selected directly by one bit of a command. Either or both registers of the primary and secondary selection registers 119 can be loaded or changed under program control from the information which is fed in from the data input register 100.

The program counter 117 contains 15 flip-flops and associated counter logic. The program counter 117 sequentially counts up the addresses contained in each of the sequential instruction words. Program counter 117 can be loaded either from the data input register 100 or from the adder logic 103. Either the input from the data input register 100 or the input from the adder logic 103 can be utilized for branching operations.

Circuit means to be described are provided in the computer of the invention whereby the input to the program counter (P) 117 optionally is fed directly into the memory address multiplex unit 115 to eliminate time loss when effecting branch operations.

The index location register (XL) 118, a 13-bit flip-flop register, is provided for indexing. The 13 bits of the index location register 118 provide the most significant 13 bits of a 15-bit address. The least significant two bits of the address which are added to make the 15-bit total address are selected from two bits taken from the data input register 100, when the data input register 100 contains an instruction word, an index word, or an indirect address word. Any one of these 15-bit words in the DIR 100 contains two bits which specify that indexing will be effected if either bit is a "1." Further, if either of these two bits is a "1," which specifies that indexing is to occur, they form the least significant two bits of the address word which two bits when added to the 13 bits of the index location register 118 form the address word. Thus, a 15-bit word is formed from the two bits specifying that indexing should be done, that is, one of the two bits being a "1," plus the more significant 13 bits provided by the contents of the index location register. This 15-bit word specifies the location in main memory where the index word is stored. Since one of the two (least significant) bits must be a "1" there are only three index registers active at one time. That is, there are only three possible index registers which can be selected from the 13-bit contents of the index location register 118 plus the two lesser significant bits taken from the word stored in the data input register 100.

When these two bits taken from the data input register 100 are both zeros, they can be used for special applications. For example, they may be used in combination with the 13 most significant bits which are the contents of the index location register 118 in iterative programs where a portion of the program is to be repeated a number of times. In this case these two zeroes (referred to hereinafter as the "00 location") plus the 13-bit word of the index location register 118 defines the location of the word in memory which counts the number of times of iteration that this portion of the program is repeating. This same location (00 location), that is, the two zeroes (00) which form the least significant two bits added on to the contents of the index location register 100, also may be used as an address in main memory in which is stored the address which records the results of a successful test of a block of words in memory; also, this word gives the number of shifts necessary in performing a normalizing instruction; this word also forms one of the two addresses denoting which register is used as one of the two registers for temporary storage when it is desired to shift the location of the word in memory from one location to another location. Additionally, the 00 location, and only this 00 location, specifies the address in memory which contains an upper or lower boundary limit which is utilized for testing whether each word of a string of words is within the boundary limits which have been predetermined. For example, the contents of this 00 location may be used for the upper bounds for operation wherein a word is to be tested against a number of sequential memory words to insure that the highest numbered address of the group of words to be used has not been passed. (To facilitate explanation it is noted at this point that the illustrative embodiment is a one-address machine.)

The last three above-enumerated uses (of the index location register 118 contents plus the additional two bits which are taken from the data input register 100) are so utilized only during the execution of certain instructions. These certain instructions comprise, for example, the TMX (test or modify index) instruction, the MDT (memory data transfer) instruction, the NMR (normalized register) instruction and the LSP (load and/or store program counter register) instruction. When one of these four instructions occurs the machine looks at the program counter 117 to determine the address in memory to be fetched. These four instructions, TMX, MDT, NMR and LSP, cannot be indexed because they will not respond to the presence of a "1" in the least significant two bits of the 15-bit word made up by the contents (13 bits) of the index location register 118 and the data input register 100 two bits, but rather, instead of indexing, these four instructions cause this address to be utilized in accordance with the purposes of the particular instruction. This feature enables a great amount of versatility to the programmer in utilization of the word which otherwise would be an index word. As stated hereinabove, in block case tests, the 00 indication (bits 6 and 7 are zeros) from the data input register 100 indicates that the XL register 118 contents plus these 00 bits point to the address in memory that contains the upper bounds. This feature of combining the 13 bits of the index location register 118 and the two bits in the data input register 100 (bits 6 and 7 of the instruction word) are used not only for the normal indexing operation, but additionally, in doing a block test this feature is used to indicate the address in memory in which is stored the address of the word which indicates that the block test has been successfully met. Also in the block test this 15-bit composite word (of the 13-bit contents of the index location register 118 with a forced 00 ending from the 6th and 7th bits of the instruction word) is used to indicate the upper limit value to signify the location of the end of the block. Thus, this composite word is used for (1) indexing, (2) to check for the limit and (3) to store the address of the word which indicates that the block test has been successfully met. These features permit sequential testing of the machine memory, block by block. Also, large groups can be taken, and a number of sequential blocks can be tested sequentially within this large group for less than, for greater than, or for compare equal to a specified number. This feature enables the one-address machine of the illustrative embodiment when required to exhibit the behavior and to provide the advantages of a two-address machine.

Figure 2A:
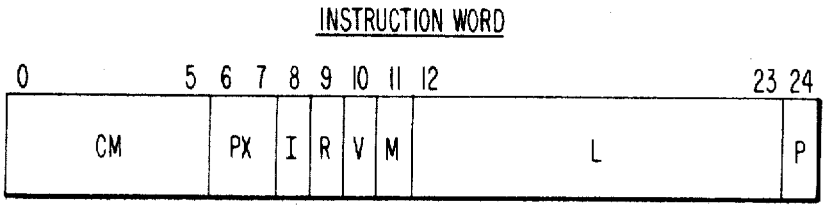
FIGURE 2A is a diagrammatic representation of the format for the illustrative embodiment of FIGURE 1.

Refer to FIGS. 2A, 2B, 2C and 2D of the drawings. FIG. 2A is the format showing the word organization for the instruction word. The bits 0–5 are the command field bits, CM; bits 6 and 7 are the primary index field bits, PX; bit 8 is the indirect address selection field bit, I; bit 9 is the arithmetic register selection field bit, R; bit 10 is the variant field bit, V; bit 11 is the module selector field bit, M; bits 12–23 specify the address field, L; and bit 24 is the parity bit, P.

Figure 2B:
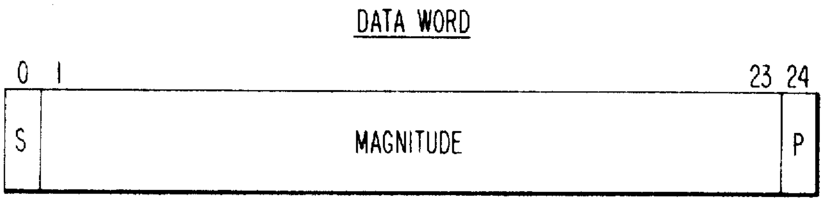
FIGURE 2B is a diagrammatic representation of the format for the word organization of a data word employable with the illustrative embodiment of FIGURE 1.

In the data word of FIG. 2B the 0 bit designates the sign and bits 1–23, inclusive, represent the magnitude. Bit 24 is the parity bit P. Bit 1 is the most significant bit of the magnitude.

Figure 2C:
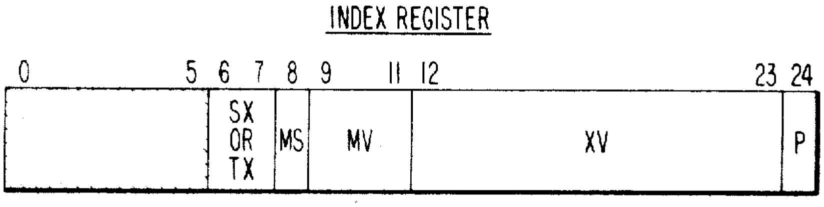
FIG. 2C is a diagrammatic representation of the format for the word organization of an index register word employable with the illustrative embodiment of FIG. 1.

The index register format is illustrated in FIG. 2C. The index register format comprises bits 6 and 7 which are the secondary index field bits, SX (specifies register) or tertiary index bits, TX (specifies register); bit 8, which is the module selector bit MS and which specifies that the module value designator MV should be substituted for the previous module selection; bits 9–11, inclusive, which comprise the module value designator bits MV; bits 12–23, inclusive, which specify the index value, XV; and bit 24, the parity bit P. The SX, TX, MS and MV fields are used for control whereas the XV field is the actual index modifier.

Figure 2D:
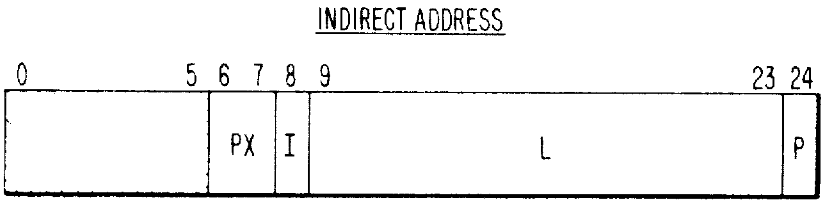
FIG. 2D is a diagrammatic representation of a format for the word organization of an indirect address word employable with the illustrative embodiment of FIG. 1.

FIG. 2D illustrates the format for indirect addressing. Bits 6 and 7 are the primary index field PX and specify a register. Bit 8 is the indirect address bit I and specifies the next level indirect address. Bits 9–23 specify the address field L.

A description in detail of the individual commands and variations is presented in the closing section of this application. However, to facilitate the description herein, a partial list of commands which a programmer may employ with the computer of the illustrative embodiment and which the bits in the operation register 109 denote is as follows:

| Mnemonic | Octal code | Command description |
|---|---|---|
| ADD | 30 | Add. |
| ADL | 10 | Add literal. |
| ADS | 70 | Add and store. |
| BCM | 27 | Branch on contents of memory. |
| BCN | 03 | Branch conditional. |
| BTE | 61 | Block test for equal. |
| BTG | 65 | Block test for register greater than memory. |
| BTL | 64 | Block test for register less than memory. |
| BUN | 02 | Branch unconditional. |
| CDT | 06 | Control descriptor transfer. |
| DIV | 32 | Divide. |
| DPA | 72 | Double precision addition. |
| DPS | 73 | Double precision subtract. |
| LCA | 76 | Load C and A registers. |
| LDR | 36 | Load register. |
| LSP | 67 | Load and store P register. |
| LXL | 37 | Load index location register. |
| MDT | 77 | Memory data transfer. |
| MUL | 33 | Multiply. |
| NMR | 53 | Normalize register. |
| RRB | 35 | Reset register bits. |
| RRL | 15 | Reset register bits literal. |
| RRS | 75 | Reset register bits and store. |
| RSR | 13 | Reset and/or shift register. |
| SBL | 11 | Subtract literal. |
| SBS | 71 | Subtract and store. |
| SCA | 55 | Store the C and A registers. |
| SRB | 34 | Set register bits. |
| SRL | 14 | Set register bits literal. |
| SRS | 74 | Set register bits and store. |
| STP | 41 | Store P count and memory access controls. |
| STR | 45 | Store A or C register. |
| SXL | 40 | Store XL register. |
| SUB | 31 | Subtract. |
| TDO | 22 | Transfer data out. |
| TEQ | 21 | Test for equal. |
| TGT | 25 | Test for register greater than memory. |
| TIM | 66 | Transfer input to memory. |
| TIR | 26 | Transfer input to register. |
| TLE | 01 | Test literal equal. |
| TLG | 05 | Test register greater than literal. |

TABLE—Continued

| Mnemonic | Octal code | Command description |
|---|---|---|
| TLL | 04 | Test register for less than literal. |
| TLT | 24 | Test register less than memory. |
| TMC | 16 | Test and/or modify controls. |
| TMX | 63 | Test or modify index. |
| TRO | 07 | Transfer register out. |
| TTR | 12 | Test or transfer register. |

THE OPERATION REGISTER

Refer again to FIG. 1. The operation register 109 may be an 11-bit flip-flop register 109. The operation register 109 holds the 11 most significant bits of the instruction word which is currently being performed. These 11 bits specify the instruction which is to be decoded and the major variants of that command. The operation register 109 is the only register in the machine that is loaded directly from the 25-bit word input from a memory module or from an I/O module. The most significant eleven bits of a 25-bit command word coming from memory and from the I/O control modules form the actual command bits of the instruction word. These 11 bits are fed directly into the operation register 109. The entire 25-bit word is simultaneously fed into the data input register 100 and this 25-bit word comprises the 11 most significant bits which are the instruction portion of the word. The 25-bit word also comprises one bit which denotes memory module select and a twelve-bit address portion plus the least significant of the 25 bits which is the parity bit.

In a two-memory module configuration, for example, this memory module select bit could specify which of the two memory modules is to be accessed. In the memory module configuration of the illustrative embodiment of more than two (eight, for example) as described in the next section, 3 bits each are in a primary and in a secondary selection register to select which one of the eight memory modules is selected for access. The memory module select bit provided is bit 11 of the bits in the address field register 116 word. There are 15 bits in the address field register 116. These are bits 9 through 23 of the word from the data input register 100. These latter 15 bits are the address of the operand of the instruction before indexing or other modification takes place. As stated, the 11th bit, the module selcet bit, is the bit used to select any one of two initiate signals, one selecting memory module 1 and the other selecting memory module 0. This 11th bit is emplaced also in the operation register 109. The module select means and the description of the primary and secondary registers will be described in the next section.

The first six most significant bits of the instruction word specify the particular instruction. These six bits comprise up to 64 octal words which specify 64 instructions which can be decoded by the command decoder and executed. The commands are listed in the previous section. The nonlisted commands are generaly for diagnostic procedure although other uses also are contemplated.

The 11-bit instruction portion of the word in the operation register 109 is sent to the command decoder 121. The command decoder 121 decodes the most significant 6 bits of the 11-bit instruction portion of the 11-bit word received from operaiton register 109. The remaining five bits of the 11-bit word from operation register 109 are fed directly to the subcommand matrix 120.

In addition to decoding the six bits representing the primary command from the operation register 109, the command decoder 121 also decodes subgroups within the six command bits which, for example, denote which group of a group of instructions is involved for purposes of similar timing and similar controls.

The address field register 116 sometimes is utilized to insert variation bits into the command word. When so utilized the address field register 116 feeds the variation bits into the command decoder 121 and thence into the subcommand matrix 120. The command decoder 121 and subcommand matrix 120 acting together then decode the varied commands specified by the variation bits to thereby cause the timing and control unit 106 to control the computer mechanism such that the varied command is carried out. In the absence of a variant syllable inserted by the address field register 116, the principal command, encoded by the command decoder 121 from the output of the operation register 109, is routed via the subcommand matrix 120 to cause timing control unit 106 to set up appropriate timing and to exercise appropriate control to execute the principal command. From the subcommand matrix 120 also are sent signals which occur in some commands which inform the I/O modules and the memory modules involved that a word is to be routed from memory via the computer to the I/O modules instead of merely to the computer. Also, by means of the subcommand matrix 120 certain commands may effect the sending of the contents of data to and from the I/O control module (or one of the I/O control modules) and the A register 107 or the C register 108. The subcommand matrix 120 also specifies whether these transfers between I/O control modules and either A register 107 or C register 108 or memory are data words or are command words to the I/O module addressed. That is, transfer can be effected either from the memory or from the A register 107 or from the C register 108 to a designated I/O control module, or transfer can be effected from a designated I/O control register to either a memory module, or the A register 107, or the C register 108 by the subcommand matrix 120 decoding mechanism and the associated logic in the I/O control modules.

The computer of the present invention can adapt to a clock external to the computer in the manner set forth in detail in the above referred to copending application of the same inventors for Central Data Processor, S.N. 521,374, filed concurrently and assigned to the assignee of this invention and the contents of which are incorporated herein by reference. The timing and control unit 106 is synchronized to the external clock frequency or a multiple or submultiple thereof. The synchronization with the external clock usually is governed via the I/O control module so that the I/O control module is enabled to synchronize memory and computer operations as well as transfer operations therethrough. This feature is particularly advantageous in that it eliminates the need for a master-and-slave clock procedure and periodic updating of the various clocks for insuring of synchronization or for special timing circuits. This capability of the illustrative embodiment enables synchronization with various types of inputs which may be operating at different frequencies; for example, different kinds of radar or television inputs may be accepted by using the basic clock of the input system as the master clock of the present system.

The timing and control unit 106 is also responsive to interrupt signals from the I/O control module. These interrupt signals can specify that the next instruction be called from an address supplied directly from an I/O control module to memory. The interrupt signals from the I/O modules inhibit the program counter 117 from counting and inhibit the output of the program counter 117 from being sent to memory during the interrupt cycle. The timing control unit 106 responds to the interrupt signals from the I/O control module by sending to the I/O control module which sent the interrupt signals a signal which states that the computer is ready to receive information from the input/output control module. As stated, the program counter 117 is not counted or updated during this period and its contents are not transferred out. The timing control unit 106 is responsive also to start and stop signals from an I/O control module and also is responsive to various limit, error and test conditions within the central data processor, to vary timing of the control flip-flops, etc.

*Primary and secondary selection registers*

A feature of the invention is that a number of memory units may be incorporated in the system and individually accessed pursuant to commands which contain a number of bits in the command word, the total count of which bits is less than the number of memory units incorporated. By way of specific example the illustrative embodiment of the invention provides that one of a plurality of memory units, up to eight, for example, can be utilized and selectively accessed with only a single bit in the command word. This is effected by means of the primary and secondary selection registers 119 and associated controls and by using the herein described programming method.

The illustrative embodiment provides, for example, a single primary selection register 119*a* and a single secondary selection register 119*b* and the use of one bit in the command word to specify one of eight memory modules for any particular instruction. It will be appreciated that by the provision of extra bits and tertiary, etc., as well as primary and secondary registers, a very large number of memory modules could be selected with a relatively few bits using these features.

Refer again to FIG. 1. Primary selection register 119*a* comprises a three bit register. Secondary selection register 119*b* comprises also a three bit register. Since the actual registers are each 3-bit conventional registers, the details of the bit circuits are not separately illustrated and described. Associated controls are provided to load these registers with new contents and store the present contents in memory by variants of the load and store program counter LSP, branch on contents of memory BCM, and store program counter STP instructions.

The one memory module select bit (which is bit 11 of the instruction word shown in FIG. 2A) specifies that either the primary selection register 119*a* or the secondary selection register 119*b* of primary and secondary selection registers 119 is to be used to form the first three bits of the 15-bit word to be placed in the address field register 116. The last 12 bits of these 15 bits in the address field register 116 are the 12 bits from the address sent to the data input register 100. These 12 bits inserted into the last 12 bit positions of the address field register 116 are the bits 12 through 23 in the L portion of the instruction word (see FIG. 2A). The first three bits of the address inserted in the address field register 116 designate which one of the eight modules is selected for the particular instruction. These three bits are provided into address field register 116 from either the three bits of the primary selection register 119*a* or the three bits of the secondary selection register 119*b*.

Thus the address generated in the address field register 116 is a 15-bit total address. The first three bits designate which one of eight memory modules is selected to supply the data and the next 12 bits determine the address within the memory module which is to be accessed.

It will be appreciated that any other schemes of addressing which requires a total of 15 bits could be used. For example, if desired, a single memory which utilized 15-bit addresses could be utilized. Although contemplated as within the scope of the present invention to place the controls to actually select which one of the memory units of the eight units is selected in the processor, the selection may equally be accomplished by placing the actual routing mechanism in the I/O control module as illustrated in the copending patent application incorporated herein by reference of Marx et al. for I/O Control System for Electronic Computers, S.N. 527,322 herein referenced to and assigned to the assignee of the present invention.

The loading or changing of the contents of the primary selection register 119*a* and the secondary selection register 119*b* may be effected in several optional ways by the program. One of these methods is by the commands hereinabove mentioned, namely, the LSP, the BCM and the STP commands. In the load and store program counter LSP command a data word is loaded from memory into the data input register 100, the last 15 bits, bits 9 through 23, are loaded into the program counter 117 and the first 6 bits, bits 0 through 5, are simultaneously loaded into the primary selection register 119*a* and the secondary selection register 119*b* to form the two new three-bit contents of each of these registers. The former contents of the program counter 117 and of the primary and of the secondary selection registers 119*a* and 119*b* then are stored automatically in memory for future reference.

By the presentation of a BCM command with the proper variant the load program counter operation described hereinabove also is provided. That is, the first six bits of the data word are loaded into the primary selection register 119*a* and the secondary selection register 119*b* and the last 15 bits are loaded into the program counter 117. In the store program counter STP command, the 6 bits of the primary and secondary selection registers 119*a* and 119*b* (3 bits in each) are automatically stored in memory.

The first three bits of the address field register 116 in each case actually determine which memory is selected. These three bits represent the 3-bit contents of the primary selection register 119*a* or the 3-bit contents of the secondary selection register 119*b* in accordance with whether the 11th bit of the instruction word is a "0" or a "1."

Two other methods of selecting one memory out of the eight memories are provided. These may be accomplished by in effect bypassing the primary and secondary selection registers 119. The first of these two additional methods is by indexing. The second of these two additional methods is by indirect addressing.

Refer to FIG. 2C. If an index word contains a "1" in the eighth MS bit position, the contents of the index word in bits 9 through 11, the MV contents, are inserted into the first three bits of the address field register 116, replacing the value previously obtained from the primary selection register 119*a* or from the secondary selection register 119*b*. The first three bits of the address field register 116 as in the other cases determine which memory is selected.

Thus, by indexing, it is possible to select a module other than the module determined by the contents of the primary selection register 119*a* or the secondary selection register 119*b* by specifying in bits 8, the MS portion, of the contents of the index register that module selection is to take place by indexing and by utilizing the contents of bits 9 to 11, the MV portion of the index register word (see FIG. 2C) to determine which one of the 8 modules is selected.

A second method of designating the memory module without utilizing the primary and secondary selection registers 119*a* and 119*b* is by indirect addressing. All indirect address operations replace all 15 bits of the address field register 116 by the 15 bits contained in the L portion, bits 9–23 inclusive, of the indirect address word.

The method of indexing or of indirect addressing to determine which one of the eight modules will be selected in the illustrative embodiment is usually performed in operation when an access to a memory unit other than the two memory units which are currently being utilized primarily in the program is to be accessed for one or two or a few commands. It is contemplated that considerable time will be saved, however, by usually utilizing the contents of the primary and secondary selection registers 119*a* and 119*b* because the saving of time which would otherwise be spent in the indexing and/or indirect cycles is saved. Therefore, in drawing up programs, the programmer normally utilizes the primary and secondary selection register feature most effectively by having blocks of commands access one of two memories wherever possible.

The primary selection register 119*a* may be set to bit contents 000 and the secondary selection register 119*b* may be set to bit contents 001 by providing a clear operation which may be effected by operator control.

*Timing*

Figure 3:
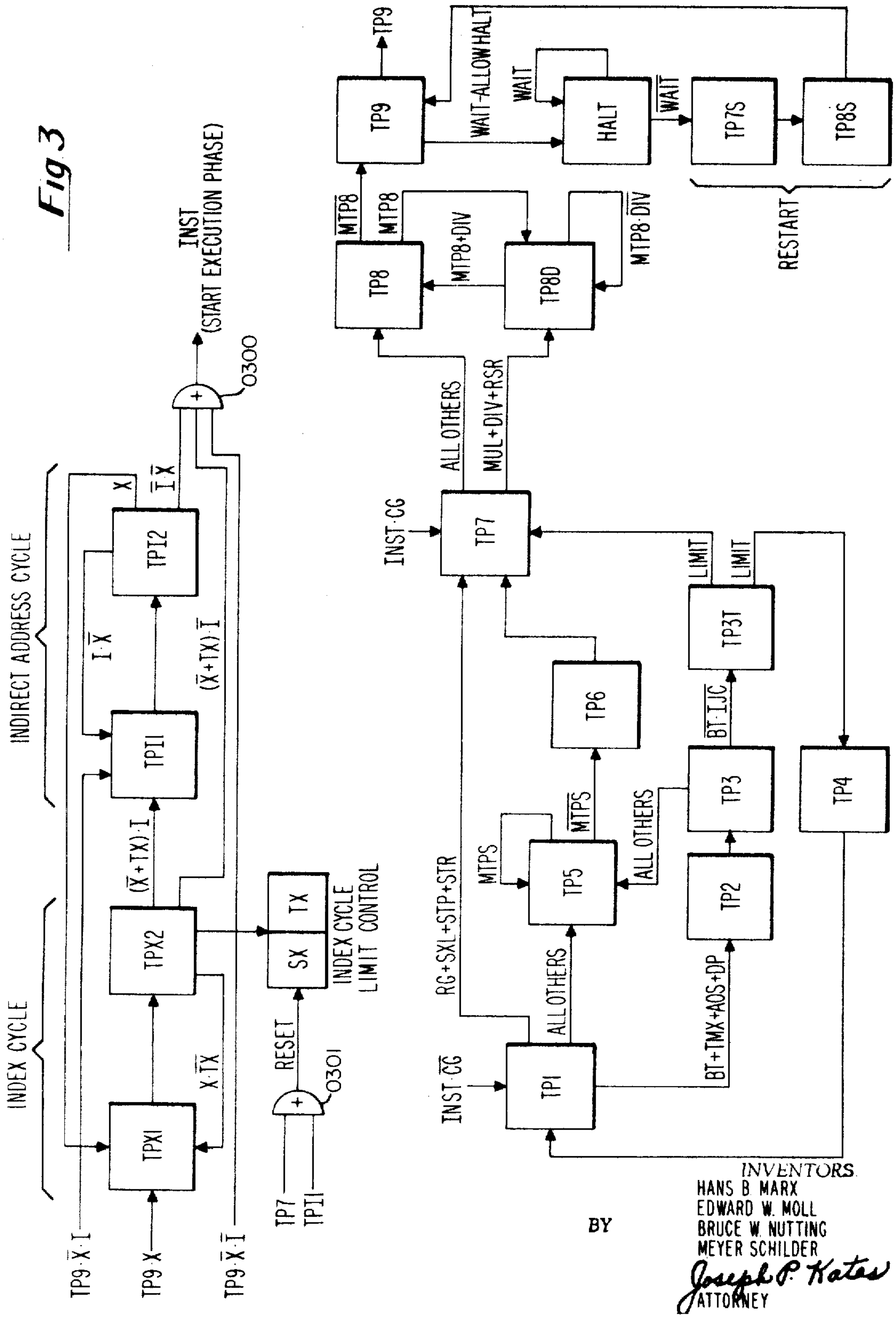
FIG. 3 is a block schematic diagram of the timing counter of the illustrative embodiment of FIG. 1 illustrating also timing flow in flow chart representation.

Refer to FIG. 3. FIG. 3 illustrates the timing counter of the illustrative embodiment of the invention. The timing counter of FIG. 3 is a circuit of the timing and control unit 106 shown in FIG. 1. The timing sequence within the CDP is accomplished by the ring counter with many possible jumps within the ring as shown on FIG. 3. The designation TP in FIG. 3 and in the description herein is an abbreviation for time period.

The ring counter of FIG. 3 effects the timing sequence and comprises a plurality of flip-flops in ring counter arrangement with attendant circuitry. These flip-flops comprise two TPX flip-flops or indexing timing flip-flops, flip-flops TPX1 and TPX2. Two flip-flops, flip-flops SX and TX are provided and are responsive to the state of flip-flop TPX2 to define secondary and tertiary index cycles. A pair of flip-flops, TPI1 and TPI2 are provided and perform the indirect address cycle. A logic circuit schematically represented as OR gate 0300 is provided. OR gate 0300 is responsive to output of the flip-flop TPX2, or of the signal TP9·X·I or to the output of flip-flop TPI2 to start the execution phase. A further OR gate 0301 is provided. OR gate 0301 is responsive to inputs from either flip-flop TP7 or flip-flop TPI1 to reset both the flip-flops SX and TX. A plurality of flip-flops, flip-flops TP1, TP2, TP3, TP4, TP3T, TP5, TP6, TP7, TP8, TP8D and TP9 are provided to perform the execution cycle functions. Additionally, as will be described, a pair of start flip-flops, flip-flops TP7S and TP8S, are provided to operate especially during the first fetch cycle following a halt condition. A Halt flip-flop is provided. When set the Halt flip-flop indicates that the machine has come to a halt. Except for the two control flip-flops, flip-flops SX and TX, one and only one flip-flop of the remaining flip-flops of FIG. 3 may be set at any one time. Any other condition generates a timing error which causes an immediate halt of the machine.

There are 17 active timing periods (TP) in addition to the HALT state (18 total). The sequence of the timing counter is controlled by the contents of the operation (OP) register 109 (FIG. 1), the presence of index or indirect address bits, and the contents of various control test flip-flops. The timing sequence for an instruction may be divided into three phases:

(a) The fetch phase, during which a new instruction is read from memory and placed in the DIR 100 and operation register 109.
(b) The command manipulation phase, during which indexing and indirect addressing are performed.
(c) The command execution phase.

The fetch phase of each instruction overlaps the execution phase of the proceeding instruction and consists of timing periods TP7, TP8 and TP9. If the computer is starting from the halt state, the fetch phase consists of timing periods TP7S, TP8S and TP9.

In the designation of timing periods TP7S and TP8S, the S stands for starting. The periods TP7S and TP8S with relation to the fetch phase are exactly the same as the periods TP7 and TP8 except that no portion of execution of a command may occur during this period. This insures that operation up data which is in the operation register 109 will not occur before legitimate data is placed therein. This feature eliminates the necessity for the programmer to have to take special precautions upon stopping and starting.

At timing period TP9, the state of data input register 100 bits 6 and 7 are examined to tell whether indexing is required. In the instructions which do not permit indexing, this test will yield an automatic negative result. In all other instructions, if either bit (6 or 7) is equal to "one," an index cycle will be initiated.

Still referring to FIG. 3, if an index cycle is to be initiated, the signal X is present (true). If not, this signal is not present (false or $\overline{X}$).

The designations at the upper left of FIG. 3 are as follows:

TP9·$\overline{X}$·I means that if the time TP9 is true, X is false, and I is true, then the indirect address cycle is commenced by going to TPI1. If TP9·X are both true, that is, if at TP9 there is an index, then the index cycle indicated in the block TPX1 commences. Under the conditions at TP9 that indexing should not be accomplished, that is, X is false and indirect addressing (I) is false, that is, is not to occur (TP9·$\overline{X}$·$\overline{I}$), then the signal INST is generated which indicates that the machine starts the executing phase.

The index cycle consists of timing periods TPX1 and TPX2. During TPX2, DIR 100 bits 6 and 7 are again examined to determine if further indexing is required. If so the counter returns to TPX1. That is flip-flop TPX1 is set. At this time the secondary index flip-flop SX is set to indicate that one full index cycle has already occurred. At the end of a secondary index (TPX2) DIR 100 bits 6 and 7 are once again examined and the tertiary index flip-flop TX is set to indicate that two full index cycles have been completed. At the end of the tertiary index cycle (TPX2) the presence of the tertiary index flip-flop TX prevents any further indexing regardless of the states of DIR 100 bits 6 and 7 (because the conditions X·$\overline{TX}$ cannot be satisfied). At this time (TPX2) or at time TP9 (flip-flop TP9 set) or time TPX2 of a previous index cycle if no further indexing was specified or allowed, bit 8 of the original instruction word is examined via the flip-flop I (not shown) of the timing counter. Bit 8 was previously stored in flip-flop I (not shown). If flip-flop I indicates bit 8 was a "one," an indirect address cycle is initiated.

An indirect address cycle consists of timing periods TPI1 and TPI2. At TPI2, a new set of up to three index cycles may be initiated by returning to time TPX1 if DIR 100 bit 6 or 7 is equal to "one" and if indexing is allowed for the instruction being executed. This is because flip-flop TPI1 causes flip-flops SX and TX to be reset. If no indexing is specified or allowed, further indirect addressing may be specified if bit 8 (state of flip-flop I) of the indirect address word was equal to "one." This is accomplished by returning to time TPI1. There is no limit to the number of indirect address cycles which may be performed. By this device of permitting indexing following indirect addressing, utmost flexibility is provided because both indirect addressing and indexing may be effected to the utmost depth desired by the programmer. The TP designations as TPX1, TPX2, etc. are utilized in this section both to denote the particular flip-flops and the times which are designated by setting these particular flip-flops in ring counter arrangement.

If at times TP9, TPX2, or TPI2 no further indexing is specified or allowed and no further indirect addressing is specified, the signal INST will be generated. This signal indicates that the timing counter will now proceed to the command execution phase. If the operation register 109 now contains an instruction in the control group, the timing counter will proceed to time TP7. If the operation contains a command not in the control group, the timing counter (FIG. 3) will proceed to time TP1.

The control group is defined as all of the instructions which do not require a data word from memory. That is, these instructions are those which do not require the reading from or the writing into memory of a data word. They are identifiable by the fact that the operation code for each of these instructions starts with 00. These instructions generally are the instructions which do not require an operand. These commands include Add Literal, ADL, Branch Conditional, BCN, Branch Unconditional, BUN, Control Descriptor Transfer, CDT, Reset Register Bits Literal, BRL, Reset and/or Shift Register, RSR, Subtract Literal, SRL, Subregister Bits Literal, SBL, Test Literal Equal, TLE, Test Register Greater Than Literal, TLG, Test Register for Less Than Literal, TLL, Test and/or Modify Controls, TMC, Transfer Register Out, TRO, and Test or Transfer Register, TTR. This is shown in FIG. 3 by the input INST·CG to flip-flop TP1. From this point the sequence of the timing counter, FIG. 3, is controlled by the instruction in the operation register 109 and various tests and limit conditions.

Referring to the lower half of FIG. 3 there is shown generally in this portion the timing circuitry involved in the execution of the various commands of the computer. The specific timing for each command may be derived from a section hereinbelow setting forth the "Central Data Processor Equations." The timing of any particular command may be derived readily with reference to that section. However, a general description of the timing involved for any command is presented at this point.

Upon the occurrence of an instruction which is not an instruction of the control group, flip-flop TP1 is set indicating time period 1. At time TP1, if the command is one of (1) the read group RG or (2) one of the commands for set index location register SXL or (3) store C counter or (4) store register, then a jump is executed to time period 7 by setting the TP7 flip-flop. The read group instructions are a number of instructions which may start with a 01 as the first two bits of the command code. These instructions are TDO, TEQ, TLT, TGT, TIR, BCM, ADD, SUB, MUL, DIV, SRB, RRB, LXL, and LDR. If the command is one of multiply, or divide, or reset shift register, that is, MUL, or DIV, or RSR, then a jump is made by setting the flip-flop TP8D. The flip-flop TP8D is maintained in set condition if the instruction is not the Divide instruction, that is, if it is either MUL or RSR. This occurs by the presence of the MTP8 signal generated by the control logic. This setting of flip-flop TP8D is maintained in this manner for iterative operations including multiply and reset for shift register. In the case of Divide, however, a two-step iterative procedure is effected. A jump is made from flip-flop TP8D set to the time period 8 and flip-flop TP8 is set. Then, iteratively, as shown by the return line, a jump is made back to setting of flip-flop TP8D again. The number of iterative cycles is governed by the counting of the last six bits of the address field register 116 (see FIG. 1) under the direction of the timing and control logic 106. When the interative cycle is complete, as indicated by the presence of a signal MTP8′ (the prime after 8 means not) then the jump is made again to the flip-flop TP8 and from that to the flip-flop TP9 which when set introduces time period 9. At time TP9 the execution of any instruction in the machine is complete and the overlapping fetch phase has placed a new instruction in the operation register 109. (See FIG. 1.) At time TP7, if the command is other than a multiply or divide or reset or shift register, than a jump is made to time period TP8 and thence to time period TP9 for completing the execution of this command. If the instruction originally was in the control group, then an immediate jump is made to time period TP7 which is at the start of the execution cycle. As before, the command is executed during sequential time periods TP8 and TP9. If the instruction is not in the control group but is one of the instructions for block test, BT or test or modify index register, TMX or add and store, AOS or double precision, DP, then following time period TP1 a jump is made to time period TP2 and sequentially to TP3. That is, if the signal is on block test BT which comprises the three block test signals, that is, if it is either BTE, BTL or BTG or if the signal is TMX or if the signal is an add and store, AOS which comprises ABS and SBS, or if the signal is a double precision DP signal which comprises DPA and DPS, then a jump is executed to the time period TP2 and thence to time period TP3. As will be shown hereinafter, the setting of these time period flip-flops enables the various control circuits to perform the necessary logic operations to execute these commands. At time period TP3, if the command is a block test command, and the internal jump control, IJC flip-flop, has not been set by test conditions in the previous timing periods, then a jump is made to time period TP3T. If the bounds have not been exceeded, the $\overline{\text{Limit}}$ (limit not) signal causes a jump to time period TP4 and thence recycling is effected to time period TP1. In this manner the procedure is iterative until the bound has been met or exceeded, which is denoted by the presence of a Limit signal. Upon reaching the boundary and the Limit signal being effected, a jump is made from time period TP3T to time period TP7 and conclusion of execution is made in time periods TP8 and TP9.

If at time period TP3 a block test is not being executed or if a block test is being executed, the flip-flop IJC is set, then a jump is made to time period TP5 and from thence to time period TP6. Thence from time period TP6 the jump is made successively to time periods TP7, TP8 and TP9 for execution of these commands.

If the signal into flip-flop TP1 is not one of the RG or SXL or STP or STR signals, and also, is not one of the BT or TMX or AOS or DP signals, then a jump is made from time period TP1 to time period TP5. It is assumed that the signal is also not in the control group, since in all control group signals entry is not made into flip-flop TP1 but is made into execution immediately by jump to time period TP7. If the jump was made from time period TP1 and if a normalized register command is involved, at time period TP5 the signal MTP5 is generated by the control logic until the normalized condition is met. That is, until the condition of normalizing has been met, an MTP5 signal will continue to be generated and recycling by repeatedly setting time period flip-flop TP5 will permit the reiterative operation to occur. When the normalizing condition has been met or when the limit placed by the hardware on this count is reached, a jump is made to TP6. Following this successive jump to the time periods TP7, TP8 and TP9 are effected during which sequential time periods the remainder of the instruction is executed. At time period TP9 as usual the instruction is complete, and the next instruction is then executed.

Referring to the output of the time period flip-flop TP9, in some cases where it is desired to halt the computer a Wait signal is generated. When this Wait signal is present and was present from a time before the setting of time period flip-flop TP9, then the Allow-Halt flip-flop (not numbered nor illustrated as a block) is set. If the Allow Halt flip-flop is set at time period TP9 and the Wait signal is still present, then a Halt will be generated. This is done by setting the Halt flip-flop. A Wait signal maintains the Halt flip-flop in halt condition until the Wait signal is removed. The Wait signal is generated in one of the I/O control modules of the copending patent application being filed of H. B. Marx et al. for I/O Control System for Electronic Computers, Ser. No. 527,322, hereinabove referred to and can be caused by inputs from switches or peripheral devices or control logic within the module itself for diagnostic purposes, for halting the computer at the end of an operation, or for halting the computer in order to allow the I/O control module to exercise special functions, including the aforementioned diagnostic procedures. When the Wait command signal disappears as indicated by the $\overline{\text{Wait}}$ (wait not) signal a jump is made to time period flip-flop TP7S and thence to flip-flop TP8S following which the jump is made to TP9. The setting of these flip-flops initiates the Restart Control Logic so that during time periods TP7S and TP8S the next instruction is read from memory, and following the jump to time period TP9 the next instruction may then be executed.

When the time period flip-flops TP7S and TP8S are activated, that is, during the Halt procedure, the flip-flop TP9 circuit does not effect control to complete execution of a command. The only action occurring in that case during the three time periods TP7S, TP8S and TP9 is to fetch the next instruction from memory. It should be remembered that the present instruction was completed before going to Halt. This circuitry merely prevents execution of commands previously in the register and permits the computer to restart on the next sequential instruction after the reason for the halt has been corrected.

Restating, in the execution of any instruction, when timing period TP8 is reached and is not a part of an interative cycle, the ALLOW HALT flip-flop will be set if there is a WAIT signal present (from logic in the I/O). The ALLOW HALT flip-flop indicates that the computer will halt at the completion of the execution of the present instruction. At timing period TP9, which is the last timing period in the command execution phase, the presence of the WAIT signal from the I/O and the ALLOW HALT flip-flop cause the computer to go to the HALT state. The computer will remain in the halt state until removal of the WAIT signal from the I/O causes it to go to TP7S, and start the fetch phase of a new instruction.

The following recapitulation relates the phases to the time periods and the description of the timing counts circuits of FIG. 3.

*Fetch Phase.*—In the fetch phase of the timing sequence, a new instruction is read from memory and placed in the data input register and the operation register. The timing periods and actions relating to this step are listed below:

| Timing period | Action |
|---|---|
| TP7 | Form instruction address. |
| TP8 | Read instruction word. |
| TP9 | Instruction to F and OP registers, decision on indexing or indirect addressing. |

*Command Manipulation Phase.*—The command manipulation phase provides for indexing and indirect addressing. At time period TP9 a decision is made as to the type of command manipulation required. Unless a non-indexable instruction (TMX, NMR, LSP, or MDT) is specified, up to three cycles of indexing may be done. The primary index cycle adds the value of the address in the specified index register to the address of the instruction and uses the result as the new instruction address. Also at this time, the module value (three most significant bits of the address) may be modified if the most significant bit of the index word is a "one." If the primary index specifies a second index cycle, the index cycle will repeat, adding the specified register to the new instruction address to form another new address (the module value may again be modified). In a similar manner, a tertiary index cycle will be performed, if specified. No further indexing is allowed after the tertiary cycle, even if the tertiary index specifies further indexing.

If indirect addressing is specifide in a command and indexing is complete, the instruction address (modified) will now be used to obtain an indirect address. An indirect address may specify an index (up to 3 cycles), or a second indirect address, and the process will continue until no further indirect addressing or indexing is specified. At this time, the computer will proceed to the command execution sequence. The following table lists the timing periods relating to the command manipulation phase:

| Timing period | Action |
|---|---|
| TP×1 | Read index word from memory. |
| TP×2 | Index operation, decision on further indexing or indirect addressing. |
| TPI1 | Read indirect address word from memory. |
| TPI2 | Indirect address operation, decision on further indexing or indirect addressing. |
| TNST | (TP9 or TP×2) no (further) address manipulation required. |

*Command Execution Phase.*—The following table lists the timing periods and action relating to the command execution phase. The list is provided as a general guide, and the equations whereby the individual algorithms for indexing and indirect addressing may be derived readily should be consulted for specific actions at any given timing period.

| Timing Period | Action |
|---|---|
| TP1 | Read data (from memory or I/O, or store data. |
| TP2 | Operate on data. |
| TP3 | Read limit value for block tests, otherwise operate on data. |
| TP3T | Test for limit (block test only). |
| TP4 | Form address of next data word (block test only). |
| TP5 | Form store address or address of second data word for double precision operations. Iterative in NMR instruction. |
| TP6 | Store data (read second data word for double precision operations). |
| TP7 | Operate on data (short instructions or double precision instructions), form instruction address. |
| TP8D | Iterative time in RST, MUL, DIV instruction (operate on data). |
| TP8 | Read instruction word, operate on data if required. Iterative in DIV instruction (with TP8D). |
| TP9 | Final operation of instruction, commence address modification for next instruction, STEP P unless halting or executing a program interrupt. |
| HALT | No action. External (I/O) or programmer's panel selection of register gated into the DOM or MAM and external control of the P-counter are allowed (for diagnostic and loading purposes). If the "wait" signal is removed and the signals CLEAR and TER are absent, proceed to TP7S. |
| TP7S | Restart cycle, send P-count address to memory and initiate read. |
| TP8S | Restart cycle, read instruction, and proceed to TP9. |
| SXF | Flip-flop is set at the end of the first index cycle. Will be reset during indirect address cycle (if any) at TP11, or during command execution at TP7. |
| TXF | Flip-flop is set at the end of the second index cycle. When TXF is present, no further index cycles may be executed. Will be reset during indirect address cycle (if any) at TPF1, or during command execution at TP7. |

Now refer to FIGS. 4A, 4B, 4C and 4D. FIG. 4A is a chart comprising boxes and represents the commands plotted against the timing periods during which execution of portions of the commands of the computer are carried out. FIG. 4B is a chart illustrating a typical indexing operation. FIG. 4C is a chart illustrating a typical indirect addressing operation. FIG. 4D is a chart illustrating the key to the different boxes in various operations. In some cases timing periods are repeated. For example, 2 is repeated thrice as are time periods 5, 7 and 9. The reason for these repetitions is that the computer of the present invention synchronizes and adjusts to any external clock arrangement, and it also adjusts itself to be utilized with various types of memory. For use with various speeds of memory operations or for different clock frequencies or durations for the external clock, the computer being synchronous performs no functions until the ensuing clock pulse occurs. Therefore, for example, the three 2s are represented in FIG. 4 by way of illustration in operating from a one-megacycle clock. The computer would see timing period 2 as being 3 microseconds long rather than as 1 microsecond since, by way of example, this particular chart was made up for a memory which requires 4 microseconds for the memory cycle. Obviously, working with different memories these time-awaiting periods would be varied accordingly. As shown in the "Key" of FIG. 4D, the boxes in screen pattern denote Read operations. The boxes with horizontal hatching denote write operations. The vertically hatched boxes denote "operate." The blank boxes are for unused time periods in executing instructions. The cross-hatched boxes denote "pause." All portions of the repeated periods except the last are referred to as pauses on the charts of FIGS. 4A, 4B and 4C.

As far as the Central Data Processor is concerned, it does not know that these pauses are there. However, the pauses relate the operation of the Central Data Processor through a consistently running one-megacycle clock. Therefore, for example, the timing period flip-flop TP1 is set at the first count of the one-megacycle external clock, the flip-flop TP2 is set at the end of one microsecond of the external clock, but the flip-flop TP3 is not set until the actual fourth clock pulse from the external clock. However, insofar as the computer is concerned, it recognizes this as the third clock beat. Similarly, the flip-flop TP4 is set at a one-microsecond external clock seventh count although within itself this is recognized by the computer only as its fourth count. The ensuing discussion assumes that the instruction goes through each of the timing period counts, that is, TP1, TP2, TP3, TP4, TP5, TP6, TP7, TP8 and TP9. However, actually jumps are made in accordance with the requirements for control functions exercised by the computer for each different command. Because of these jumps the necessary length of the pauses vary. This is because in the case of some commands the computer mechanism only requires a memory cycle once every several timing periods, for example, four timing periods, in which case a multimegacycle such as a four-megacycle memory cycle could be executed without pauses. Using the same memory with a command having only three timing periods between memory access cycles only one pause period would be required. Correspondingly, the number of pause periods varies both from command to command and in accordance with the length of time that a memory cycle takes to be completed. This chart is made up merely by way of example for a four-microsecond memory cycle. For example, referring to timing period TP7, it is seen that it can be repeated three times for such a memory cycle although, for example, for the TIR instruction only one microsecond is required for execution in the seventh timing period. Therefore no delay need be instituted, but during the next clock pulse after TP7 is set the entire execution of the command insofar as the TP7 period is concerned is completed within that one microsecond. The Read, which is represented by screen pattern boxes, is just an indication of time at which data is received from memory. Similarly, the blocks or boxes with horizontal hatching indicating the Write operation show times at which data is set to memory. The vertically hatched box representations of Operate periods represent times at which operations other than reading or writing are taking place.

The blank white blocks or boxes denote unused timing pulses, that is, timing pulses which do not occur in the particular command because of the jumps in timing which are instituted in the operation of the various commands. The white or unused block indicates that this command is not using the functions which are then created by setting the subcommand matrix 120 control gates accordingly. For this reason in performing the commands the jump is effected from the last marked in box to the TP Set time in executing the commands. That is, in executing the command whenever a masked screen pattern, horizontal hatched or vertical hatched block is ended and an unused blank block starts there is an immediate setting of the next TP flip-flop corresponding to the next marked box (except cross hatched pause) indicating a subsequent operation. The cross hatched box pause representations may be required because it takes some time to ready the memory to send to the computer and memory may or may not be ready to send. For example only the first two time periods are required since as far as the computer knows, it receives anything it requests from memory at time period TP7. That is, the computer is pausing during the first seven TP period clock pulses because it does not receive these clock pulses from the external clock. This masking is done in special control logic of the I/O Control Module of the aforementioned accompanying patent application of H. B. Marx, Ser. No. 527,322. When a particular timing pulse or a group of timing pulses are repeated in a given instruction, for example, for the interative procedure in Multiply, this is denoted by the slanted, blackened bottom corners of the appropriate boxes as illustrated adjacent "Repeat" in the key illustrated for interpreting the various types of boxes in FIG. 4D. Similarly, in the case of repeats where this refers to a group of timing pulses, this is indicated by a dark right triangle having a negative sloped hypotenuse in the left lower corner of the first of a series of boxes and a dark right triangle having a positive sloped hypotenuse in the lower right corner of the last of the series of boxes. This series of boxes forms the repeated timing pulses which are reiteratively effected by the command.

Due to the fact that indexing and indirect addressing are optional for any instruction and are under the control of the programmer, a typical index cycle is presented in FIG. 4B and a typical indirect address cycle is presented in FIG. 4C. Indexing and indirect addressing are optionally effected. The timing and control sequence of indexing and indirect addressing in TPX1 and TPX2 and in TPI1 and TPI2 times has been covered hereinabove. All indexing and indirect addressing is done after the last timing period TP9 of the preceding command and before the execution of the instruction at timing period TP1 of the command presently to be executed except in the case of certain commands or in the case of control group commands in which indirect addressing operations are effected at time period TP7. FIG. 3 of the drawings described hereinabove illustrates the sequence of activation of the TP flip-flops for each of the commands of the illustrative embodiment machine.

From the above disclosure of timing interrelationships and the central data processor logic equations which will be set forth hereinbelow the illustrative embodiment central data processor of the invention and its logic and electrical circuits and structure are constructed readily by those skilled in the art. The timing is included also in these equations. However, to insure convenience of duplication of the invention by others, the teaching herein is amplified by presenting first a section on definitions to facilitate understanding by defining the commands, subcommands, signals, flip-flops and other components, registers, logic operations required, etc. The central data processor equations are then given from which the algorithms, the logic circuits and corresponding electrical circuits and the structure of the illustrative embodiment machine may be constructed readily. In order to illustrate the building of the structure of the illustrative embodiment conveniently, a typical command, its timing periods and the subcommands necessary to effect it, that is, the algorithm are illustrated by way of example. Further, the utilization of subcommands in the equations is exemplified by describing generation of the DESEN subcommand and the subcommand $\overline{\text{API}}\rightarrow$TRPM with relation to the involved equation. Following this, the unconventional new logic circuits associated with the command and subcommand algorithms are specifically illustrated in FIGS. 5, 6, 7, 8 and 9, and the figures are each described in detail. A derivation of commands and variations which may be made by the programmer in operating the computer of the illustrative embodiment of the invention is then given. Thus the description herein insures "cook book" presentation to one skilled in the art.

DICTIONARY OF CENTRAL DATA PROCESSOR TERMS

| Signal | Definition |
|---|---|
| Aϕ to A23 | Outputs of the flip-flops of A register. |
| ADDA | Transfer sum to A register. |
| ADDAϕ | Transfer sum ϕ to sign bit of A register. |
| ADDC | Transfer sum to C register. |
| ADDCϕ | Transfer sum ϕ to sign bit of C register. |
| AH | Allow halt. |
| ANDA | Enables logical AND of the A register and the outputs of the adder and transfers result to the A register. |
| ANDC | Enables logical AND of the C register and the outputs of the adder and transfers result to the C register. |
| AOS | Add and store or subtract and store (ADS+SBS). |
| API | Allow program interrupt. |
| AS | Single precision arithmetic operation (ADL+SBL+ADD+ADS+SBS). |
| ASO | Non-storing arithmetic operation (ADL +SBL+ADD+SUB). |
| ASOF | Single ASO is delayed by one clock pulse (used at TP9). |

| Signal | Definition |
|---|---|
| AϕA | Combination of TIR·$\overline{EJC}$·F12 to generate ADDA and ADDAϕ. |
| AϕB | Combination of SRS·TP5 to generate ADDA,ADDC,ADDAϕ and ADDCϕ. |
| AϕC | Combination of (SRL+SRB)·TP7 to generate ADDA, ADDC, ADDAϕ, and ADDCϕ. |
| AϕD | Combination of LDR·TP7 to generate ADDA, ADDC, ADDAϕ, and ADDCϕ. |
| AϕE | Combination of TIR·$\overline{EJC}$·$\overline{F12}$·TP7 to generate ADDC and ADDCϕ. |
| AϕF | Combination of LCA·TP5 to generate ADDC and ADDCϕ. |
| BCM | Branch on contents of memory. |
| BCN | Conditional branch instruction. |
| BCT | Instruction group of BUN, BCN, TRO, or CDT. |
| BT | Block test grouping of BTE, BTL, or BTG. |
| BUN | Unconditional branch instruction. |
| Cϕ to C23 | Outputs of flip-flops of the C register. |
| CAR1<br>CAR7<br>CAR12<br>CAR13<br>CAR18 | Carry signals between stages of the adder. |
| CARRY a<br>CARRY b<br>CARRY c | Enable carry. |
| CDT | Control descriptor transfer instruction. |
| CG | Control group ($\overline{OP}\phi\cdot\overline{OP1}$). |
| CLEAR | - - - |
| CLE | Clear error flip-flops. |
| CLOCK | - - - |
| COMP | Flip-flop which enables complement outputs of the data output multiplex. |
| COUNT F | Count signal to F register (count up). |
| CPE | Command parity error flip-flop. |
| CPERROR | Command parity signal to I/O (one clock pulse). |
| DESEN | Descriptor enable to I/O (Accept data from data output multiplex). |
| DIMϕ to DIM24 | Data input lines from I/O to the data input multiplex. |
| DIRϕ to DIR24 | Outputs of the flip-flops of the data input register. |
| DIRϕ to DIR24 | Outputs of the flip-flops of the data input register. |
| DIR$\phi_A$ to DIR$24_B$ | Flip-flops which enable parity check. |
| DIRAD$1_A$<br>DIRAD$1_B$ | Enables most significant half of data input register to adder. |
| DIRAD$2_A$<br>DIRAD$2_B$ | Enables least significant half of data input register to adder. |
| DIV | Division instruction. |
| DIVF | Delays signal DIV one clock time at TP9. |
| DMR | Combination of MUL, DIV, or RSR. |
| DP | Double precision operation (DPA or DPS). |
| DPA | Double precision add. |
| DPE | Data parity error flip-flops. |
| DPERROR | Flip-flop which initiates data parity signal to I/O (one clock time). |
| DPF | Delays double precision operation signal one clock time at TP9. |
| DPS | Instruction for double precision subtract. |
| EAC | Carry output of most significant bit of adders. |
| EJC | External jump control flip-flop. |
| ENA | Flip-flop which enables A register to the data output multiplex. |
| ENC | Flip-flop which enables C register to data output multiplex. |
| ENDIR1 | Flip-flop signal which enables most significant half of the data input register to the data output multiplex. |
| ENDIR2 | Flip-flop which enables least significant half of the data input register to the data output multiplex. |
| ENF | Flip-flop which enables address filed register to the data output multiplex. |

| Signal | Definition |
|---|---|
| ENP | Flip-flop which enables P counter and the I/O count bits to the data output multiplex. |
| ENPIAD | Flip-flop signal which enables program interrupt address to the memory address register. |
| ENSR | Flip-flop signal which enables module selection register PSR and SSR bits to the data output multiplex. |
| ENXL | Flip-flop signal which enables the index location register to the data output. |
| EOϕ to EO23 | Exclusive OR outputs of the first stage of the adder. |
| F9 to F23 | Outputs of the address field register. |
| FCAR11<br>FCAR14<br>FCAR17<br>FCAR20 | Carry condition between stages of the F counter contained in the address field register. |
| HAC | Halt and allow control instruction which enables external control of memory address multiplex transfers while in HALT state if $TP_{MAR}$ is not present. |
| HALT | Flip-flop which halts the timing counter in its inactive state. |
| HALT EO | Flip-flop which enables halt signal to I/O. |
| HIC | "Halt and I/O control" instruction which enables external control of data output multiplex transfers when in the HALT state and when ENDIRDOM is not present. |
| I | Indirect address cycle required. |
| IDD | Signal indicating indirect data descriptor level to I/O during any instruction with indirect address ϕ bit equal to 1. |
| IDEN | Flip-flop signal enables input data to I/O. |
| IJC | Internal jump control flip-flop. |
| INDCPE | Signal designating command parity error indicator output. |
| INDDPE | Indicator signal designating data parity error on programmer's panel. |
| INDEJC | Indicator signal designating external jump control on programmer's panel. |
| INDIJC | Indicator signal designating internal jump control on programmer's panel. |
| INDIPE | Indicator signal designating I/O parity error on programmer's panel. |
| INDMAM9 to INDMAM23 | Indicator signal designating flip-flop outputs of the memory address multiplex on programmer's panel. |
| INDOMϕ to INDOM24 | Indicator signal designating flip-flop outputs of the data output multiplex on programmer's panel. |
| INDOPϕ to INDPO10 | Indicator signal on programmer's panel designating flip-flop outputs of the operation register. |
| INDOVA | Indicates A register overflow on programmer's panel. |
| INDOVC | Indicates C register overflow on programmer's panel. |
| INDPC1 to INDPC5 | Indicates outputs of program control bits on programmer's panel. |
| INDTER | Indicates timing error output on programmer's panel. |
| INST | Timing count which precedes actual execution of an instruction. |
| IPE | I/O parity error flip-flop. |
| IPERROR | Input parity signal to I/O. |
| LCA | Load C and A register instruction. |
| LDR | Load register from memory instruction. |
| LIM63 | Six least significant bits of the F counter have reached "all ones" limit. |
| LMNT | Combination of LSP, MDT, NMR, or TMX instructions. |
| LSP | Load and store P count instruction. |
| LXL | Load index location register instruction. |
| MAM9 to MAM24 | Output of the memory address multiplex to the I/O. |
| MCS | Initiates memory cycle start to I/O memory control. |
| MDT | Memory data transfer instruction. |
| MSPC | Most significant P count signal ti I/O. |
| MTP5 | Maintains timing counter in the TP5 state. |

| Signal | Definition |
|---|---|
| MTP8 | Maintains timing counter in the TP8 state. |
| MUD | Instruction group of MUL or DIV. |
| MUL | Multiply instruction. |
| NCO | No character option available on data from memory. |
| NMR | Normalize register instruction. |
| NTC | Normalize test conditions met. |
| NZ | Checks for zero result from arithmetic operation. |
| ODEN | Output data enable to I/O. |
| OP$\phi$ to OP10 | Outputs of operation register flip-flops. |
| OP10F | Delays OP10 flip-flop output one clock time at TP9. |
| OV | Flip-flop which contains overflow bit from arithmetic operations. |
| OVA | A register overflow flip-flop. |
| OVC | C register overflow flip-flop. |
| P9 to P23 | Flip-flop outputs of the program counter to the I/O. |
| PAR$\phi$ to PAR23 | Data output multiplex signal to the parity generator. |
| PARITY | Signal which indicates that the word in the data input register has correct (odd) parity. |
| PC1 to PC5 | Output of program control flip-flops. |
| PCAR11<br>PCAR14<br>PCAR17<br>PCAR20 | Carry signals within the P counter. |
| PSR1 to PSR3 | Outputs of the primary module selection register. |
| R | Signal level to the I/O whenever OP9 is in the one state. |
| RCHK1 | Register check for all ones (from first stage of adder). |
| RESET FL | Reset six least significant bits of address field register. |
| RESET FM | Reset bits 12–17 of the address field register. |
| RESET FMSB | Reset three most significant bits of the address field register. |
| RESET P | Reset bits 12–23 of the P-counter. |
| RESET PM | Reset three most significant bits of the P-counter. |
| RG | Read group. |
| RR | Instruction groups RRL, RRB, or RRS. |
| RRB | Reset register bits. |
| RRL | Reset register bits with literal instruction. |
| RRS | Reset register bits and store instruction. |
| RSR | Reset and/or shift register instruction. |
| RW | Read-write group (OP$\phi$.OP1). |
| SCA | Store C and A registers instruction. |
| SCCO | Sign control for data output multiplex COMP signal. |
| SCF | Sign control flip-flop used during arithmetic operations. |
| SCOMP | Signal which sets data output multiplex COMP flip-flop. |
| SCTR | Sign control for data output multiplex TRUE signal. |
| SF9 to SF23 | Signal which sets or holds flip-flops of address field register (also used by memory address multiplex). |
| SHA1 | Condition for setting one bit of the A register during a shift operation. |
| SHA23 | Condition for setting bit 23 of the A register during a shift operation. |
| SHC$\Phi$ | Condition for setting bit $\phi$ of the C register during a shift right operation. |
| SHC1 | Condition for setting bit one of the C register during a shift right operation. |
| SCH23 | Condition for setting bit 23 of the C register during a shift left operation. |
| SHIFT | Signal used in the generation of shift commands during RSR or NMR. |
| SHLA | Signal which allows a left shift of the A register. |
| SHLC | Signal which allows a left shift of the C register. |
| SHLC$_a$ | Component of SHLC. |
| SHRA | Signal which allows a right shift of the A register. |
| SHRA$_a$ | Component of SHRA. |
| SHRC | Signal which allows right shift of the C register. |
| SP9 to SP23 | Signal which sets or holds output of P counter (also used by memory address multiplex). |
| SR | Instruction groups SRL, SRB, or SRS. |
| SRB | Set register bits instruction. |
| SRL | Set register bits from literal instruction. |
| SRR | Instruction groups SRL, RRL, SRB, RRB, SRS, or RRS. |
| SRS | Set register bits and store instruction. |
| SSR1 to SSR3 | Outputs of the secondary module selection register. |
| STEP | Signal which advances the P counter. |
| STORM | Flip-flop which initiates store mode signal to memory. |
| STP | Store P-count instruction. |
| STPI1 | Set timing period TPI1. |
| STPX1 | Set timing period TPX1. |
| STP2<br>STP3T<br>STP6<br>STP7<br>STP8<br>STP8D<br>STP9 | Signals which cause the timing counter to advance to the respective timing period. |
| STR | Store A or C register instruction. |
| STROBE A<br>STROBE A$_a$ | Signal which causes A register Flip-flops to accept input data. |
| STROBE A$\phi$ | Signal which causes the sign bit of the A register to accept input data. |
| STROBE C<br>STROBE C$_a$ | Signal which causes the C register Flip-flops to accept input data. |
| STROBE C$\phi$ | Signal which causes the sign bit of the C register to accept input data. |
| STROBE DIR$_a$<br>STROBE DIR$_b$<br>STROBE DIR$_c$ | Signal which causes the data input register to accept information from the data input multiplex. |
| STROBE OP | Signal which causes the operation register to accept input data. |
| STROBE X | Signal which causes the operation register to accept input data from bits 6, 7, and 8 (index and indirect address). |
| STROBE XL$_a$<br>STROBE XL$_b$ | Signal which causes the index location register to accept input data. |
| STRUE | Signal which sets the data output multiplex TRUE flip-flop. |
| SUM$\phi$ to SUM23 | Outputs of the adder. |
| SXF | Output of secondary index flip-flop. |
| SXL | Store index location register instruction. |
| TCL | Signal which clears the timing pulse counter when "clear" or timing error signals are present. |
| TDO | Transfer data to output instruction. |
| TE | Test for equal (instruction groups TLE, TEQ, or BTE). |
| TER | Timing error flip-flop signal which clears timing pulse counter (Can only be reset by "clear" signal). |
| TERROR | Timing error signal to I/O. |
| TG | Test for greater (instruction groups TLG, TGT, or BTG). |
| TIM | Transfer input to memory instruction. |
| TIR | Transfer Input to A or C register instruction. |
| TL | Test for less (instruction groups TLL, TLT, or BTL). |
| TMC | Test and/or modify controls instruction. |
| TMCR | Reset flip-flops specified by the TMC instruction. |
| TMX | Test and/or modify index register instruction. |
| TNP | Instruction grouping of TTR and $\overline{OP10}$. |
| TOP | Instruction grouping of TTR and OP10. |
| TP1 | Timing count (read or store data). |
| TP2 | Timing count (operate on data). |
| TP3 | Timing count (read limit value or continue operating on data). |
| TP3T | Timing count (test for limit value—block test only). |

| Signal | Definition |
|---|---|
| TP4 | Timing count (address next data word—block test only). |
| TP5 | Timing count (operate on data—send next address to memory). |
| TP6 | Timing count (store data or read second data word). |
| TP7 | Timing count (operate on data word and/or send P address to memory). |
| TP7S | Start timing count cycle (send P address to memory). |
| TP8 | Timing count (operate on data and/or read instruction word). |
| TP8D | Timing count (perform iterative operations). |
| TP8S | Start timing count cycle (read instruction word). |
| TP9 | Timing count (final step of previous instruction). |
| TP11 | Timing count (indirect address read). |
| TP12 | Timing count (indirect address manipulation). |
| TPX1 | Timing count (index read). |
| TPX2 | Timing count (index manipulation). |
| TRDF | Transfer address of data input register to address field register. |
| TRDP | Transfer address of data input register to P-counter. |
| TRFM | Specifies transfer of address from address field register to the memory address multiplex. |
| TRINSTM, TRINSTM$_a$ | Specifies transfer of instruction address to memory. |
| TRMSBP | Transfer ouput of bits 9, 10 and 11 of the adder to the most significant bits of the P-counter. |
| TRMVF | Transfer the module value of bits 9, 10 and 11 of the data input register to the most significant bits of the address field register. |
| TRO | Transfer register out instruction. |
| TRPM | Signal which specifies transfer of P-counter input data to the memory address multiplex. |
| TRPSF | Specifies the transfer of the primary module selection register bits to the most significant bits of the address. |
| TRPXM | Specifies the transfer of the index value from bits OP7 and OP8 to the least significant bits of memory address. multiplex. |
| TRSFL | Specifies the transfer of data from adder outputs (bits 18-23) to the six least significant bits of the address field register. |
| TRSFM | Specifies the transfer of data from adder outputs (bits 12-17) to the address field register (bits 12-17). |
| TRSM | Specifies the transfer of output data from the adder to the memory address multiplex. |
| TRSM+TRFM | Enables module value from address field register to the memory address multiplex. |
| TRSP | Specifies the transfer of output data from the adder to the P-counter (12 bits). |
| TRSSF | Specifies the transfer of data from the secondary module selection register to the most significant bit of the address field register. |
| TRUE | Flip-flop which enables the TRUE outputs of the data output multiplex. |
| TRXM | Specifies transfer of data from the index location register to the memory address multiplex (bits 9-21). |
| TS | TEST—instruction group of TLE, TLL, TLG, TEQ, TLT, BTE, BTL, or BTG. |
| TSC | Timing for sign control circuits. |
| TTR | Test and/or transfer register instructions. |
| TXF | Third index flip-flop signal which prevents further indexing. |

| Signal | Definition |
|---|---|
| V | Signal which is used as a level to the I/O whenever bit OP10 is in the one state. |
| WG | Write group (OP5.$\overline{OP1}$). |
| X | Signal which indicates that an index cycle is to be executed. |
| XL9 to XL21 | Flip-flop outputs of the index location register. |

The I/O control module terms which may be of interest may be obtained from the aforementioned copending patent application of Hans B. Marx et al. for Input/Output Control System for Electronic Computers, S.N. 527,322, assigned to the assignee of the present invention, and the disclosure of which is incorporated herein by reference.

The equations from which the illustrative embodiment of the computer of the present invention may be built are as follows:

CENTRAL DATA PROCESSOR LOGIC EQUATIONS

This section contains the logic equations associated with signals generated or otherwise used in the central data processor for command execution. The following rules apply for the proper interpretation of this section:

(1) The set and reset of flip-flops are shown as /S and /R.

Ex:
Set A10 is A10/S
Reset A10 is A10/R (2) The CLOCK signal appears in an equation for set or reset of a flip-flop only when it is gated with other signals and the combination clocks a flip-flop. If a flip-flop is clocked by CLOCK only, CLOCK does not appear in the equation.

(3) Dash numbers (i.e., -1, -2, etc.) are used to show identical logic signals being driven by different elements. Dash numbers are not needed for a logic evaluation. The exception occurs when the signal appears only with a dash number.

(4) An asterisk preceding a signal or group of signals designates the negation of that signal or group of signals.

(5) A logical AND sign is indicated by a period between the symbols (e.g., A·B).

(6) A grouping or multiple grouping of logic terms is shown with parentheses only; e.g., (A(B+A)).

The signals affected are:

| | |
|---|---|
| ADDAO | STROBE CO |
| ADDCO | SHCO |
| AO/R | DIMO |
| AO/S | DIRO |
| SUMO | DOMO |
| STROBEAO | PARO |
| OPO | EOO |
| AOA-AOF | |

*ADDA=*OP9F(TP5(SCF.*OV.AOS+SRS)*
*+TP3.AOS+*
*ADDA=TP7(LDR+SRL+SRB)+ASOF*
*(TP8+TP9.SCF.*OV))*
*ADDA=+DIVF(TP1+TP9+TP8(*OV+*CAR1))*
*+C1.MUL.*
*ADDA=OP10.TD8+DPF(TP5+TP7+TP9)*
*+TP7(LCA+*
*ADDA=(TIR.*EJC.F12)+(*TNP.F15.F12))*
*ADDA0=TP7.(A0A+LCA)+*OP9F*
*(A0C+A0D+A0B+(NZ*
*ADDA0=+SCF.OV)(*OP1OF+NZ)*
*(ASOF.TP9+AOS.TP5))+*
*ADDA0=TP7.F16.F12.TNP+TP8.DP*
*(*OP1OF+NZ)+TP7.MUL*

ADDC=OP9F(TP5(SCF.*OV.AOS+SRS)+TP3.AOS+
ADDC=TP7(LDR+SRL+SRB)+ASOF(TP8+TP9.SCF.*OV))
AADC=+TP7((TIR.*EJC.*F12)+(F15.*F12.TNP))DP(TP3+TP8)+TP5.LCA
ADDC0=0P9F(A0B+A0C+A0D+(SCF.OV+NZ)(*0P10F+
ADDC0=NZ)(ASOF.TP9+AOS.TP5))+TP7(MUL+
ADDC0=DIV)+TP8.DP(*OP1OF+NZ)+A0E+AOF+(TNP.F16.*F12.TP7)
AH/R=*SET.HALT
AH/S=STP9.WAIT
ANDA=*OP9(TP5.RRS+TP7(RRL+RRB))
ANDC=OP9(TP5.RRS+TP7(RRL+RRB))
AOS=RW.OP2*OP3.*OP4
API/R=(TP9+HALT)*SET
API/S=PI.STP7
AS=RW.OP2.*OP3.*OP4+*OPO.OP2.*OP3.*OP4
ASO=*OP0.OP2.*OP3.*OP4
ASOF/R=ASO.*TP8S
ASOF/S=*ASO+TP8S
A0A=TIR.*EJC.F12
A0B=TP5.SRS
A0C=TP7(SRL+SRB)
A0D=LDR.TP7
A0E=TIR.*EJC.*F12.TP7
A0F=TP5.LCA
A0/R=*SET(STROBEA0)
A0/S=STROBE A0(A1.SHLA+SUM0.ADDA0
A0/S=+SUM0.ANDA.A0)
A1/R=*SET.STROBEA
A1/S=STROBEA(SHA1.SHRA+A2.SHLA+SUM1.ADDA
A1/S=+SUM1.ANDA.A1
A2/R=*SET.STROBEA
A2/S=STROBEA(SUM1.SHRA+A3.SHLA+SUM2.ADDA
A2/S=+SUM2.ANDA.2)
A3/R=A3–A22 NUMBERS IN EQUATIONS INCREMENT
A3/S=A3–A22 NUMBERS IN EQUATIONS INCREMENT
A23/R=*SET.STROBEA
A23/S=STROBEA(SUM22.SHRA+SHA23.SHLA+SUM3.ADDA
A23/S=+SUM23.ADDA.A23)
BCM=*0PO.OP1.OP4.OP3.OP5.*OP2
BCN=*0PO.*OP1.OP4.OP5.*OP3.*OP2
BCT=TRO+BUN+CDT+BCN
BT=*WG.*OP2.*OP4.RW
BUN=*0PO.*OP1.OP4*OP5.*OP3.*OP2
CDT=*0PO.*OP1.OP4.OP3.*OP5.*OP2
CG=*OPO.*OP1
CLE=RESETER+CLEAR
CLEAR=SYCL
COMP=COMPFF+SCCO
COMPFF/R=(TP9+STRUE+HALT)*SET
COMPFF/S=SCOMP
COUNTF=MUL.TP7+TP8D.MTP8(MUL+RSR)+
COUNTF=TP3T+NMR.MTP5.TP5+DIV.TP8.MTP8+
COUNTF=TP1(SCA+DP+LCA)
CPE/R=((TMCR.F17)+CLE)*SET
CPE/S=((TP9+TPX2+TP12).*AH.*PARITY)+TMCSET.F17
CPERROR=((TP9+TPX2+TP12).*AH.*PARITY)++TMCSET.F17
C0/R=*SET.STROBEC0
C0/S=STROBEC0(SHC0.SHRC+C1.SHLC+ADDC0.SUM0
C0/S=+SUM0.ANDC.C0)
C1/R=*SET.STROBEC
C1/S=STROBEC(SHC1.SHRC+C2.SHLC+SUM1.ADDC
C1/S=+SUM1.ANDC.C1)
C2/R=*SET.STROBEC
C2/S=STROBEC(C1.SHRC+C3.SHLC+SUM2.ADDC
C2/S=+SUM2.ANDC.C2)
C3/R=C3–C22 NUMBERS IN EQUATIONS INCREMENT
C3/S=C3–C22 NUMBERS IN EQUATIONS INCREMENT
C23/R=*SET.STROBEC
C23/S=STROBEC(C22.SHRC+SHC23.SHLC+SUM23.ADDC
C23/S=+SUM23.ANDC.C23)
DESEN=CDT.TP7
DIRAD1–1/R=*SET(TPX2+STP9+TP3.*BT+TP7.DP+MUL.STP8+TMX.TP2(OP9+OP10))
DIRAD1–1/S=*HALT.*CG(INST(TS+AS+DP+RR+SR.OP10)+TP1(LCA+TMX+DIV+TIR+MUL.
DIRAD1–1/S=23)+TP6.DP+C22.MUL.STP8D)
DIRAD2–1/S=*HALT(INST(TS+AS+DP+RR+SR.OP10)+TP1(LCA+TMX+DIV+TIR+MUL.C23)+
DIRAD2–1/R=*SET(TPX2+STP9+TP3.*BT+TP7.DP+MUL.STP8+TMX.TP2(OP9+OP10)
DIRAD2–1/S=TP6.DP+C22.MUL.STP8D)
DIR0/R=*DIMO.STRDIR
DIR0/S=DIMO.STRDIR
DIR1/R=DIR1–DIR23 NUMBERS IN EQUATIONS INCREMENT
DIR1/S=DIR1–DIR23 NUMBERS IN EQUATIONS INCREMENT
DIR23/R=*DIM23.STRDIR
DIR23/S=DIM23.STEDIR
DIV=*OP0.OP1.OP4.OP2.*OP5.*OP3
DIVF/R=DIV.*TP8S
DIVF/S=*DIV+TP8S
DMR=MUL+DIV+RSR
DOM0=*PAR0.COMP+PAR0.TRUE
DOM1=DOM1–DOM22 NUMBERS IN EQUATIONS INCREMENT
DOM23=*PAR23.COMP+PAR23.TRUE
DOM24=EVEN PARITY OF PAR0–PAR23
DP=DPS+DPA
DPA=OP0.OP1.OP4.OP2.*OP5.*OP3
DPERROR=((TP2+TP3T+TP5+TP7)(RG+RW)*PARITY.*TIR.*TIM
DPERROR=+(TMCSET.F16)
DPE/R=((TMCR.F16)+CLE)*SET
DPE/S=((TP2+TP3T+TP5+TP7)(RG+RW)*PARITY.*TIR.*TIM+
DPE/S=TMCSET.F16
DPF/R=DP.TP8S
DPF/S=*DP+TP8S
DPS=OP0.OP1.OP4.OP2.OP5.*OP3
EAC=TP8.MUL+TMX.IJC.TP3+AS.CAR1.SCF(TP8+
EAC=TP3)+TTR.F17.*F18((*OP9.TP7.OVC)+(OP9.TP7.
EAC=OVA))+DP.OV.TP5+DPF
EAC=OV.SCF(TP8+TP9)
EJC/R=((TIR+TIM)INST+TMCR.F13+BCN.OP9.*OP1O.
EJC/R=TP7+CLE)*SET
EJS/S=SETEJC+TMCSET.F13+TP1.*IDA(TIR+TIM)
ENA=ENAFF+ENADOM.H1C
ENAFF/R=*SET(TP2.TS+TP9+HALT+INST(SCA+DP)+TP7.DP)
ENAFF/S=INST.*OP9(TS+AS+SRR+STR.*OP1O+TRO+TTR)+

ENAFF/S=*OP9.TP4+INST(MUL+DIV+TRO.SF12)+RSR.TP7+SCA.TP5+DP(TP3+TP8)
ENC=ENCFF+ENCDOM.HIC
ENCFF/R=(HALT+(TP2.TS)+(RSR.TP7)+(TP5.SCA)+
ENCFF/R=DP(TP3+TP8)+TP9)*SET
ENCFF/S=OP9(TP4+INST(STR.*OP1O+TS+AS+SRR+
ENCFF/S=+TTR))+INST(SCA+DP)+DP.TP7+TRO.*SF12.INST
ENDIR1=END1R1FF+ENDIRDOM.HALT
ENDIR1FF/R=*SET(TP8+TP12)+HALT
ENDIR1FF/S=TP5(OP9+*OP1O)TMX+*HALT.*CG.
ENDIR1FF/S=INST(LDR+SR.*OP1O+TDO+TIM+MDT+TOP)
ENDIR1FF/S=+*IP8.*TP12.ENDIR2FF+TPI1
ENDIR2=ENDIR2FF+ENDIRDOM.HALT
ENDIR2FF/R=*SET(TP8+TPI2)+HALT
ENDIR2FF/S=*HALT.INST(LDR+SR.*OP10+TD0+TIM+
ENDIR2FF/S=MDT+TOP)+TPI1
ENF=ENFFF+ENFDOM.HIC
ENFFF/R=HALT+(TP7+TP3T+TPX2)*SET
ENFFF/S=*HALT(INST(BUN+BCN+CDT+RSR)+
ENFFF/S=TMX.TP1+STP6.NMR+BT.TP3+STPX1)
ENP=RNPFF+ENPDOM.HIC
ENPFF/R=(HALT+TP7)*SET
ENPFF/S=INST(LSP+STP)
ENPIAD=API.TRINSTM
ENSR=ENP(LSP.OP1O+STP+HALT)
ENXL=ENXLFF+ENXDOM.HIC
ENXLFF/R=*SET
ENXLFF/S=SXL(INST+TP1)
EO0=(*DIRAD1+*DIR0)DOM0+DIRAD1.DIR0)*DOM0
FCAR11=F12.F13.F14.FCAR14
FCAR14=F15.F16.F17.FCAR17
FCAR17=F18.F19.F20.FCAR20
FCAR20=F21.F22.F23.COUNTF
F9/R=(RESETFMSB+(F10.FCAR11.F11))*SET
F9/S=DIR9.TRMVF+SSR1.TRSSF+PSR1.TRPSF
F9/S=+(10.FCAR11.F11.*F9)
F10/R=(RESETFMSB+(FCAR11.F11))*SET
F10/S=DIR10.TRMVF+SSR2.TRSSF+PSR2.TRPSF
F10/S=+(FCAR11.F11.*F10)
F11/R=(RESETFMSB+FCAR11)*SET
F11/S=DIR11.TRMVF+PSR3.TRPSF+FCAR11.*F11+SSR3.TRSSF)
F12/R=(RESETFM+(F13.F14.FCAR14))*SET
F12/S=DIR12.TRDF+SUM12.TRSFM+*F12.F13.F14.FCAR14
F13/R=(RESETFM+(F14.FCAR14))*SET
F13/S=DIR13.TRDF+SUM13.TRSFM+(F14.FCAR14.*F13))
F14/R=(RESETFM+FCAR14)*SET
F14/S=DIR14.TRDF+SUM14.TRSFM+FCAR14.*F14
F15/R=(RESETFM+(F16.F17.FCAR17))*SET
F15/S=DIR15.TRDF+SUM15.TRSFM
F15/S=+(F16.F17.FCAR17.*F15)
F16/R=(RESETFM+(F17.FCAR17))*SET
F16/S=DIR16.TRDF+SUM16.TRSFM+(F17.FCAR17.*F16)
F17/R=(RESETFM+FCAR17)*SET
F17/S=DIR17.TRDF+SUM17.TRSFM+FCAR17.*F17
F18/R=(RESETFL+(F19.F20.FCAR20))*SET
F18/S=DIR18.TRDF+SUM18.TRSFL+(F19.F20.FCAR20.*F18)
F19/R=(RESETFL+(20.FCAR20))*SET
F19/S=DIR19.TRDF+SUM19.TRSFL+(F20.FCAR20*F19)
F/20/R=(RESETFL+FCAR20)*SET
F20/S=DIR20.TRDF+SUM20.TRSFL+FCAR20.*20
F21/R=(RESETFL+(F22.F23.COUNTF))*SET
F21/S=DIR21.TRDF+SUM21.TRSFL+(F22.F23.COUNTF.*F21)
F22/R=(RESETFL+(F23.COUNTF))*SET
F22/S=DIR22.TRDF+SUM22.TRSFL+(F23.COUNTF.*F22)
F23/R=(RESETFL+COUNTF)*SET
F23/S=DIR23.TRDF+SUM23.TRSFL+COUNTF.*F23
HAC=HALT.*RUN
HALT/R=*SET.*WAIT
HALT/S=TP9.AH+TCL
HIC=HALT.*ENDIRDOM
I/R=*DIM8(TPI1+STP9)CLOCK
I/S=DIM8(TPI1+STP9)CLOCK
IDD/R=(HALT+TP9)*SET
IDD/S=TPI2.DIR0
IDEN=TIR.TP1+TIM.TP1
IJC/R=(CLE+(TMX.INST)+(INST.BT)+(TMCR.F12)+(OP9.TP7.BCN))*SET
IJC/S=(RCHK1.TP7.TOP)+(TMCSET.F12)+(TP7.TNP(F13+F14)(*F13+RCHK1)(EO0
IJC/S=+*F14))+(TMX.TP2.OP9(OP1O.CAR12+*OP1O.*CAR12.*RCHK1))+((TP7.
IJC/S=*BT)+(TP2.BT))(TE.RCHK1(EO0+OP1O)+*OP1O.TL.*RCHK1(*DIR0.*EO0
IJC/S=+*DIR0.CAR1+DIR0.*CAR1.EO0)+OP1O.CAR1.TL+*RCHK1.OP1O.*CAR1.
IJC/S=TG+*RCHK1.TG.*OP1O*(*DIR0.*EO0+*DIR0.CAR1+DIR0.*CAR1.EO0))+
IJC/S=(*OP9.TMC.TP7(F13.EJC+F14.OVA+F15.OVC+F16.DPE+F17.CPE+F18.IPE
IJC/S=+F19.PC1+F20.PC2+F21.PC3+F22.PC4+F23.PC5))
INST=*X.*I(*AH.TP9+TPI2+TPX2)
IPERROR=((TIR+TIm).*EJC.TP7.*PARITY)+TMCSET.F18
IPE/R=((TMCR.F18)+CLE)*SET
IPE/S=((TIR+TIM)*EJC.TP7.*PARITY)+TMCSET.F18
LCA=OP0.OP1.OP4.OP2.OP3.*OP5
LDR=*OP0.OP1.OP4.OP2.OP3.*OP5
LIM63=F18.F20.F23.F19.F21.F22
LMNT=LSP+MDT+NMR+TMX
LSP=OP0.OP1.OP4.OP3.OP5.*OP2
LXL=*OP0.OP1.OP4.OP2.OP3.OP5
MAM9=(SF9(TRSMFM)+XL9.TRXM+SP9.TRPM).*INHMAM
MAM10=(SF10(TRSMFM)+XL10.TRXM+SP10.TRPM).*INHMAM
MAM11=(SF11.(TRSMFM)+XL11.TRXM+SP11.TRPM).*INHMAM
MAM12=(SUM12.TRSM+SF12.TRFM+XL12.TRXM+SP12.TRPM).*INHMAM
MAM13=MAM13–MAM20 NUMBERS IN EQUATIONS INCREMENT
MAM21=(SUM21.TRSM+SF21.TRFM+XL21.TRXM+SP21.TRPM).*INHMAM
MAM22=(SUM22.TRSM+SF22.TRFM+OP6.TRPXM+SP22.TRPM+DIR6.STPX1).*INHMAM
MAM23=(SUM23.TRSM+SF23.TRFM+OP7.TRPXM+SP23.TRPM+DIR7.STPX1).*INHMAM
MCS=(TRXM+TRSM+TRFM+TRINSTM)*HALT
MDT=OP0.OP1.OP4.OP2.OP3.OP5
MSPC=P9.P10.P11.PCAR11
MTP5=NTC+LIM63+NMR
MTPB=PSR.*LIM63+MUD(*F19+*F21+*F22)
MUD=MUL+DIV
MUL=*OP0.OP1.OP4.OP2.OP5.*OP3

NCO=STPX1+STPI1+STP3+TRINSTM
NMR=WG.OP4
NTC=OP10(A1.*F14+A0.F14)+*OP10.
NTC=OP9(C0.F14+C1*F14)
NZ/R=*SET(TP7+TP9)
NZ/S=RCHK1(TP3(DP+AOS)+ASO.
TP8+NZ.DP.TP7)(SCF
ODEN=TRO.TP7+TDO.TP7
OP0/R=*DIM0.STROBEOP
OP0/S=DIM0.STROBEOP
OP1/R=OP1–OP6 NUMBERS IN EQUATIONS INCREMENT
OP1/S=OP1–OP6 NUMBERS IN EQUATIONS INCREMENT
OP7/R=*DIM7.STROBEOP
OP7/S=DIM7.STROBEOP
OP8/R=STP9.*SET.STROBEI
OP8/S=DIM8.STROBEI
OP9/R=*DIM9.STROBEOP
OP9/S=DIM9.STROBEOP
OP10/R=*DIM10.STROBEOP
OP10/S=DIM10.STROBEOP
OP9F/R=*OP9
OP9F/S=OP9
OP10F/R=*OP10
OP10F/S=OP10
OV/R=(HALT+TP5+TP8+TP9)*SET
OV/S=CAR1.DP(TP5+TP7)+CAR1
(TP3+TP8)(DP+
OV/S=AS)+DIV.A1.TP8D
OVA/R=((TMCR.F14)+(OP9.F15.
*F18.F17.TP7.TNP)+CLE)*SET
OVA/S=(NMR.TP5.LIM63.*NTC.OP10)
+(DP(TP7+TP9+TP5)(CAR1.
OVA/S=*SCF))+(F14.TMCSET)+*OP9
((CAR1.*SCF.ASOF.TP8)
OVA/S=+(CAR1.*SCF.AOS.TP3))
+(F12.CAR1.F15.*F18.
OVA/S=TNP.F17.TP7)
OVC/R=((TMCR.F15)+(*OP9.F15.
*F18.TNP.F17.TP7)+
OVC/R=CLE)*SET
OVC/S=OP9((CAR1.*SCF.ASOF.TP8)
+(CAR1.*SCF.AOS.
OVC/S=TP3))+(*F12.CAR1.F15.
*F18.F17.TP7.TNP)+
OVC/S=(F15.TMCSET)+(DIV.*CAR1.
TP7)+(NMR.TP5.
OVC/S=LIM63.OP9.*NTC.*OP10)
PARITY=ODD PARITY OF DIR0–DIR24
PAR0=A0.ENA.+C0.ENC+DIR0.ENDIR1
PAR0=+PSR1.ENSR
PAR1=A1.ENA+C1.ENC+DIR1.ENDIR1
+PSR2.ENSR
PAR2=A2.ENA+C2.ENC+DIR2.ENDIR1
+PSR3.ENSR
PAR3=A3.ENA+C3.ENC+DIR3.ENDIR1
+SSR1.ENSR
PAR4=A4.ENA+C4.ENC+DIR4.
ENDIR1+SSR2.ENSR
PAR5=A5.ENA+C5.ENC+DIR5.
ENDIR1+SSR3.ENSR
PAR6=A6.ENA+C6.ENC+DIR6.ENDIR1
PAR7=A7.ENA+C7.ENC+DIR7.ENDIR1
PAR8=A8.ENA+C8.ENC+DIR8.ENDIR1+LSP.ENP
PAR8=+BT.ENF
PAR9=A9.ENA+C9.ENC+DIR9.ENDIR1+P9.ENP
PAR9=+F9.ENF+XL9.ENXL
PAR10=A10.ENA+C10.ENC+DIR10.ENDIR1
+P10.ENP
PAR10=+F10.ENF+XL10.ENXL
PAR11=A11.ENA+C11.ENC+DIR11.ENDIR1
+P11.ENP+F11.ENF+XL11.ENXL
PAR12=A12.ENA+C12.ENC+DIR12.ENDIR2
+P12.ENP

PAR12=+F12.ENF+XL12.ENXL
PAR13=PAR13–PAR20 NUMBERS IN EQUATIONS INCREMENT
PAR21=A21.ENA+C21.ENC+DIR21.ENDIR2
+P21.ENP
PAR21=+F21.ENF+XL21.ENXL
PAR22=A22.ENA+C22.ENC+DIR22.ENDIR2
+P22.ENP
PAR22=+F22.ENF
PAR23=A23.ENA+C23.ENC+DIR23.ENDIR2
+P23.ENP
PAR23=+F23.ENF
PCAR11=P12.P13.P14.PCAR14
PCAR14=P15.P16.P17.PCAR17
PCAR17=P18.P19.P20.PCAR20
PCAR20=P21.P22.P23.STEP
PC1/R=((TMCR.F19)+CLEAR)*SET
PCL/S=SETPC1+TMCSET.F19
PC2/R=PC2–PC4 NUMBERS IN EQUATIONS INCREMENT
PC2/S=PC2–PC4 NUMBERS IN EQUATIONS INCREMENT
PC5/R=((TMCR.F23)+CLEAR)*SET
PC5/S=SETPC5+TMCSET.F23
PSR1/R=(CLEAR+*DIR10).STROBEPSR
PSR1/S=*CLEAR.DIRO.STROBEPSR
PSR2/R=(CLEAR+*DIR1).STROBEPSR
PSR2/S=*CLEAR.DIR1.STROBEPSR
PSR3/R=(CLEAR+*DIR2).STROBEPSR
PSR3/S=*CLEAR.DIR2.STROBEPSR
P9/R=(RESETPM+(P10.P11.PCAR11))*SET
P9/S=DIR9.TRDP+SUM9.TRMSBP
+(P10.P11.PCAR11.*P9)
P10/R=(RESETPM+P11.PCAR11))*SET
P10/S=DIR10.TRDP+SUM10.TRMSBP
+(P11.PCAR11.*P10)
P11/R=(RESETPM+PCAR11)*SET
P11/S=DIR11.TRDP+SUM11.TRMSBP
+PCAR11.*P11
P12/R=(RESETP+(P13.P14.PCAR14))*SET
P12/S=DIR12.TRDP+SUM12.TRSP
+(*P12.P13.P14.PCAR14)
P13/R=(RESETP+(P14.PCAR14))*SET
P13/S=DIR13.TRDP+SUM13.TRSP
+(*P13.P14.PCAR14)
P14/R=(RESETP+PCAR14)*SET
P14/S=DIR14.TRDP+SUM14.TRSP+PCAR14.*P14
P15/R=(RESETP+(P16.P17.PCAR17))*SET
P15/S=DIR15.TRDP+SUM15.TRSP
+(P16.P17.PCAR17.*P15)
P16/R=(RESETP+(P17.PCAR17))*SET
P16/S=DIR16.TRDP+SUM16.TRSP
+(P17.PCAR17.*P16)
P17/R=(RESETP+PCAR17)*SET
P17/S=DIR17.TRDP+SUM17.TRSP+PCAR17.*P17
P18/R=(RESETP+(P19.P20.PCAR20))*SET
P18/S=DIR18.TRDP+SUM18.TRSP
+(P19.P20.PCAR20.*P18)
P19/R=(RESETP+(P20.PCAR20))*SET
P19/S=DIR19.TRDP+SUM19.TRSP
+(P20.PCAR20.*P19)
P20/R=(RESETP+PCAR20)*SET
P20/S=DIR20.TRDP+SUM20.TRSP+PCAR20.*P20
P21/R=(RESETP+(P22.P23.STEP))*SET
P21S=DIR21.TRDP+SUM21.TRSP
+(P22.P23.STEP.*P21)
P22/R=(RESETP+(P23.STEP))*SET
P22/S=DIR23.TRDP+SUM22.TRSP
+(P23.STEP.*P22)
P23/R=(RESETP+STEP)*SET
P23/S=DIR23.TRDP+SUM23.TRSP+STEP.*P23
R=OP9
RCHK1=EO12.EO13.EO14.E15.EO16.EO17.EO18
RCHK1=.EO19.EO20.EO21.EO22.EO23

RCHK1=(TOP+TMX+TP3T
+EO1.EO2.EO3.EO4.EO5.EO6.
RCHK1=EO7.EO8)(TOP+TMX+EO9.EO10.EO11)
RESETFL=TRDF+TRSFL+TP1(MUL+DIV)
+CLEAR
RESETFM=STP6.NMR+TRSFM+TRDF+CLEAR
RESETFMSB=TRMVF+TRSSF+TRPSF
+NMR.STP6+TP5.TMX+CLEAR
RESETP=TRDP+CLEAR+TP7(BUN+BCN(*OP9.
RESETP=*OP10.IJC+*OP9.OP10.*IJC+OP9.
RESETP=*OP10.EJC+PC1.OP9.OP10))
RESETPM=CLEAR+TRMSBP+TRDP
RG=*OP0.OP1
ROS=RG+SXL+STP+STR
RR=OP2.OP3.*OP4.*WG.OP5
RRB=OP2.OP3.*OP4.OP1.OP5.*OP0
RRL=OP2.OP3.*OP4.OP5.*OP1.*OP0
RRS=OP2.OP3.*OP4.OP0.OP1.OP5
RSR=*OP0.*OP1.OP4.OP2.OP5.*OP3
RW=OP0.OP1
SCA=OP2.OP3.*OP4.OP0.OP5.*OP1
SCCO=TSC(OP5.OP10+*OP5.*OP10((DIRO.*AO
+*DIRO.AO)(*DP.*OP9)+(*DIRO
SCCO=.CO+DIRO.*CO)(OP9+DP))
+OP5*((DIRO.*AO+*DIRO.AO)(*DP.*OP9)
SCCO=+(*DIRO.CO+DIRO.*CO)(OP9+DP)))
SCF/R=(TP9HALT)*SET
SCF/S=SCCO
SCOMP=INST.((LDR.OP10)+RSR
+TMX+DIV+TS+
SCOMP=(TNP.*F17))+TP7.SCF.*CAR1.DP+
SCOMP=DIV.STP9
SCTR=TSC(*OP5+*OP10)(*OP5+(DIRO.*AO
+*DIRO.AO)(*DP.*OP9)+(*DIRO.CO+
SCTR=DIRO.*CO)(OP9.DP))(OP5+OP10
+*((DIRO.*AO+*DIRO.AO)(*DP.*OP9)+
SCTR=(*DIRO.CO+DIRO.*CO)(OP9+DP)))
SHA1=AO.RSR.F14.+MUL.CAR1
SHA23=DIV(*OP10+*C1)+SHIFT.*OP9.F15.AO
+C1.*F14.
SHA23=SHLC+CO.F14.SHLC
SHCO=F14.OP10.SUM23
SHC1=CO.RSR.F14.+SUM23.SHRA(*RSR+*F14)
SHC23=F15.SHIFT(AO.OP10+CO.*OP10)
+DIV(*OV+CAR1)
SHIFT=(NMR.MTP5.TP5)+RSR.MTP8.TP8D.F16
SHLA=OP10((NMR.MTP5.TP5)
+(TP8D.MTP8.F16.RSR))
SHLA=+DIV.TP8D
SHLC=OP9((NMR.MTP5.TP5)
+(TP8D.MTP8.F16.RSR))+
SHLC=DIV.TP8
SHRA=OP10.RSR.*F16.TP8D.MTP8
+MUL(TP8D+TP7)
SHRC=OP9.RSR.*F16.TP8D.MTP8
+MUL(TP8D+TP7)
SR=OP2.OP3.*OP4.*WG.*OP5
SRB=OP2.OP3*OP4.OP1.*OP5.*OP0
SRL=OP2.OP3.*OP4.*OP5.*OP1.*OP0
SRR=OP2.OP3.*OP4.*WG
SRS=OP2.OP3.*OP4.OP0.OP1.*OP5
SSR1/R=(CLEAR+*DIR3).STROBESSR
SSR1/S=*CLEAR.DIR3.STROBESSR
SSR2/R=(CLEAR+*DIR4).STROBESSR
SSR2/S=*CLEAR.DIR4.STROBESSR
SSR3/R=(CLEAR.DIR5).STROBESSR
SSR3/S=*CLEAR+*DIR5).STROBESSR
STEP=HALT.CNTP+TP9.*AH.*AP1
STORM=*HALT(STP6.*LCA.*DP
+*AH.*NMR.WG.INST)
STP=WG.*OP2.*OP3.OP5
ST11=1.*TCL.*X(*AH.TP9+TP12+TPX2)
STPX1=X.*TCL(*AH.TP9+TP12+TPX2)
STP2=*TCL.TP1(BT+DP+AOS+TMX)
STP3=*TCL.TP2

STP3T=*TCL.TP3.BT.*IJC
STP6=*TCL.TP5.*MTP5
STP7=*TCL(TP6+TP3T.RCHK1+INST.CG
+TP1.ROS
STP8=*TCL(*DMR.TP7+TP8D(*MTP8+DIV))
STP8D=*TCL(TP8.MPT8+MTP8.*DIV.TP8D+
STP8D=DMR.TP7)
STP9=*TCL(TP8.*MTP8+TP8S)
STR=WG.*OP2.OP3
STRDIR=CLOCK(HALT.ENDIM
+STP9+TPX1+TPX11+
STRDIR=*WG.TP1+BT.TP3+TP6(LCA+DP))
STROBEA=CLOCK(RSR.F12.TP7+ADDA+ANDA
+SHRA+SHLA+CLEAR)
STROBEAO=CLOCK(CLEAR+ANDA+ADDA0+
STROBEAO=SHIFT.F14.OP10+F12.TP7.RSR)
STROBEC=CLOCK(RSR.F13.TP7+ADDC+ANDC+
STROBEC=SHRC+SHLC+CLEAR)
STROBECO=CLOCK(CLEAR+ANDC+ADDC0+
STROBECO=SHIFT.F14.OP9.F13.TP7.RSR)
STROBEI=CLOCK(STP9+TPX1)
STROBEOP=CLOCK.STP9
STROBEPSR=(BCM.TP7.OP10+CLEAR
+TP7(LSP.OP9+BCM.*OP9.*OP10))CLOCK
STROBESSR=CLOCK(CLEAR+(BCM.OP9.TP7)
+TP7(LSP.OP9+BCM.*OP9.*OP10))
STROBEXL=CLOCK.LXL.TP7
STRUE=INST.(BCT+(LDR.*OP10)+(SR
+RR.*OP10)+(TTR.SF17)+WG
STRUE=+TDO+TOP)+(TP5.*LCA)+TP7(MUL+
STRUE=RSR)+STP11+STPX1
+(TP2.TMX.*OP10)+
STRUE=TP1.(DIV+OP9.MUL)
SUMO=ASOF.EDO.*NZ
+*ASOF.*NZ(MUL(CO.*DIRO
SUMO=+*CO.DIRO)+DP.CO(*SCF+*OV)
+DP.*CO(SCF.OV+NZ)
SUMO=+TTR.*F18.F17
+EOO.*DP.*MUL(*TTR+F18)
SXF/R=(STP9+TP11)*SET
SFX/S=TPX2
SXL=WG.*OP5
TCL=CLEAR+TER
TDO=*OP0.OP1.OP4.*OP5.*OP3.*OP2
TE=*WG.*OP2.*OP4.*OP3
TER/R=*SET.CLEAR
TER/S(TPX1+TP12+TP3+TP5+TP8
+HALT)((TPX2+TP1+TP3T+TP6+TP8D+TP7S)
TER/S=+(TP11+TP2+TP4+TP7+TP9+TP8S))
+((TPX2+TP1+TP3T+TP6+TP8D+TP7S)
TER/S=(TP11+TP2+TP4+TP7+TP9+TP8S))
+(*TPX1.*TP12.*TP3.*TP5.*TP8.
TER/S=*HALT.*TPX2.*TP1.*TP3T.*TP6.*TP8D.
*TP7S.*TP11.*TP2.*TP4.*TP7.
TER/S=*TP9.*TP8S)+SETTER
TERROR=TER/S
TG=*WG.*OP2.*OP4.OP3.OP5
TIM=OP0.OP1.OP4.OP3.*OP5.*OP2
TIR=*OP0.OP1.OP4.OP3.*OP5.*OP2
TL=*WG.*OP2.*OP4.*OP5
TMC=*OP0.*OP1.OP4.OP2.OP3.*OP5
TMCR=TMC.TP7.OP10
TMCSET=TMC.TP7.OP9.*OP10
TMX=OP0.OP1.OP4.OP5.*OP3.*OP2
TNP=*OP10.TTR
TOP=OP10.TTR
TP11/R=*SET
TP11/S=1.*TCL.*X(*AH.TP9+TP12+TPX2)
TP12/R=*SET
TP12/S=TP11.*TCL
TPX1/R=*SET
TPX1/S=X.*TCL(*AH.TP9+TP12+TPX2)
TPX2/R=*SET
TPX2/S=TPX1.*TCL
TP1/R=*SET
TP1/S=*TCL(TP4+INST.*CG)

TP2/R=*SET
TP2/S=*TCL.TP1(BT+DP+AOS+TMX)
TP3/R=*SET
TP3/S=*TCL.TP2
TP3T/R=*SET
TP3T/S=*TCL.TP3.BT.*IJC
TP4/R=*SET
TP4/S=*TCL.TP3T.*RCHK1
TP5/R=*SET
TP5/S=*TCL.(TP3.*STP3T+*STP2.TP1.*STP7
TP5/S=+MTP5.TP5)
TP6/R=*SET
TP6/S=*TCL.TP5.*MTP5
TP7/R=*SET
TP7/S=*TCL(TP6+TP3T.RCHK1
+INST.CG+TP1.ROS
TP7S/R=*SET
TP7S/S=*WAIT.*TCL.HALT
TP8D/R=*SET
TP8D/S=*TCL.(TP8.MTP8
+MTP8.*DIV.TP8D+DMR.TP7)
TP8/R=*SET
TP8/S=*TCL(*DMR.TP7+TP8D(*MTP8+DIV))
TP8S/R=*SET
TP8S/S=TP7S.*TCL
TP9/R=*SET
TP9/S=*TCL(TP8.*MTP8+TP8S)
TRDF=TPI2+TP9.*AH+TMX.TP2.OP9
TRDP=HALT.TDRIP+TP7(LSP
+BCM.*OP9.OP10)
TRFM=HAC.TFMAR+*TRXM*(INST(TIR
+NMR+TIM+CG))(TP4+TPI2+(*AH.TP9)+
TRFM=STP6(*TIM+*EJC))
TRINSTM=TP7S+TP8D.*MTP8*DMR.TP7
TRMSBP=TRSP.OP8
TRMVF=TPI2+TPX2.DIR8
TRO=*OP0.*OP1.OP4.OP3.OP5.*OP2
TRPM=TRINSTM.*API+HALT.TPMAR
TRPSF=*AH.TP9.*DIR11
TRPXM=HAC.TXMAR+INST(TMX+
TRPXM=*OP10.MDT)+STP6(TMX
+NMR+BT+LSP
TRPXM=+MDT.OP10
TRSFL=RSR.TP7+TMX(TP3+TP5)+TPX2
TRSM=HAC.TSMAR+TPX2.*TRXM
TRSFM=TPX2+TMX(TP3+TP5)
TRSMFM=TRSM+TRFM
TRSP=TP7(BUN+BCN(*OP9.*OP10.IJC
+.*OP9.OP10.*IJC
TRSP=+OP9.*OP10.EJC+PC1.OP10.OP9))
TRSSF=*AH.TP9.DIR11
TRUE=TRUEFF+SCTR
TRUEFF/R=(TP9+SCOMP+INST)*SET
TRUEFF/S=STRUE+HALT
TRXM=TRPXM+TP2.BT+STPX1
TS=*WG.*OP2.*OP4
TSC/R=(TP3+HALT+TP8)*SET
TSC/S=(DP+AS)(TP1+INST.CG)
TTR=*OP0.*OP1.OP4.OP2.*OP5.*OP3
TXF/R=(STP9+TPI1)*SET
TXF/S=SXF.TPX2
V=OP10
WG=OP0.*OP1
X=((DIR6+DIR7)*TXF.*LMNT
XL9/R=*DIR9.STROBEXL
XL9/S=DIR9.STROBEXL
XL10/R=XL10–XL20 NUMBERS IN EQUATIONS INCREMENT
XL10/S=XL10–XL20 NUMBERS IN EQUATIONS INCREMENT
XL21/R=*DIR21.STROBEXL
XL21/S=DIR21.STROBEXL

The input/output logic equations which may be of interest may be obtained from the aforementioned co-pending patent application of Hans B. Marx et al. for Input/Output Control System for Eelectronic Computers, Ser. No. 527,322, assigned to the assignee of the present invention and the disclosure of which is incorporated herein by reference.

A typical command and its timing periods and subcommands necessary to effect it are as follows:

| Timing period | CDT (06) Control Descriptor Transfer | |
|---|---|---|
| | Subcommand | Remarks |
| TP7 | TRUE, ENF | Enable F Register through DOM to I/O. |
| | DESEN | Enable descriptor data to I/O. |
| | $\overline{\text{API}}\rightarrow$TRPM | Transfer P count to MAM and initiate read. |
| | MCS | |
| TP8 | TRUE | None. |
| | STROBE DIR, STROBE OP, STROBE X. | Read instruction. |
| TP9 | TRUE | None. |
| | $\overline{\text{AH}}\rightarrow$TRDF, TRPSF/TRSSF. | Transfer address to F register. |
| | X$\rightarrow$TRPXM | If indexed, transfer XL register and PX bits to MAM. |
| | $\overline{\text{X}}\cdot$INST$\rightarrow$TRFM | If indirect addressed, transfer F register input to MAM. |
| | $\overline{\text{X}}\,\overline{\text{H}}\cdot$INST$\rightarrow$MCS | Initiate read for index or indirect address. |

In arriving at this command the subcommands in the equations which are set forth hereinbelow are utilized. For example, in arriving at a command the subcommands during TP7 time entitled "DESEN" and also "TRPM" are required. An equation involved (at TP7) is as follows (see section hereinabove on Central Data Processor Equations under DESEN):

$$DESEN=CDT\cdot TP7$$

As the equation indicates, the DESEN subcommand is generated when the conditions prevail that the time period flip-flop TP7 is set and also that a control descriptor transfer command (CDT) is set up in the operation register 109. That is that the most significant six bits of the 11-bit command word in operation register 109 are set to octal 06. This is the binary number 000110 as set up in operation register 109. Upon the occurrence of this condition the command decoder and subcommand matrix control gates are set up such that the subcommand DESEN takes place. A signal to the I/O control module thus is enabled which indicates to the I/O control module(s) that the output of the data output multiplex unit 104 (see FIG. 1) contains a descriptor word.

Now refer to the next subcommand of the Control Descriptor Transfer (06) command hereinabove set forth by way of example. The next subcommand at timing period T17 states: $\overline{API}\rightarrow$TRPM. This subcommand indicates that the TRPM subcommand signal is generated if the condition of $\overline{API}$ (API not) is present at timing period TP7 of this command. The following equations of the Central Data Processor equation list hereinabove presented are involved:

$$TRPM=TRINSTM\cdot\overline{API}+HALT\cdot TPMAR$$

The active portion of this instruction of the example is the first two terms on the right-hand side of the equation, namely, $TRINSTM\cdot\overline{API}$.

For this subcommand refer also to the equation:

$$TRINSTM=TP7S+TP8D\cdot\overline{MTP8}+\overline{DMR}\cdot TP7$$

The active part of this equation which is of concern in the Control Descriptor Transfer command is the portion $\overline{DMR}\cdot TP7$. Also involved is the following equation:

$$DMR=MUL+DIV+RSR$$

In these equations the "+" means OR and the "." means AND in accordance with conventional terminology of Boolean mathematics. The * used in the list of equations means the same as the bar above the expression (—) and means "not" or complement.

Thus, TRPM will be generated in this command when the conditions present is $\overline{API}$ (or *API or API not) which means there is no program interrupt request and that timing period TP7 is at hand and that none of the commands Multiply MUL or Divide DIV or Reset Shift Register RSR is present. For the Control Descriptor Transfer command to be effected at TP7 all of these enumerated conditions must be true.

Thus, for a Control Descriptor Transfer to be effected, at timing period TP7, if API is not true, that is there is no request for a program interrupt, then the machine will effect a transfer from the program counter 117 (FIG. 1) to the memory address multiplex unit 115. Similarly, it may be seen by referring to the timing periods and subcommands that the Central Data Processor equations hereinabove listed enable the generation of all of the commands of the computer.

COMPUTER LOGIC

The logic diagrams of the computer of the invention are readily apparent generally from the above-listed equations. These logic diagrams may be implemented by those skilled in the art by the use, for example, of silicon monolithic integrated circuits of the configuration commonly known at RTL or Resistor Transistor Logic.

However, certain of the circuits of the illustrative embodiment of the invention involve design ingenuity. These circuits are shown in the logic diagram of FIGS. 5, 6, 7, 8 and 9. The corresponding electrical circuits and structure of these features of the illustrative embodiment of the present invention are readily apparent from the logic diagrams and descriptions thereof presented hereinbelow of FIGS. 5, 6, 7, 8 and 9.

Refer to FIG. 5 of the drawings. FIG. 5 is a logic diagram of bits 7 to 12 of the 23 bits of the adder logic unit 103 (see FIG. 1). The operation of the remaining bits is apparent from the discussion and drawing of this portion of adder logic unit 103. In this showing the less signficant bits are numbered with the higher number, that is, bit 1 is the most significant bit and bit 23 is the least significant bit, bit 7 being the seventh most significant bit and bit 12 being the twelfth most significant bit. Thus, bit 12 is of lesser significane than bit 7. Input leads DIR7, DIR8, DIR9, DIR10, DIR11 and DIR12 (the DIR input leads) and DOM7, DOM8, DOM9, DOM10, DOM11 and DOM12 (the DOM leads) are provided. The two inputs to the adder are the inputs fed into (1) the input DIR leads which receive the corresponding inputs from the corresponding bit positions of the data input register 100 and (2) the inputs fed into the DOM input leads which receive the corresponding inputs from the corresponding bit positions of the data output multiplex unit 104. This is represented in FIG. 1 by the two lines illustrated coming into adder logic 103 from the top of the adder logic unit 103. The input lead lines labeled DIRAD 1–2 and DIRAD 2–1 are provided. Leads DIRAD 1–2 and DIRAD 2–1 enable inhibiting of inputs from the data input register 100 when it is desired to take information directly from the output of the data output multiplex unit 104 and transfer it into some register of the machine without causing the addition function in the adder to take place. This is so effected because sometimes the adder is merely used as part of the data transfer input circuit wherein the information is merely routed therethorugh. The reason that both DIRAD 1–2 and DIRAD 2–1 signa's are required is to divide the inhibiting function during the operation of literal commands when only 12 bits are enabled. These 12 bits are the least signficant 12 bits from the data input register 100. In a literal command the 12 bits which normally define an address, that is, the least significant 12 bits of the instruction word, are used as data in the execution of the command. This occurs, for example, in the case of no address commands when there is merely an operation to be performed upon a piece of data. In the operation of the literal command, the most significant 12 bits coming from the data input register 100 are always apparently zero insofar as the adder logic unit 103 is concerned because they are inhibited by the absence of "one" signal input on the input leads DIRAD 1–2 and DIRAD 2–1. In FIG. 5 the numbers following a dash (–) in each case refer to signals from different drive elements but with the same logical function and properties. For example, Carry–1 and Carry–2 both represent the same input signal, but one driver alone cannot provide enough amplification to drive the adder logic. Therefore, two carry input drive circuits are employed. That is, the signals are identical and from the same source but two drivers are needed, one for each of the inputs into which they are fed. For example, Carry–1 is sufficient to provide inputs to about the first 7 bits, Carry–2 to the next 7 bits and so on. In one practical machine of the illustrative embodiment of the present invention NAND logic has been utilized. In this NAND logic all of the AND gates are physically exactly similar to the OR gates, the difference being one of function. In the NAND logic employed, the OR gates are the gates illustrated in the drawings with the input lines through the semicircle and the AND gates are the gates illustrated as merely semicircles with lead line inputs. Also, because NAND logic is utilized, every gate shown has an inverted output. In the logic diagrams of the figures inverters are represented by triangles. The outputs labeled EO, for example, EO7, EO8, EO9, EO10, EO11 and EO12, represent the exclusive OR functions of the respective DIR and DOM inputs to each of the respective bit circuits. For example, output EO12 is the exclusive OR output from the inputs which are fed into the input leads DIR12 and DOM12.

If the DIR enabling signal DIRAD–1 or DIRAD–2 is not present, then the EO output will be the same as the corresponding DOM input. The first stage between the inputs and the outputs, that is, the stage having inputs DIR12 and DOM12 and output EO12 forms a half adder circuit. That is, AND gates A571, A572 and A573 and OR gates O574 and O575, together with their inputs, comprise a half adder circuit. When the inputs DIR12 and DOM12 are to be added, the DIRAD–2 line is enabled. The output of AND gate A571 is the carry output of the half adder which is a signal representing the presence of both (ones) the input signals DIR12 and DOM12. This output is in inverted form. The output of AND gate A571 is ANDed with the input DOM12 by AND gate A573. The output of AND gate A571 also is ANDed with the input DIR12 by AND gate A572. The output of AND gate A573 is applied to one input of OR gate O575 and represents in inverted form the presence of a DOM12 bit when there are not both the DIR12 and the DOM12 one-bit input present together. That is, it represents bit DOM12 and bit DIR12′ (in this patent application the ′ means "not" as does the alternative designation of a bar over the letter or number of an * for negative or complement). Similarly, the input of bit DIR12 along the DIR12 lead is fed into AND gate A572, and if the DIRAD–2 input and also the input which is the output of AND gate A571 is present there is provided an inverted output from AND gate A572. When a high, this output of AND gate A572 denotes that bit DIR12 is present and that bit DOM12 is not present. The OR of these two outputs forms the exclusive OR function and is provided by OR gates O574 and O575 into which is fed the output of each of AND gates A572 and A573. Both OR O574 and O575 are used solely because they are both needed for drive purposes. Either one of these OR gates O574 or O575 would be sufficient if it provided sufficient drive. The exclusive OR outputs from OR gates O574 and O575 are taken from the output lead EO12 and are applied as inputs to the register check circuit 105 (see FIG. 1).

The outputs of OR gate O574 and O575 also are used as one of the inputs to the half adder circuit at the top of the twelfth bit portion in FIG. 5 which comprises AND gates A576, A577, A578, and OR gate O579. This half adder is identical to the half adder just described comprising AND gates A571, A572 and A573 and OR gates O574 and O575 except that in the half adder comprising AND gates A576, A577 and A578, and the OR gate O579, only one OR gate is used since the drive required at the output is not as high as the first half adder requires. The sum output of OR gate O579 is applied to various registers within the illustrative embodiment machine in accordance with the particular instruction, for example, to A register 107 or to C register 108 or to the address field register 116 or to the memory address multiplex unit 115 or the program counter register 117. The carry input from the carry input lead Carry–2 is used to enable the carry input from the previous stage. In the bit 12 position the previous stage carry input is applied along carry input lead CAR13 such that where a Carry 13 input is present the proper inputs are applied to AND gates A576, A577 and A578 to provide the proper carry output. That is, a Carry–2 input enables both of the half adders to be used to perform the exclusive OR function when there is no carry input along carry input line 13 from the next least significant bit 13 circuit and this Carry–2 input enables the two half adders to take account properly of the input carry where a "1" is present on input carry lead CAR13. The absence of the Carry–2 signal inhibits the propagation of carry through the adder and therefore provides an exclusive OR function at the outputs of the adders where it is not present. This is desired for certain instructions such as Set Register Bits SRB, etc. The OR gate O568 accepts inputs from the respective outputs of AND gates A571 and A576 of the corresponding first and second half adder stages of bit 13. OR gate O568 combines these inputs from AND gates A571 and A576 to form the carry output from the 12th most significant bit stage to the 11th most significant bit stage. There is a plus output from AND gate A571 only when there are input 1's from both of the input leads DIR12 and DOM12. For the second input to OR gate O568 to be present there must be an output from AND gate A576. This output from AND gate A576 requires that carry along input carry line CAR13 must be applied with the Carry–2 line enabled and the exclusive OR function from the first half adder having produced output from OR gates O574 and O575. The remaining bits of the adder operate in identical fashion to the operation of bit 12 and will not be explained.

The operation of all the bit circuits is the same in the adder which essentially performs a bit-by-bit addition. Action in other arithmetic processes is also the same essentially. Subtraction, for example, is controlled by complementing the inputs from the data output multiplex unit 104 applied to the DOM input leads, e.g. input lead DOM12, and by performing the various corrective operations required from the result which is usual in the subtraction process by performing an add to complement.

The adder logic unit 103 is provided with a group carry system which performs the carry output for a group of six bits. This is the output represented by the designation CAR7 which is the carry for bits 7 to 12 of the adder. The group carry reduces the amount of delay for a carry generation in the adder. To perform a carry in this manner the exclusive OR outputs of each bit stage are ANDed with the exclusive OR outputs of all previous stages and the carry input to the group. In this case the carry input is applied from lead CAR13 and also from the circuit which comprises AND gates A540, A545, A547, A548, A550 and A552. This function is performed by the various inputs to the AND gate A552. That is, there is ANDed together the exclusive OR outputs along the exclusive OR output leads EO7, EO8, EO9, EO10, EO11, EO12 and the carry inputs to lead CAR13 in AND gate A552. The AND gate A550 accepts the inputs from exclusive OR input leads EO7, EO8, EO9, EO10, EO11 and the output of the first half adder of bit 12 which represents the presence of ONE's both on the input leads DIR12 and DOM12. This first half adder output is applied via the inverter I569 to the AND gate A550. This input also represents one of the inputs to OR gate O568 which propagates the carry from the bit 12 circuit to the bit 11 circuit. The AND gate A548 AND's the exclusive OR inputs from exclusive inputs leads EO7, EO8, EO9 and EO10 and the output of the first half adder section of bit 11 which is represented by a positive output from AND gate A559 when both inputs DIR11 and DOM11 are present. This AND gate A559 output also is fed through the inverted I543. The AND gate A547 and the inputs from the exclusive OR outputs of the respective seventh bit exclusive OR output lead EO7, the eighth bit exclusive OR output lead EO8, the ninth bit exclusive OR output lead EO9 and the output of the first half adder of the tenth bit which is the output from AND gate A532 when signal input is present along both input leads DIR10 and DOM10. This output of AND gate A532 applied to AND gate A547 is inverted through the inverter I538.

Similarly, the AND gate A545 receives the exclusive OR inputs from exclusive OR input leads EO7 and EO8 and the inverted output of AND gate A53 which is inverted in inverter I522 and applies a negative input signal (negative logic is used throughout the machine; therefore, negative inputs to AND gates indicate signals which are present in the true state) to AND gate A545 when the input bits applied to input leads DIR9 and DOM9 are both ONE's. Similarly, the AND gate A540 receives inputs from the exclusive OR lead EO7 and the inverted output from AND gate A512 which is inverted across inverter I511. The signal CAR7 is generated by the OR gate O554 when any one of the above AND gates A540, A545, A547, A548, A550, or A552 presents a positive output or when the AND gate A501 of the most significant bit of this portion of the adder (which is significant bit 7) has a positive output caused by the presence of both DIR7 and DOM7 signals (ONE's) being present. Because there are at least two inputs, the carry is always generated when it is proper and inhibited by the other input when a carry should not be provided by the addition function.

For additional speed in the adder a subgroup carry comprising AND gates A555, A556 and A557 and the responsive OR gate O558 are provided. This provides a group carry of bits 10, 11, and 12 and the CAR13 input and is used as the carry input to bit 9. These carries are generated in a manner similar to those described in the description of the previous circuits of OR gate O554. Inasmuch as this circuit is similar, description will not be furnished since operation is apparent from the above description.

In the present description NAND circuitry is taken to be an AND circuit followed by an inverter. This is the basic building block to form AND and OR gates as shown in FIG. 5. It will be appreciated, however, that a NOR circuit could be used alternatively, and the invention contemplates this as within its scope additionally to the NAND circuits utilized in the illustrative embodiment.

Refer to FIG. 6. FIG. 6 illustrates by way of example the circuit of one of the bits of the bit circuits of the A register 107. Provided in this FIG. 6 circuit are flip-flop FF606 having "1" and zero sides and inputs S, T and C, a $\overline{\text{STROBE A-1}}$ input lead, an OR gate O605 coupled to the S and C inputs, a plurality of AND gates A601, A602, A603 and A604 each having its output connected to an input of OR gate O605. Input leads SHRA and SUM2 into AND gate A601, input leads SHL A and A4 into AND gate A602, input leads ADD A and SUM3 into AND gate A603, and input leads AND A, a connecting lead from lead SUM3, and a connecting lead from the "1" output of the flip-flop FF606 to an input of AND gate A604 are provided. A lead from the next previous bit stage to the "1" output A3 of flip-flop FF606 is also provided. The circuits of the illustrative embodiment of the A register 107 are formed from NAND circuits. In the various registers the flip-flops used in the practical example shown of the illustrative embodiment are of the type commonly known as D-type flip-flops. In these D-type flip-flop circuits the output of previous circuit stages is applied to a single input lead which feeds the inputs labeled S and C in the flip-flop representation and this output will appear at the one output (labeled "1") of the flip-flop after the occurrence of a clock pulse at the T input. Similarly, the complement of the information presented at the inputs S and C appears in each case at the zero output (labeled "0") of the flip-flop after the occurrence of a clock pulse at the STROBE line which appears at input T. The exemplary circuit of the 24 bit circuits of the A register 107 shown in FIG. 6 is that of bit 3.

The A register 107 is a STROBE register. That is, the A register 107 will only accept input information when a STROBE pulse is applied along the STROBE pulse input line marked $\overline{\text{STROBE A-1}}$. The STROBE pulse applied to the $\overline{\text{STROBE A-1}}$ lead is generated by utilizing the clock pulses with appropriate control signals from the timing and control unit 106 when it is desired that the A register 107 accept data. This feature enables doing away with considerable gating which would otherwise be necessary to inhibit signals at certain times. There are four possible sources of input data coupled into each flip-flop of the A register 107. These four sources come from respective AND gates A601, A602, A603 and A604. AND gate A601 is responsive to the SHIFT-RIGHT A command and the SUM2 input. The SUM2 input represents the output of the second bit circuit of the adder logic 103 and is similar, for example, to the SUM12 output shown in FIG. 5 of the drawings. AND gate A601 is used when performing a shift right operation on the A register 107 at which time the A register 107 is enabled via the data output multiplex unit 104 and the adder logic 103. As stated, the output of the adder logic 103 appears on the corresponding bit of the adder logic 103 and is applied to enable corresponding bit circuit gates of the A register 107. Thus, SUM2 represents the output of A register 107 bit A2 which will be shifted right to the A register 107 position of bit A3 when the shift right command SHR A and the strobe pulse $\overline{\text{STROBE A-1}}$ are generated. The reason for the data path being directed through the adder logic 103 for this operation of shift-right A is that in executing the multiply instructions the addition and shifting of the sum may be accomplished at the same clock time. That is, all right shifts are done through the path comprising the adder logic 103 because in the particular multiply function time may be saved by multiplying and shifting at the same time. AND gate A602 is enabled upon a shift-left A command, the other input being the input from the A register 107 fourth most significant bit circuit which is placed into the third most significant bit position on a shift-left command. The AND gate A603 is enabled when the command ADD A is generated. The command ADD A means that the output of the adders in adder logic 103 is to be transferred into the corresponding bits of the A register 107 (see FIG. 1 also). Therefore, the SUM3 input, which is the output of bit 3 position of the adder, is applied to AND gate A603 together with the ADD A command. The ADD A command is used both when performing arithmetic operations and when transferring data into the A register 107 using the adder logic as a data transfer path. Thus the A register 107 operates as an accumulator register. AND gate A604 responds to the AND A command in exactly the same fashion as the AND gate A603 responds to the ADD A command except that the AND gate A604 requires the presence of a "1" output from the flip-flop FF606 of the A3 bit position of the A register 107 and thus performs a logical AND of the data coming from the corresponding third bit position of the adder along input line SUM3 and the output of the present contents of the third bit of the A register 107. Only one of these four commands (AND A, ADD A, SHL A, SHR A) is present at one time. Therefore, a single OR gate O605 is provided into which the outputs of the AND gates A601, A602, A603, and A604 are applied. The OR gate O605 output is applied to both the S and C inputs of the flip-flop FF606 so that if $\overline{\text{STROBE A-1}}$ is present representing the clock pulse time, and where there is an output from OR gate O605 a "1" is provided in the bit 3 position of the A register 107. In the bit 3 flip-flop FF606, really only one input lead means is provided to the flip-flop, the S input being provided to the circuit in its true form and the C input being provided to the same circuit in its complementary form.

The logic circuit of C register 108 is not shown since its structure and operation is identical to that of the A register 107 except that on the shift-right command inputs are taken directly from the next most significant bit of the C register 108 instead of through the adder logic unit 103. As shown in FIG. 1 also, a shifting from the least significant bit of the A register 107 to the most significant bit position of the C register 108 occurs upon a shift-right or shift-left command with proper options specified. The logic for these bits is easily deduced from the logic equations presented hereinabove and will not be described in detail.

The data input register 100, the index location register 118 and the operation register 109 are simple, conventionally designed registers. Therefore, detailed descriptions and drawings of each of these registers are unnecessary and are not given. Each of these registers 100, 118 and 109 comprises a plurality of flip-flops in parallel which accept inputs directly into the respective flip-flop circuits when the proper strobe is generated by the timing and control logic 106 and the outputs of which are direct or buffered as required.

Refer to FIG. 7. FIG. 7 illustrates, by way of example, the circuit of the bit position 5, one of the bits of the bit circuits of the data output multiplex unit 104. The remarks referred to in describing the data output multiplex unit 104 in connection with the FIG. 1 description will be illustrated here. The data output multiplex unit 104 comprises two successive circuits. Referring to FIG. 1, it is seen that the inputs to the data output multiplex all do not represent 24-bit inputs. For example, the program counter 117 applies 15 bits to the data output multiplex unit 104. Therefore, for the example that has been chosen, only four inputs are shown: the input from the fifth bit position (flip-flop FF606) in the A register 107, represented by the bit input on input lead A5, the input from the fifth bit position (flip-flop not shown) of the C register 108 represented by the bit input on input lead C5, and the input from the fifth bit position (flip-flop not shown) of the data input register 100 represented by the bit input on input lead DIR5 and the secondary selection register 119, the input from the fifth bit position of the data output multiplex unit being the output from the third bit position (flip-flop not shown) of the secondary selection register of the primary and secondary selection registers 119. This is represented by the input lead SSR3. It will be understood that the circuits of the lesser significant bit positions (digits) of the data output multiplex unit 104 will have additional inputs in accordance with the registers to which their inputs are connected. AND gates A701, A702, A703 and A704 are provided in the illustrative embodiment DOM104 fifth bit circuit and not only perform the AND functions (as described hereinbelow) but additionally two of them are used as will be described to provide an OR function also.

AND gate A701 AND's together the output of the fifth bit flip-flop of the A register 107 and the "enable A register to data output multiply unit" subcommand signal ENA from the subcommand matrix 120 which occurs in many of the commands of the machine. The AND gate A702 AND's together the output of the fifth bit flip-flop of the C register 108 applied along input lead C5 and the "enable C register to data output multiplex unit" subcommand signal ENC from the subcommand matrix 120. The ENC subcommand also is generated for the execution of many commands in the machine. The AND gate A703 AND's together the output of the fifth bit flip-flop of the data input register 100 applied along input lead DIR5 and the subcommand signal "enable the data input register to the data output multiplex" ENDIR which is generated in the subcommand matrix 120. This subcommand signal ENDIR–1 is one of two signals used to enable the data input register 100 to apply its output to the data output multiplex unit 104. Each of these signals enables only 12 bits of the data input register 100, the ENDIR–1 signal being for the most significant 12 bits of the data input register and the ENDIR 2 being for the least significant 12 bits of regigter 100. When performing a literal command which uses only the least significant 12 bits of the data input register 100, only the ENDIR 2 subcommand is enabled. In all other cases the data input register 100 full twenty-four bits are enabled by the generation of both subcommands ENDIR 1 and ENDIR 2. The AND gate A704 AND's together the output of the third bit flip-flop of the secondary selection registers of primary and secondary selection registers 119 applied along input lead SSR3 and the subcommand signal "enable secondary selection register" ENSR generated in the subcommand matrix 120. This input is used when storing selection registers during a load and store P register LSP or a store P register STP command. The OR gate O705 is provided. OR gate O705 provides the output PAR5 which represents the information from the register selected by the subcommands, ENSR, ENDIR, ENC or ENA. OR gate O705 may also be used to perform a logical OR function from any two of the input registers and a corresponding two of the subcommands together at the same clock time. An inverter I706 is provided. The signal PAR5 and its complement $\overline{\text{PAR5}}$, the latter of which is generated by passing PAR5 signals through inverter I706, are used as inputs to the parity generator 110 (see FIG. 1) and also provide inputs to the second stage of the data output multiplex unit 104. This second stage comprises AND gate A707 and A708, OR gate O709, and inverter I710. The second stage of the data output multiplex unit 104 is used to provide either the information from the first stage or the complement of the information from the first stage as desired. This is controlled by the subcommands complement $\overline{\text{COMP}}$ (COMP not) or by the submand $\overline{\text{TRUE}}$ (TRUE not). If both of these subcommands are in the ground state (both ones) the outputs of the corresponding bit positions of the data output multiplex unit 104 will be zeros, enabling the adder logic 103 to be used for data transfers from the data input register 100 to various registers within the machine such as the A register 107 and the C register 108, for example, (see FIG. 1). If the signal $\overline{\text{COMP}}$ is in the positive state, that is, equal to zero, then the true output in the first stage of the data output multiplex unit 104 will be enabled. Enabling the data output multiplex unit 104 permits outputs to be sent ot the memory, to the I/O control unit and to the adder logic 103 (see FIG. 1 also). If the $\overline{\text{TRUE}}$ signal is in the positive state, that is, is a zero, then the complement of the output of the first stage will appear at the output of the data output multiplex unit 104 for use in the adder logic 103. The complement is never sent out to the memory and I/O control modules. The subcommand matrix 120 is designed such that it is not possible for both the $\overline{\text{COMP}}$ and the $\overline{\text{TRUE}}$ to be in the positive state at one time. The inverter I711 is used to provide an output to an indicator device in an associated panel used for performing various tests on the machine and need not necessarily be provided in the illustrative embodiment but it is useful in combination as an added feature for checking operations.

The data output multiplex unit 104 is used during arithmetic operations and therefore is involved in the critical timing involved in such arithmetic operations. In order to conserve time the subcommands required, such as $\overline{\text{COMP}}$, $\overline{\text{TRUE}}$, ENDIR–1, ENC and ENA are generated in the subcommand matrix 120 a clock time before their use is required. This is performed by means of the look-ahead feature to be described in the description of FIG. 9. The subcommand generated in this look-ahead feature is used to set a flip-flop such as flip-flop FF907 shown in FIG. 9 which at the appropriate time as determined by the timing and control unit 106, is enabled to provide the appropriate subcommand signal $\overline{\text{COMP}}$, $\overline{\text{TRUE}}$, ENDIR–1, ENC or ENA when required. This is true of all subcommands used by the data output multiplex unit 104 and it is effected in the unique timing arrangement of the machine of the invention as described in FIGS. 3 and 4. The DIRAD signals required by the adder logic unit 103 are also generated in this manner, using look-ahead for the same reason.

Now refer to FIG. 8. FIG. 8 illustrates the circuit of one bit position of the address field register 116. The bit 19 flip-flop circuit of the address field register (F) 116 is illustrated. The structure of the remaining bit logic is similar to and readily understood and constructed from the drawing and description of bit 19. The fifteen bits of the address field register 116 are bits 9 through 23. Bit 19 is the 19th numbered bit from 9 through 23. The address field register 116 is capable of accepting input data from two sources, the data input register 100 and the output of the adder logic 103 (see FIG. 1). The address field register 116 contains counting logic. In these respects the address field register 116 is identical to the program counter 117. Therefore, the program counter 117 is not described nor illustrated in circuit details as its structure is readily apparent.

Refer to FIG. 8 in detail. A flip-flop FF807 is provided and has one and zero outputs, S and C data inputs and a T STROBE input. Into the T STROBE input is connected a lead to supply $\overline{\text{CLOCK}}$ signals. An OR gate O809 is provided and its output is connected into the S and C inputs of flip-flop FF807. An output lead to carry output signals SF19 is connected also to the output of OR gate O809. A plurality of AND gates A803, A804, A805 and A806 are provided. The outputs of each of AND gates A803, A804, A805 and A806 are connected into the input of OR gate O809. An AND gate A801 and an inverter I802 are provided. AND gate A801 is connected at its output to the inputs of AND gate A803 and inverter I802. Provided at the input of AND gate A801 are input leads from signal sources FCAR20 and F20. Provided at the input of AND gate A803 are signal leads from the command source $\overline{\text{RESET FL}}$ and from the output of AND gate A801. An inverter I808 is provided and connected at its input to the zero side of flip-flop FF807 and at its output it provides a F19 output signal to be described. The output of inverter I808 is connected to a third input into AND gate A803. AND gate A804 is provided with a pair of input leads, one leading from signal source DIR19 and the other from subcommand source TRDF. AND gate A805 is provided with a pair of input leads, one leading from signal source SUM19 and the other leading from subcommand source TRSFL. AND gate A806 is provided with a pair of input leads, one lead being connected to the output of inverter I802 and the other lead being connected from the zero side output of flip-flop FF807. The address field register 116 is triggered directly by clock signals $\overline{\text{CLOCK}}$ (CLOCK not) which are the inverted clock signals utilized to obtain correct polarity inputs to the standard flip-flops utilized in the illustrative embodiment of the machine. Because the clock signals are not gated in any way, a circuit is provided to hold the flip-flop FF807 in the set state once conditions for setting the flip-flop have been obtained and when a reset is not desired. This is accomplished by use of the AND gate A803, which receives feedback output from inverter I808. Inverter I808 is provided for drive purposes only. Thus, once flip-flop FF807 is set, the F19 output from inverter I808 is in the "one" state and is applied to the input to AND gate A803 so that as long as the other two inputs to AND gate A803 remain in the "one" state, AND gate A803 is continuously enabled to enable OR gate O809, when enabled OR gate O809 holds the flip-flop FF807 in the "one" state. Thus, the absence of either of the other two inputs to AND gate A803 acts as a reset signal to the flip-flop FF807.

AND gate A804 is responsive to input from the data input register 100 (bit 19) and the presence of the subcommand "transfer data input register to address field register" TRDF. AND gate A805 is responsive to the adder logic 103 output from the circuit of bit 19 applied along the input lead SUM19 and to the subcommand "transfer SUM to address field register" TRSFL from the subcommand matrix 120. This latter subcommand TRSFL is one of several subcommands (signals) used to enable various bits from the adder logic 103 to corresponding sections of the address field register 116. These subcommand signals are provided first, so that the address field register 116 may be loaded directly from the adder logic 103, and second they also are used to preset or reset various sections of the address field register 116 used when performing iterative commands such as Divide, Multiply and Shift operations. The AND gate A803 is also responsive to the $\overline{\text{RESET FL}}$ signal which must be used to reset the address field register 116 whenever transferring data in to prevent performing an OR function between the data being transferred into the register 116 and the present contents of the register 116. If it were not for the RESET line, once set a register bit would remain set indefinitely even though the data specified a "zero" in that bit position.

Counting logic is implemented by means of AND gates A803 and A806 together with AND gate A801 and inverter I802. The output of AND gate A801 is positive when the counter 116 has reached a stage (the address field register 116 is capable of being a counter) such that the 19th bit must be complemented at the next count and the enabling signal for that count is present. Thus, the output of AND gate A801 represents the presence of a count signal and also the presence of all lesser significant bits in the "one" state. The signal FCAR20 is applied to the input lead FCAR20 and to the AND gate A801. The signal FCAR20 represents a condition where the count signal is present and all bits of the address field register (counter) 116 below the 20th bit, that is, bits 21, 22 and 23, are in the "one" state. When this is ANDed together with the signal F20, meaning that the address field register 20th bit is in the "one" state, the AND gate A801 is enabled which forms the condition for counting the 19th bit. Thus, FCAR20 means that the 21st, 22nd, and 23rd bits are all "ones" and also that a subcommand signal representing the subcommand "count F" is applied. This creates all "ones" in the 4-bit positions of the four least significant bits in the address field register, meaning that a change is going to occur to make all of these four bits zeros. When this change occurs the 19th bit flip-flop FF807 must be complemented from its present state. This is accomplished by AND gates A803 and A806. If the count signal from AND gate A801 is positive and the output of the inverter I802 is in the ground condition which activates AND gate A806, this will cause flip-flop FF807 to be set if its output was previously in the zero state to enable AND gate A806 and consequently OR gate O809. Also, the output of AND gate A801 being in the positive state inhibits AND gate A803 so that if flip-flop FF807 was previously in the one state it will now be reset. The output of inverter I802 could be used to generate a signal FCAR19 which could be used with the signal F19 from flip-flop FF807 to form the counting gate of the next most significant bit 18 of the address field register 116. This gate would be similar to AND gate A801. However, in the preferred illustrative embodiment, a 3-input AND gate is used for the next stage combining signals FCAR20, F20 and the output at output lead F19. Every three stages an FCAR signal is generated similar to FCAR20 and is actually used in generation of further count signals. This feature prevents the necessity for surplus AND gates.

It has been advanced hereinabove that the data from the input stages of the address field register 116 and the program counter 117 are used as inputs to the memory address multiplex unit 115 which saves considerable time and/or circuitry. The circuit of FIG. 8 shows how this is accomplished, as follows: The F19 output from the register 116 nineteenth bit is used in all places as shown on the block diagram of FIG. 1, except for the transfer to memory address multiplex unit 115. While this line is shown as arrowed from the address field register 116 in the same manner that the arrows are routed to other places, this input is actually taken from the output lead SF19 from OR gate O809 and is not routed through the flip-flop FF807. Similarly, SF outputs are taken from each of the other bits from the OR gate input to the flip-flops rather than from the flip-flops themselves. Likewise, from the program counter 117SP outputs from the OR gate in each case preceding the respective flip-flop of the program counter 117 the outputs are taken and fed directly into the memory address multiplex unit 115. The output of the OR gate O809 represents the state which the flip-flop will go to upon the next clock pulse. Thus, the memory address multiplex unit 115 by enabling these input signals obtains the information which the address field register will contain in the next clock period. This in turn, enables a look-ahead feature for obtaining memory address one clock time in advance.

It should be understood that this function could also be performed by taking the various inputs to the address field register 116 and to the program counter 117 into the memory address multiplex unit with additional controls and gating circuitry which would perform the same look-ahead feature but at the expense of added circuitry. This feature of using the input circuitry to the program counter 117 and the address field register 116 as a look-ahead feature is a unique feature of this machine. There thus has been described thus far the logic circuits of the registers, counters and other units which are in any way not readily apparent from the equations and description hereinabove set forth. The remaining circuits are apparent from the equations set forth herein to one skilled in the art or are apparent and simple registers which do not require further explanation.

The parity generator 110 and the parity checker 101 (see FIG. 1) are simple trees of exclusive OR circuits. Their functions are apparent from these equations. The register check circuit 105 has been described and is a simple AND circuit of the exclusive OR outputs of the adder logic 103. The command decoder 121, subcommand matrix 120, timing and control unit 106 are structurally defined to one skilled in the art by the equation hereinabove set forth. The logic of the circuits for each of these equations is apparent from these equations. The subcommand look-ahead generator feature will be described in the next section in conjunction with the detailed description of FIGURE 9.

Refer to FIGURE 9. FIGURE 9 illustrates a circuit of the subcommand generation logic of subcommand matrix 120 including the "look-ahead" feature or means provided for executing subcommands wherein critical timing change is involved. That is, FIGURE 9 presents an example of the logic circuit for a subcommand which is involved in the critical timing path of the machine, as may be used in the ADD operation, for instance. The FIGURE 9 circuit is exemplary of each of the logic circuits for the subcommands in which such critical timing appears and incorporates the special circuit interconnection required for the look-ahead feature. The remaining logic of the subcommand matrix unit 120 is apparent from the logic equations of the subcommands given hereinabove and particulars and details of its logic circuits will not be described.

To eliminate the time normally consumed by the gating required for subcommand generation, the look-ahead subcommands are generated by flip-flops such as flip-flop FF907 which is provided and which will be described in conjunction with the flip-flop FF907 circuit of FIGURE 9. These flip-flops in turn receive data from gates which decode the subcommand at a time period preceding the time period in which the subcommand is to be employed. Flip-flop FF907 is provided with "one" and "zero" outputs, S and C data inputs and a T STROBE input as described for example, in the description of FIGURE 8 and as exemplary of the other flip-flops mentioned hereinabove. An OR gate O908 is provided and is connected to the "zero" output of flip-flop FF907. OR gate O908 at its "one" output provides an "enable P-counter into DOM" signal ENP. Responsive to the ENP signal the contents of the P-counter are transferred to the data output multiplex 104. An AND gate A909 is provided. Another input of OR gate O908 leads from the output of the AND gate A909. A pair of input leads are provided for HIC and ENPDOM input signals and feed into AND gate A909. The T STROBE input of flip-flop FF907 is connected directly, that is without gating, to the clock. This input denoted $\overline{\text{CLOCK}}$ is a signal derived from the central data processor clock. An OR gate O905 is provided and connects from its output the data input into the S and C data input terminals of the flip-flop FF907. AND gates A901, A902, and A903 are provided and each has an output lead which is connected into OR gate O905. Each of the AND gates A901, A902 and A903 has a plurality of input leads. AND gate A901 is provided with input leads from the sources of the signals for the load and store subcommand LSP and the INST output from the timing counter of the timing and control unit 106 (see FIGURE 3). AND gate A903 is provided with a first input from the timing counter flip-flop $\overline{\text{TP7}}$ complement. AND gate A903 is provided with a second input from the complement of the timing counter flip-flop which designates the halt state $\overline{\text{HALT}}$. A third input is inserted into AND gate A903 from the "one" side output of the flip-flop FF907. AND gate A902 is provided with two inputs. The first input is the input lead carrying the STP command. The second input is the input lead transmitting in the INST timing counter signal which signal is provided also into the input of AND gate A901.

The flip-flop circuit of flip-flop FF907 is typical of many flip-flops in the machine which are triggered directly by clock signals such as $\overline{\text{CLOCK}}$ which are inverted clock signals utilized to obtain correct polarity inputs to the standard flip-flops utilized in the illustrative embodiment of the invention. Because the clock signals are not gated in any way, a circuit is provided to hold the flip-flop (FF907 in the FIG. 9 circuit) in the SET state once conditions for setting the flip-flop have been obtained and when a RESET is not desired. This is accomplished by use of the AND gate A903 which accepts feedback output from the "one" side of the flip-flop FF907 and maintains the proper data input to OR gate O905, providing that the $\overline{\text{TP7}}$ and $\overline{\text{HALT}}$ signals are concurrently present, such as to maintain the flip-flop FF907 in its present state.

The ENP subcommand output of OR gate O908 is required at timing period TP1 of a "load and store program counter" (LSP) command. Therefore, it is necessary to set the flip-flop FF907 which generates the ENP subcommand at the timing period previous to timing period TP1.

Refer to the timing chart of FIGURE 4A. The LSP command cited in the preceding paragraph is shown on the tenth row from the bottom of FIGURE 4A. From this row it is seen that there are no previous timing periods involved in the command Execution Phase. Therefore, the timing period next preceding timing period TP1 is the timing period at which INST is generated. In determining time sequence from FIGURE 4A the blank boxes are ignored since they represent jumps in the timing counter of timing and control unit 106 (see also FIGURES 1 and 3). In this command a jump is made from the timing period at which INST is generated to timing period TP1.

Since the subcommand ENP is required at timing period TP1 and since the look-ahead feature is being used in this subcommand, the flip-flop FF907 must be set at the next previous time which in this subcommand option is INST from which the jump to timing period TP1 is made. This is effected by means of the circuit comprising the AND gate A901 when the two inputs LSP and INST are present.

The reason for this look-ahead feature is that at timing period TP1 it is necessary to enable the contents of the Program Counter 117 into the data output multiplex 104, for storage in memory at that time. The timing is critical in this path and therefore the look-ahead feature is required whereby the conditions for the transfer at timing period TP1 must be set up at the timing period at which INST is generated. INST is the next previous timing period before the jump, at which time flip-flop FF907 must be set for this command ENP to be sent to the data output multiplex 104 at timing period TP1. This look-ahead feature not only eliminates the timing delay which would otherwise be present because of the finite time which is required for enabling and providing outputs of OR gate O905 and AND gate A901 but additionally, the time is saved for the gating necessary otherwise to generate the LSP and the INST signals. This is especially significant in cases like the LSP subcommand because in such cases there is involved considerable subcommand matrix 120 circuitry and therefore considerable delay. Similar action occurs via AND gate A902 when the STP subcommand (shown in the eighteenth to the last row of FIGURE 4A), is specified. In this option once again the subcommand ENP is required at timing period TP1. However, referring to the chart of FIGURE 4A, it is seen that there are no previous timing periods involved in the command execution phase. Therefore, the timing period at which INST is generated will be the timing period which directly precedes timing period TP13. For this reason, the inputs into AND gate A902 of the STP command signal and the input at the time at which the INST command is generated, causes AND gate A902 to be activated and provides the setting of flip-flop FF907 at the time of generation of the INST signal. Thus the flip-flop FF907 is in the proper state such that at the following time period, TP1, the ENP command may be carried out causing a transfer from the program counter 117 to the data output multiplex 104.

Once flip-flop FF907 is set, it will remain set until one of the reset conditions occurs. As shown at the input circuit to AND gate A903, one of two input conditions must occur to reset flip-flop FF907. The first condition is the removal of timing period signal $\overline{\text{TP7}}$, that is at the setting of timing counter flip-flop $\overline{\text{TP7}}$. Similarly, the flip-flop FF907 is reset by removal of the $\overline{\text{HALT}}$ signal which signal removal is caused when the HALT signal is generated by the timing counter.

When the central data processor of the illustrative embodiment of the invention is inactive, it may be desired to enable data from the Program Counter 117 to the data output multiplex 104. This is useful for various test and loading operations performed by the I/O control module of the invention described in the aforementioned patent application, Ser. No. 527,322, of H. B. Marx, for "Input/Output Control System for Electronic Computers," and assigned to the assignee of the present invention. For this purpose the AND gate A909 is provided. AND gate A909 is enabled by a signal generated from the HALT timing period plus the presence of the signal ENPDOM from the I/O control module. Upon the signal HIC and the presence of the signal ENPDOM at AND gate A909, an output is provided to the OR gate O908 which causes the subcommand ENP to be generated. Responsive to this ENP subcommand, the Program Counter 117 empties its contents into the data output multiplex 104, for transmission to the I/O module.

A description of the commands which the programmer can employ and of their variations which may be formed by the various combinations as taught by the hereinabove listed equations follows.

In each of these instructions to ascertain which bits are meant, for example, in discussing the variant, please refer to FIGS. 2A, 2B, 2C and 2D, the instruction word format, and it will be appreciated that, for example, the R field is the ninth bit, and the V field is the tenth bit of the instruction word. A list of symbol definitions at the end of this section will be helpful in facilitating understanding.

INSTRUCTIONS

*ADD (30)—Add*

Add the contents of the memory location specified by the effective address of this instruction to the contents of the specified register (A or C). If overflow occurs, set the overflow error indicator (OVA or OVC). The addition may be algebraic or logical (magnitude only) depending on the condition of the variant (V) bit. If the magnitude of the result is zero, the sign bit is *always* positive.

VARIATIONS

| Description | Variation bits | |
|---|---|---|
| | R | V |
| Add to the A register | 0 | 0 |
| Add to the C register | 1 | 0 |
| Add to A magnitude | 0 | 1 |
| Add to C magnitude | 1 | 1 |

*ADL (10)—Add Literal*

Add the address field L[1] of the effective address of this instruction to the contents of the specified register (A or C). If overflow occurs, set the overflow error indicator (OVA or OVC). The addition may be algebraic or logical depending on the condition of the variant (V) bit. If the magnitude of the result is zero, the sign bit is *always* positive.

VARIATIONS

| Description | Variation bits | |
|---|---|---|
| | R | V |
| Add to A literal | 0 | 0 |
| Add to C literal | 1 | 0 |
| Add to A literal magnitude | 0 | 1 |
| Add to C literal mganitude | 1 | 1 |

*ADS (70)—Add and store*

Add the contents of the memory location specified by the effective address of this instruction to the contents of the specified register (A or C) and store the sum in the effective address. The sum remains in the specified register. If overflow occurs, set the overflow error indicator (OVA or OVC). The addition may be algebraic or logical, depending on the condition of the variant (V) bit. If the magnitude of the result is zero, the sign bit is *always* positive.

[1] Only the twelve bits of L are added to the contents of the specified register. Bits $\phi$–11 are zeros.

VARIATIONS

| Description | Variation bits | |
|---|---|---|
| | R | V |
| Add to A and store | 0 | 0 |
| Add to C and store | 1 | 0 |
| Add to A magnitude and store | 0 | 1 |
| Add to C magnitude and store | 1 | 1 |

*BCM (27)—Branch on contents of memory*

Load the P register and the module selection register(s) or the module selection register(s) only, from the memory location specified by the effective address of this instruction. The P register is loaded from $(Y)_{9-23}$; PSR is loaded from $(Y)_{\phi-2}$; and SSR is loaded from $(Y)_{3-5}$.

VARIATIONS

| Description | Variation bits | |
|---|---|---|
| | R | V |
| Load primary selection register | 0 | 1 |
| Load secondary selection register | 1 | 0 |
| Load both selection registers | 1 | 1 |
| Load memory access controls | 0 | 0 |

(Both selection registers and P).

*BCN (03)—Branch conditional*

Transfer program control to the location specified by the effective address of this instruction if the selected condition is met. The four available conditions are determined by the R and V bits of the command word. If the specified condition is not met program control continues in sequence.

VARIATIONS

| Description | Variation bits | |
|---|---|---|
| | R | V |
| Branch on IJC set (IJC reset) | 0 | 0 |
| Branch on IJC reset (IJC reset) | 0 | 1 |
| Branch on EJC set (EJC reset) | 1 | 0 |
| Branch on program control ?1 set (PC1) | 1 | 1 |

*BTS (61)—Block test for equal*

Test the contents of each location within a block of consecutive memory locations for equality with the contents of the specified register (A or C). If equality exists, the IJC is set, the 15-bit address of the block location satisfying the equality is stored in (PX) and $(PX)_8$ is set. If equality does not exist between the contents of the specified register and a block location, the IJC is reset and the contents of PX remain undisturbed. The address of the lower limit of the block is specified by the effective address of this instruction. The address of the upper limit of the block is specified by the contents of XR0. The test may be algebraic or logical as specified by the variant (V) bit.

VARIATIONS

| Description | Variation bits | |
|---|---|---|
| | R | V |
| Block test A equal | 0 | 0 |
| Block test C equal | 1 | 0 |
| Block test A equal magnitude | 0 | 1 |
| Block test C equal magnitude | 1 | 1 |

*BTG (65)—Block test for register greater than memory*

Test the contents of the specified register (A or C) with the contents of each location within a block of consecutive memory locations. If the register is greater than the content of a location within the block, the IJC is set, the 15-bit address of the block location is stored in (PX), and $(PX)_8$ is set. The test is terminated when the condition is satisfied. If the condition is not true for any block address, the IJC is reset and (PX) remains undisturbed. The address of the lower limit of the block is specified by the effective address of this instruction. The upper limit address of the block is specified by the contents of XR0. The test may be algebraic or logical as specified by the variant (V) bit.

VARIATIONS

| Description | Variation bits | |
|---|---|---|
| | R | V |
| Block test A greater than | 0 | 0 |
| Block test C greater than | 1 | 1 |
| Block test A greater than magnitude | 0 | 1 |
| Block test C greater than magnitude | 1 | 1 |

*BTL (64)—Block test for register less than memory*

Test the contents of the specified register (A or C) with the contents of each location within a block of consecutive memory locations. If the register is less than the content of a location within the block, the IJC is set, the 15-bit address of the block location satisfying the condition is stored in (PX), and $(PX)_8$ is set. The test is terminated when the condition is satisfied. If the condition is not met, the IJC is reset, and (PX) remains undisturbed. The address of the lower limit of the block is specified by the effective address of this instruction. The upper limit address of the block is specified by the contents of XR0. The test may be algebraic or logical as specified by the variant (V) bit.

VARIATIONS

| Description | Variation bits | |
|---|---|---|
| | R | V |
| Block test A less than | 0 | 0 |
| Block test C less than | 1 | 0 |
| Block test A less than magnitude | 0 | 1 |
| Block test C less than magnitude | 1 | 1 |

*BUN (02)—Branch unconditional*

Transfer program control to the location specified by the effective address of this instruction. The transfer may be a 15-bit transfer if indirect addressing has been specified or if indexing has been specified and $(PX)_8=1$. In the latter case the three most significant bits are the MV bits of the primary index register.

*DIV (32)—Divide*

The divide instruction has two operations: single length dividend and double length dividend. For the former the contents of the A register are divided by the contents of the effective address of this instruction. The quotient replaces (C) and the remainder replaces (A). For double length dividend, the $(A)_{\phi-23}$ and $(C)_{1-23}$ are treated as a single signed 46-bit register (the sign of C is ignored). The content of this signed 46-bit register is divided by the content of the effective address of this instruction. The quotient replaces the (C) and the remainder replaces the (A). In both options the sign of the remainder contains the sign of the dividend. The sign of the quotient is always the proper algebraic sign. If $(Y)_{1-23} \leqslant (A)_{1-23}$ the division will not be inhibited, however, the overflow error indicator (OVC) will be set.

VARIATIONS

| Description: | Variation bit, V |
|---|---|
| Divide A | 0 |
| Divide both | 1 |

*DPA (72)—Double precision addition*

Add the double precision number specified by the effective address of this instruction to the A and C registers. The algorithm adds $(C)_{\phi-23}$ to $(Y)_{\phi-23}$ and $(A)_{1-23}$ to $(Y+1)_{2-23}$. The most significant half of the addition is contained in the A register and the least significant half is contained in the C register. The dominant sign in the double precision addition is always associated with the least significant half of the two addends. The sign bits of the most significant half of each operand have no effect on the result of the double precision operation. If the addition results in an overflow the overflow error indicator (OVA) will be set. The double precision addition operation has the option of being either algebraic or logical. The option is specified by the variant (V) bit in the command word.

VARIATIONS

| Description: | Variation bit, V |
|---|---|
| Double precision add algebraic | 0 |
| Double precision add magnitude | 0 |

*DPS (73)—Double precision subtract*

Subtract the double precision number specified by the effective address of this instruction from the contents of the A and C registers. The algorithm subtracts $(Y)_{\phi-23}$ from $(C)_{\phi-23}$ and $(Y+1)_{1-23}$ from $(A)_{1-23}$. The most significant half of the difference is contained in the A register and the least significant half is contained in the C register. The dominant sign in the double precision subtraction is associated with the least significant half of the subtrahend and minuend. The sign bit of the most significant half of both operands has no effect on the result of operation. If the subtraction results in an overflow, the overflow error indicator (OVA) will be set. The algebraic or logical option exists in this command and is specified by the variant (V) bit.

VARIATIONS

| Description: | Variation bit, V |
|---|---|
| Double precision subtract algebraic | 0 |
| Double precision subtract magnitude | 1 |

*LCA (76)—Load C and A registers*

Load the C and A registers (double precision) with the contents of the effective address and the contents of the effective address plus one, respective. Thus $(Y)_{\phi-23}$ is loaded into $(C)_{\phi-23}$ and (Y+1) is loaded into $(A)_{\phi-23}$.

*LDR (36)—Load register*

Load the specified register with the contents of the effective address of this instruction. The register affected may be the A or C register as specified by the register (R) bit in the command word.

VARIATIONS

| Description | Variation bits | |
|---|---|---|
| | R | V |
| Load A register | 0 | 0 |
| Load C register | 1 | 0 |
| Load complement of memory to A | 0 | 1 |
| Load complement of memory to C | 1 | 1 |

*LSP (67)—Load and store P counter*

This command loads P (program counter) with the contents of the effective address of this instruction and stores P in the primary index register. There are several command options available which are listed as follows:

VARIATIONS

| Description | Variation bits | |
|---|---|---|
| | R | V |
| Load and store P | 0 | 0 |
| Load P and store access controls | 0 | 1 |
| Load access controls and store P | 1 | 0 |
| Load and store memory access controls | 1 | 1 |

*LXL (37)—Load index location register*

Load the XL register with $(Y)_{9-21}$. The 13 bits loaded into the XL register constitute the 13 most significant bits of the first index register (XR0) address in an active index register set. The two least significant bits are determined by the PX field in commands employing indexing. The address of XR0 must *always* have zeros in the two least significant bits.

*MDT (77)—Memory data transfer*

Transfer the contents of the primary index register to the effective address specified by this instruction or transfer the contents of the effective address to the primary index register. The option is specified by the variant (V) bit.

VARIATIONS

| Description: | Variation bit, V |
|---|---|
| Load specified index register | 1 |
| Store specified index register | 0 |

*MUL (33)—Multiply*

Multiply the contents of the C register by the contents of the effective address of this instruction. The sign and most significant half of the product replace (A) and the sign and least significant half of the product replace (C). The options exist to round: if $(C)_1=1$, add a "1" to the magnitude of A; or, to add the A register contents (prior to multiplication) to the least significant half of the product. The latter option will not result in an overflow.

VARIATIONS

| Dexcription | Variation bits R | V |
|---|---|---|
| Multiply | 0 | 0 |
| Multiply and round | 0 | 1 |
| Multiply and add A | 1 | 0 |
| Multiply, add A and round | 1 | 1 |

*NMR (53)—Normalize register*

Normalize the specified register (A and/or C), that is, shift the specified register left until the *most significant bit* in the specified register is equal to "1" if the normalize is algebraic; or until the *sign bit* of the specified register is equal to "1" if the normalize is logical. The number of shifts necessary to normalize the contents of the A and/or C register(s) is stored in PX. If a maximum shift is implemented ($64_{10}$) and normalizing is unsuccessful, that is, the register(s) equal zero, the overflow error indicator for that register will be set. Bit field $(Y)_{13-23}$ is the counter for the number of shifts in the normalizing instruction. The counter has a limit which bounds the number of shifts in the normalize operation. Therefore, if $(Y)_{18-23}$ equals 60 in a machine language instruction the operation will shift a maximum of three times if normalizing is unsuccessful and the overflow indicator will be set. In assembler coding the programmer specifies the limit in the address field, the assembler complements the field, and the counter begins incrementing until it either normalizes or the counter reaches $63_{10}$.

VARIATIONS

| Description | Variation bits R | V | F14 |
|---|---|---|---|
| Normalize A | 0 | 1 | 0 |
| Normalize C | 1 | 0 | 0 |
| Normalize both | 1 | 1 | 0 |
| Normalize A logical | 0 | 1 | 1 |
| Normalize C logical | 1 | 0 | 1 |
| Normalize both logical | 1 | 1 | 1 |

*RRB (35)—Reset register bits*

Reset each bit in the specified register (A or C) for which the corresponding bit of (Y) is set. The remaining bits in the register will be undisturbed (extract). The variant (V) bit provides an additional option which resets each bit of the specified register for which the corresponding bit of (Y) is reset. The remaining bits in the register will be unchanged (logical "AND").

VARIATIONS

| Description | Variation bits R | V |
|---|---|---|
| Reset A bits | 0 | 0 |
| Reset C bits | 1 | 0 |
| AND to A | 0 | 1 |
| AND to C | 1 | 1 |

*RRL (15)—Reset register bits literal*

This command resets each bit in the specified register (A or C) for which the corresponding bit in the L field of the effective address is set (extract). The variant (V) bit provides the option to reset each bit in the register for which the corresponding bits in L are reset (logical "AND"). The $(R)_{6-11}$ will always be reset in the AND operation and will remain undisturbed in the reset operation.

VARIATIONS

| Description | Variation bits R | V |
|---|---|---|
| Reset A bits literal | 0 | 0 |
| Reset C bits literal | 1 | 0 |
| AND to A literal | 0 | 1 |
| AND to C literal | 1 | 1 |

*RRS (75)—Reset register bits and store*

Reset each bit in the specified register (A or C) for which the corresponding bit of (Y) is set (extract) and store the result in the effective address. The variant (V) bit provides the option to reset each bit in the specified register for which the corresponding bit of (Y) is reset (logical "AND") and store the result in the memory location specified by the effective address.

VARIATIONS

| Description | Variation bits R | V |
|---|---|---|
| AND to A and store | 0 | 1 |
| AND to C and store | 1 | 1 |
| Reset A bits and store | 0 | 0 |
| Reset C bits and store | 1 | 0 |

*RSR (13)—Reset and/or shift register*

This command shifts the A register, C register, or both registers, left or right, end-around or end-off, algebraically or logically. The R and V bits specify the register(s) to be shifted; $Y_{1-6}$ specifies the shift options; and $Y_{7-12}$ specifies the number of shifts. The operations are specified in the following manner:

| R | V | Description |
|---|---|---|
| 0 | 0 | No shift. |
| 0 | 1 | Shift A only. |
| 1 | 0 | Shift C only. |
| 1 | 1 | Shift both A and C. |

| $Y_1$ | $Y_2$ | Function |
|---|---|---|
| 0 | 0 | No reset. |
| 0 | 1 | Reset C register. |
| 1 | 0 | Reset A register. |
| 1 | 1 | Reset both A and C registers. |

| $Y_3$ | $Y_4$ | $Y_5$ | Function |
|---|---|---|---|
| 0 | 0 | 0 | Algebraic right shift. |
| 1 | 0 | 0 | Logical right shift. |
| 0 | 0 | 1 | Algebraic left shift. |
| 1 | 0 | 1 | Logical left shift. |
| 1 | 1 | 1 | Circular left shift (logical). |

Therefore $Y_1$ and $Y_2$ specify the register(s) to be shifted; $Y_3$ specifies a logical or algebraic shift; $Y_4$ specifies an end-around or end-off shift; $Y_5$ specifies a left or right shift; $Y_6$ is not used; and $Y_{7-12}$ specifies the number of shifts. Note that circular shifts must be logical left shifts.

*SBL (11)—Subtract literal*

Subtract the address field L (Only the twelve bits of L are subtracted from the specified register. Bits ϕ–11 are zeros.) of the effective address of this instruction from the contents of the specified register (A or C). If overflow occurs, set the register overflow error indicator. The subtraction may be algebraic or logical depending on the condition of the variant (V) bit. If the magnitude of the result is zero, the sign bit is *always* positive.

VARIATIONS

| Description | Variation bits | |
|---|---|---|
| | R | V |
| Subtract from A literal | 0 | 0 |
| Subtract from C literal | 1 | 0 |
| Subtract from A literal magnitude | 0 | 1 |
| Subtract from C literal magnitude | 1 | 1 |

*SBS (71)—Subtract and store*

Subtract the contents of the memory location specified by the effective address of this instruction from the contents of the specified register (A or C) and store the difference in the effective address. If overflow occurs set the register overflow error indicator. The subtraction may be algebraic or logical depending on the condition of the variant (V) bit. If the magnitude of the result is zero the sign bit is *always* positive.

VARIATIONS

| Description | Variation bits | |
|---|---|---|
| | R | V |
| Subtract from A and store | 0 | 0 |
| Subtract from C and store | 1 | 0 |
| Subtract from A magnitude and store | 0 | 1 |
| Subtract from C magnitude and store | 1 | 1 |

*SCA (55)—Store the C and A registers*

Store (double precision) the C register in the memory location specified by the effective address and the A register in the memory location one greater than that specified by the effective address. Thus, $(A)_{\phi-23}$ is stored in $(Y+1)_{\phi-23}$ and $(C)_{\phi-23}$ is stored in $(Y)_{\phi-23}$.

*SRB (34)—Set register bits*

Set each bit in the specified register (A or C) for which the corresponding bit in (Y) is set. The remaining bits in the specified register remain unchanged (inclusive "OR"). The variant (V) bit provides the option of complementing each bit in the specified register for which the corresponding bit in (Y) is set. The remaining bits in the register are unaltered (exclusive "OR").

VARIATIONS

| Description | Variation bits | |
|---|---|---|
| | R | V |
| Set A bits | 0 | 0 |
| Set C bits | 1 | 0 |
| Exclusive OR to A | 0 | 1 |
| Exclusive OR to C | 1 | 1 |

*SRL (14)—Set register bits literal*

This command sets each bit in the specified register for which the corresponding bit in the L field of the effective address is set (inclusive "OR"). The remaining bits of the register are unchanged, including $(R)_{\phi-11}$. The variant (V) bit provides the option of complementing each bit in the register for which the corresponding bit in the L field of the effective address is set (exclusive "OR"). The remaining register bits, including $(R)_{\phi-11}$, are unchanged.

VARIATIONS

| Description | Variation bits | |
|---|---|---|
| | R | V |
| Set A bits literal | 0 | 0 |
| Set C bits literal | 1 | 0 |
| Exclusive OR to A literal | 0 | 1 |
| Exclusive OR to C literal | 1 | 1 |

*SRS (74)—Set register bits and store*

Set each bit of the specified register for which the corresponding bit in (Y) is set and store the result in the effective address. The remaining bits of R are unchanged (inclusive "OR"). The variant (V) bit provides the option of complementing each bit in the register for which the corresponding bit in (Y) is set and storing the result in the effective address. The remaining bits of R will be unchanged (exclusive "OR").

VARIATIONS

| Description | Variation bits | |
|---|---|---|
| | R | V |
| Set A bits and store | 0 | 0 |
| Set C bits and store | 1 | 0 |
| Exclusive OR to A and store | 0 | 1 |
| Exclusive OR to C and store | 1 | 1 |

*STP (41)—Store P count and memory access controls*

Store the P count, the PSR, and the SSR into the memory location specified by the effective address of the instruction. The P count is stored in $(Y)_{9-23}$, the PSR is stored in $(Y)_{\phi-2}$, and the SSR is stored in $(Y)_{3-5}$.

*STR (45)—Store register*

Store the contents of the specified register A or C in the memory location specified by the effective address of this instruction.

VARIATIONS

| Description | Variation bits | |
|---|---|---|
| | R | V |
| Store A | 0 | 0 |
| Store C | 1 | 0 |
| Store zero | 0 | 1 |

*SUB (31)—Subtract*

Subtract the contents of the memory location specified by the effective address of this instruction from the contents of the specified register. If overflow occurs, the register overflow error indicator will be set. The subtraction may be algebraic or logical depending on the condition of variant (V) bit. If the magnitude of the difference is zero, the sign bit will *always* be positive.

VARIATIONS

| Description | Variation bits | |
|---|---|---|
| | R | V |
| Subtract from A | 0 | 0 |
| Subtract fromC | 1 | 0 |
| Subtract from A magnitude | 0 | 1 00 |
| Subtract from C magnitude | 1 | 0 |

*SXL (40)—Store XL register*

Store the XL register contents in the memory location specified by the effective address of this instruction $(Y)_{9-21}$; $Y_{22,23}$ are reset.

*TEQ (21)—Test for equal*

Test the specified register (A or C) for equality with the contents of the memory location specified by the effective address of this instruction. If the specified register and memory contents are equal, the IJC is set. The test may be algebraic or logical as specified by the variant (V) bit.

VARIATIONS

| Description | Variation bits | |
|---|---|---|
| | R | V |
| Test A equal | 0 | 0 |
| Test C equal | 1 | 0 |
| Test A equal magnitude | 0 | 1 |
| Test C equal magnitude | 1 | 1 |

*TGT (25)—Test for register greater than memory*

Test the specified register (A or C) for a value greater than the contents of the memory location specified by the effective address of this instruction. If the inequality is true, set the IJC. The test may be algebraic or logical as specified by the variant (V) bit.

VARIATIONS

| Description | Variation bits | |
|---|---|---|
| | R | V |
| Test A greater than | 0 | 0 |
| Test C greater than | 1 | 0 |
| Test A greater than magnitude | 0 | 1 |
| Test C greater than magnitude | 1 | 1 |

*TLE (01) Test literal equal*

Test the L field of the effective address of this instruction for equality with the specified register. If the equality is satisfied the IJC will be set. The test may be algebraic or logical depending on the condition of the variant (V) bit. The 12 least significant bits of the last memory fetch comprise the literal.

Note.—If $(R)_{\phi-11}$ does not equal zero the condition will never be satisfied.

VARIATIONS

| Description | Variation bits | |
|---|---|---|
| | R | V |
| Test A equal literal | 0 | 0 |
| Test C equal literal | 1 | 0 |
| Test A equal literal magnitude | 0 | 1 |
| Test C equal literal magnitude | 1 | 1 |

*TLL (04)—Test register for less than literal*

Test the specified register (A or C) for a value less than L field of the effective address of this instruction. If the inequality condition is met, the IJC will be set. The test may be algebraic or logical depending on the condition of the variant (V) bit.

Note.—If the specified register is negative in an algebraic test, the condition will always be true. Also, if $(R)_{1-11}$ does not equal zero in a magnitude test the condition will never be satisfied.

VARIATIONS

| Description | Variation bits | |
|---|---|---|
| | R | V |
| Test A less than literal | 0 | 0 |
| Test C less than literal | 1 | 0 |
| Test A less than literal magnitude | 0 | 1 |
| Test C less than literal magnitude | 1 | 1 |

*TLG (05)—Test register greater than literal*

Test the specified register (A or C) for a value greater than the L field of the effective address of this instruction. If the inequality condition is true, the IJC will be set. The variant V bit provides the option of either an algebraic or logical test.

Note.—If (R) is negative, the test condition will never be true for algebraic tests. Also, if $(R)_{1-11}$ does not equal zero in a magnitude test the test condition will always be true.

VARIATIONS

| Description | Variation bits | |
|---|---|---|
| | R | V |
| Test A greater than literal | 0 | 0 |
| Test C greater than literal | 1 | 0 |
| Test A greater than magnitude | 0 | 1 |
| Test C greater than magnitude | 1 | 1 |

*TLT (24)—Test register less than memory*

Test the specified register (A or C) for a value less than the contents of the memory location specified by the effective address of this instruction. If the inequality is true, the IJC is set. The variant (V) bit provides the option of either an algebraic or logical test.

VARIATIONS

| Description | Variation bits | |
|---|---|---|
| | R | V |
| Test A less than | 0 | 0 |
| Test C less than | 1 | 0 |
| Test A less than magnitude | 0 | 1 |
| Test C less than magnitude | 1 | 1 |

*TMC (16)—Test and/or modify controls*

This command is used to set, test, and reset the error controls, the internal and external jump controls, and/or the program control flags. The operation is specified by the R and V bits of the command word and the controls operated on are selected by $(Y)_{12-23}$.

| Operation | | | Function |
|---|---|---|---|
| R | V | $Y_{12}$ | |
| 0 | 0 | -------- | Test specified control(s) and set IJC if the test condition is true. (Testing IJC itself is not available.) |
| 1 | 0 | -------- | Set specified control(s). |
| 0 | 1 | -------- | Test and reset specified control(s). If the test condition is true IJC will be set. |
| 1 | 1 | -------- | Reset specified control(s). |
| 0 | 1 | 1 | Reset IJC before test and reset of the specified controls. |

The controls operated on are specified by $(Y)_{12-23}$ and are as follows:

$(Y)_{12}=1$—Internal jump control (IJC)
$(Y)_{13}=1$—External jump control (EJC)—may be set by external condition in I/O
$(Y)_{14}=1$—Overflow error indicator A (OVA)
$(Y)_{15}=1$—Overflow error indicator C (OVC)
$(Y)_{16}=1$—Data parity error (DPE)
$(Y)_{17}=1$—Command parity error (CPE)
$(Y)_{18}=1$—Input parity error (IPE)
$(Y)_{19}=1$—Program control 1 (PC1)
$(Y)_{20}=1$—Program control 2 (PC2)
$(Y)_{21}=1$—Program control 3 (PC3)
$(Y)_{22}=1$—Program control 4 (PC4)
$(Y)_{23}=1$—Program control 5 (PC5)

*TMX (63)—Test or modify index*

This command operates on the index value XV field of the primary index register PX. The R and V bits provide four options:

| R | V | Function | Description |
|---|---|---|---|
| 0 | 0 | Replace XV by $XV+Y_{12-23}$; $(PX)_{\phi-11}$ are unchanged. | Add to X. |
| 0 | 1 | Replace XV by $Y_{12-23}$; (PX)=0 | Set X. |
| 1 | 0 | If $(XV)<Y_{12-23}$, set IJC and increment XV by one; $(PX)_{\phi-11}$ are unchanged. | Test X less than. |
| 1 | 1 | If $(XV)>Y_{12-23}$, set IJC and decrement XV by one. $(PX)_{\phi-11}$ are unchanged. | Test X greater than. |

*TRR (12)—Test or transfer register*

This instruction tests the specified register(s) for ones or zeros, transfers registers, complements the specified register(s), resets the specified register(s), or adds the overflow to the specified register. Combinations of these options exist and are determined by the effective address of this instruction. The following table illustrates the command options for $V=0$ (test and transfer register):

| R | | | Action |
|---|---|---|---|
| 0 | | | A register is source. |
| 1 | | | C register is source. |
| $Y_{12}$ | | | |
| 0 | | | C register is receiver. |
| 1 | | | A register is receiver. |
| $Y_{13}$ | $Y_{17}$ | | |
| 1 | 0 | | Test source $(R)_{1-23}=0$ (Set IJC). |
| 1 | 1 | | Test source $(R)_{1-23}=1$ (Set IJC). |
| $Y_{14}$ | $Y_{17}$ | | |
| 1 | 0 | | Test source $(R)_{\phi}=0$ (Set IJC). |
| 1 | 1 | | Test source $(R)_{\phi}=1$ (Set IJC). |
| $Y_{12}$ | $Y_{14}$ | $Y_{17}$ | |
| 1 | 1 | 1 | Test source $(R)_{\phi-23}=1$ (Set IJC). |
| 1 | 1 | 0 | Test source $(R)_{\phi-23}=0$ (Set IJC). |

Combinations of bits $Y_{13,\ 14,\ 17}$ allow tests of the while register (sign and magnitude of the specified register). $Y_{15}=1$ indicates an operation on the register and $Y_{16}=1$ indicates an operation on the sign.

| $Y_{15}$ | $Y_{17}$ | $Y_{18}$ | Action |
|---|---|---|---|
| 1 | 0 | 0 | No action |
| 1 | 0 | 1 | Transfer source to receiver |
| 1 | 1 | 0 | Transfer OV plus source to receiver. If A is the source, transfer OVC. If C is the source, transfer OVA. |
| 1 | 1 | 1 | Transfer source to receiver |
| $Y_{16}$ | $Y_{17}$ | $Y_{18}$ | |
| 1 | 0 | 0 | Reset receiver $(R)_{\phi}$ |
| 1 | 0 | 1 | Transfer source to receiver $\phi$ |
| 1 | 1 | 0 | Set receiver $(R)_{\phi}$ |
| 1 | 1 | 1 | Transfer $\text{source}_{\phi}$ to $\text{receiver}_{\phi}$ |

If $V=1$ test the "OR" of the source register and the literal for all ones. If the condition is true the IJC is set.

*CDT (06)—Control descriptor transfer*

Transfer the descriptor specified by the L field of the effective address of this instruction to the specified I/O channel. The R and V bits of the command word select the channel. The EJC will be set and the descriptor transfer inhibited if the descriptor references certain channels which are busy.

*TDO (22)—Transfer data out*

Transfer the contents of the effective address specified by this command to the I/O channel specified by the R and V bits. If the specified channel is "busy" when the command is executed, data transfer is inhibited and the EJC is set.

*TIM (66)—Transfer input to memory*

Transfer the data from the specified I/O channel to the effective address specified by this instruction. If the specified channel is busy, or no data is available when the command is executed, the contents of the effective address remain unchanged and the EJC is set. The channel is selected by the R and V bits of the command word.

*TIR (26)—Transfer input to register*

Transfer the data from the specified I/O channel to the specified register (A or C). If the specified channel is busy or no data is available when the command is executed, the specific register is unchanged and the EJC is set. The channel is selected by the R and V bits of the command word. The register is selected by $Y_{12}$.

$Y_{12}=1$—Transfer input to A register
$Y_{12}=0$—Transfer input to C register

*TRO (07)—Tranfser register out*

Transfer the contents of the specified register (A or C) to the specific I/O channel. If the specified channel is busy when the command is executed, the data transfer is inhibited and the EJC is set. The register is specified by $Y_{12}$. The channel is selected by the R and V bits of the command word.

$Y_{12}=1$—Transfer A register out
$Y_{12}=0$—Transfer C register out

SYMBOL DEFINITIONS

A—A Register
C—C Register
CM—Command
EJC—External jump control
F—Address field register
I—Indirect address control bit
IJC—Internal jump control
L—Address field of command word
1*sb*—Least significant bit(s)
M—Module selection bit
*msb*—Most significant bit(s)
OVA—Overflow A register
OVC—Overflow C register
P—P register (program counter)
PM—Primary module
PSR—Primary selection register
PX—Primary index register
R—Register control bit
Reset—Place 0's in element (bit, register)
Set—Place 1's in element (bit, register)
SM—Secondary module
SSR—Secondary selection register
SX—Secondary index register
TX—Tertiary index register
V—Variant bit of command word
XL—Index location register
XR—Index register
XRO—Index register 0
XR1—Index register 1
XR2—Index register 2
XR3—Index register 3
XV—Index value
Y—Effective address
( )—Contents of entire element contained within parenthesis
$(\ )_{i-j}$—Same as above but restricted the contents of elements i through j
=, <, >—Normal algebraic equality and inequalities While a specific embodiment to the invention has been shown and described, it should be recognized that the invention should not be limited thereto. It is accordingly intended in the appended claims to claim all such variations as fall within the true spirit of the invention.

What is claimed is:

1. In apparatus comprising a data processor and a plurality of memory divisions, said data processor comprising:

(a) means responsive to a single bit of an instruction word to specify a particular one of said plurality of memory divisions to be accessed, said means comprising (b) a primary and a secondary selection register at least one of which is capable of holding a count equal in a preselected numbering system to the total number of memory divisions, (c) means for loading a count into at least one of said selection registers under program control, (d) an address field register the contents of which determine the memory division to be accessed, and (e) means selectively to place the contents of said primary or secondary selection register into predetermined bit positions of said address field register responsive to said instruction word bit to identify the selected memory division.

2. The data processor of claim 1, additionally including:

(a) indexing means, (b) indirect addressing means, and (c) means associated with said indexing and indirect addressing means whereby one of two memory divisions is selected by a single bit of the command word and one of the additional memory divisions is selected by one of said indexing and said indirect addressing means, (d) said indexing means and indirect addressing means comprising means to substitute predetermined bits in index words and in indirect address words for those obtained from one of the selection registers to identify the memory division to be accessed.

3. In a system comprising a memory divided into a plurality of memory divisions, at least one data processor comprising the arithmetic and program execution unit of said system, and means for providing intercommunication within the system, the improvement comprising:

(a) a plurality of memory selection registers responsive to a portion of a command word, said portion being less than the number of bits required to count said memory divisions, each for enabling access to a selected one of said plurality of memory divisions, (b) at least one of said selection registers being capable of containing a count in a predetermined numbering system equal to the total number of memory divisions which can be addressed thereby, and (c) means responsive to program control to set a count in at least one of the selection registers to preselect one of the memory divisions to be addressed.

4. The improvement recited in claim 3, wherein the memory selection registers are program settable registers, each is capable of containing a count equal to the total number of memory divisions which can be addressed thereby, and said registers are independently gated by said portion of different command words for addressing different ones of said memory divisions.

5. In a computer system comprising a central data processor unit and a plurality of functionally similar memory units, said central data processor unit comprising data transfer, arithmetic, and memory addressing apparatus, the improvement comprising:

(a) means responsive to command words to decode the command words, to provide addresses to and from which data words are to be transferred, and to provide control and timing to execute said commands.

(b) said means to decode and effect control and timing comprising a plurality of program loadable selection registers each capable of identifying a selectable one of said memory units such that a number of bits comprising at least one bit in a command word may be utilized to specify a memory unit to be addressed, and said plurality of memory units includes a larger number of units than could be specified by all of the possible combinations of said bits.

6. The improvement recited in claim 5 wherein (a) each selection register of said plurality of selection registers includes a greater number of bit positions than the number of bit positions in the command word from which selection is made, (b) an address field register means to provide a number of bits corresponding to an address within one of said memory units, and (c) means to append in said address field register the contents of one of said selection registers to address field bits identifying a memory unit location to thereby form the total address to specify the unit and location in memory which is to be addressed.

7. In the apparatus of claim 5, said command decoding and control and timing means further comprising (a) means to provide information comprising addresses of data, of program and of index words located in memory units external of said data processor unit.

(b) at least one register to hold a memory address word, and (c) means for saving time by transferring address data fed to said address information holding register from its input circuit directly to said memory address means, bypassing transmission through said last-named register such that said information is applied to said memory address means before it appears in the output of said last-named register.

8. The combination of claim 7 wherein said information holding register comprises, (a) a plurality of bistable elements, (b) logic circuitry connected in the input circuit of said bistable elements, (c) said time-saving means comprising at least one feedback path from the output of each of said bistable elements of said information holding register such that the feedback path maintains said information holding register in a given state, and (d) said time-saving means further comprising output means coupled to the input circuit of said information holding register such that said last-named output means provides data to said memory address means one clock time before said data is fed to said holding register.

9. In the combination of claim 8, said data processor unit further comprising (a) a program counter, and (b) means to load said program counter selectively from either said data transfer apparatus or from said arithmetic apparatus, (c) said program counter comprising circuitry equivalent to that of said memory address register and effective as a second operation time-saving means to provide data to said memory address means independently of said holding register.

10. The improvement recited in claim 5, wherein said central data processor unit further comprises:

(a) a data input register, (b) data transfer means being coupled to the data input register and to the selection registers for transferring information therebetween, (c) said data transfer means being responsive to a pair of subcommand signals enabling transfer from the data input register to the data transfer means, each of which enables transfer of only a half of the bits of said data input register such that in literal commands only one of said subcommands is enabled, (d) and said data transfer means being responsive to subcommands to enable transfer from each of said selection registers when storing selection registers during a load and store program counter command or a store program counter command.

11. A data processor comprising an arithmetic section and a program execution control section and operable in conjunction with information exchange with external units including an external memory unit, said data processor comprising, (a) data input means responsive to information provided by units external of said data processor, (b) memory address means for identifying a memory unit location to be accessed, (c) a primary and a secondary selection register, each comprising means to hold a partial address designating a particular external unit for data transfer and which combines with memory location information defining an address within the external memory unit in said memory address means to form a full external memory unit address to be accessed, and (d) means to load and to change under program control each of said primary and secondary selection registers from information fed from said data input means.

12. In the combination of claim 11, the improvement further comprising (a) a program counter to indicate the address of the next instruction to be decoded and executed, (b) an address field register to hold an address from which data is to be obtained or in which data is to be stored, and (c) means to bypass timing delay in the circuit of said program counter and said address field register when it is desired to send information to said memory address means which is identical to the information which would otherwise appear in said program counter or said address field register at the next clock time, (d) said primary and secondary selection registers defining a first and a second memory unit each of which may be selected by one bit of a command word.

13. In the apparatus of claim 12, (a) each of said primary and secondary selection registers comprising a multibit register capable of containing a count which is equal to the maximum number of memory units which can be serviced thereby, (b) means responsive to load and store program, branch on contents of memory and store program counter commands to load each of the said primary and secondary selection registers with new contents and store the present contents in memory, (c) means responsive to a memory module select bit of the command word to specify that either the primary selection register or the secondary selection register forms a predetermined number and position of bits identifying the memory unit selected as a portion of the word in said address field register, (d) the remaining portion of said address field register containing the address of an instruction within the memory unit selected, and (e) means for selectively inserting the contents of said primary and said secondary register into said address field register to form said predetermined number and position of the bits therein.

14. The apparatus of claim 12 including (a) indexing means to select at least one predetermined memory out of the total number of memories provided, (b) said indexing means comprising means responsive to a predetermined bit of an index word to insert other predetermined bits of the index word into a predetermined section of said address field register to replace the value previously obtained from the said primary selection register or from said secondary selection register.

15. The apparatus of claim 12, further comprising (a) an operation register responsive to a portion of the information fed to the data input register which comprises a command portion and modifications to the command, (b) said timing and control means comprising a counter having a plurality of flip-flips connected in ring counter arrangement with attendant control circuitry, (c) means responsive to the timing flip-flops to perform command execution cycle functions, (d) at least one start timing flip-flop to operate during the first fetch cycle following a halt condition, (e) a halt flip-flop, (f) said operation register controlling jumps in the sequence of said timing counter, (g) said timing counter timing sequence being divided into a command execution phase and a phase for fetching new instructions and placing them in said data input register and said operation register, each fetch phase occurring during a portion of the preceding command execution phase, and (h) said starting period timing flip-flop comprising circuitry such that no portion of the execution of a command may occur during the starting period to insure that no operation upon data in the operation register will occur before legitimate data is placed therein to eliminate any necessity for the programmer to take special precautions upon stopping and starting.

16. The apparatus of claim 15, further comprising, (a) timing and control apparatus comprising index timing flip-flops and indirect address control flip-flops intercoupled to provide index cycles after indirect addressing in accordance with the setting of predetermined bits of said data input register by an indirectly-addressed word when indexing is allowed for the instruction being executed.

17. The apparatus of claim 11, further comprising, (a) an OR gate having its output connected into the data inputs of each stage of said address field register, (b) means to transfer signals bypassing said address field register connected from the output of said OR gate to said memory address means whereby lookahead may be provided by presenting the output of said OR gate to said memory address means a time period before presentation would otherwise occur from the output of said register, and (c) a plurality of AND gates connected into the input of said OR gate and being responsive to data input and to subcommand input.

18. The combination of claim 15, wherein the timing and control apparatus further comprises serially connected index timing flip-flops and indirect address control flip-flops and means responsive to one of said index timing flip-flops to initiate at least one additional index cycle, said additional index cycle initiating means being disabled before indexing is next commanded in the apparatus.

19. The combination of claim 15, wherein the timing and control apparatus further comprises serially connected index timing flip-flops and indirect address control flip-flops, means responsive to an output of one of said index timing flip-flops and to an output of one of said indirect address control flip-flops for commencing execution of a command and means causing a halt whenever more than one timing flip-flop is in the set state at the same time.

20. The improvement recited in claim 3, wherein the memory selection registers are program settable registers, at least one of which is capable of containing a count equal to the total number of memory divisions which can be addressed, and said registers are independently gated by said command word portion for addressing different ones of said memory divisions.

References Cited

UNITED STATES PATENTS

| | | | |
|---|---|---|---|
| Re. 26,171 | 3/1967 | Falkoff | 340—172.5 |
| 3,319,226 | 5/1967 | Mott et al. | 340—172.5 |
| 3,317,902 | 5/1967 | Michael | 340—172.5 |
| 3,302,187 | 1/1967 | Voigt | 340—172.5 |
| 3,302,182 | 1/1967 | Lynch et al. | 340—172.5 |
| 3,292,151 | 12/1966 | Barnes et al. | 340—172.5 |
| 3,274,562 | 9/1966 | Strawbridge | 340—172.5 |
| 3,274,554 | 9/1966 | Hopper et al. | 340—172.5 |
| 3,242,467 | 3/1966 | Lamy | 340—172.5 |
| 3,230,513 | 1/1966 | Lewis | 340—172.5 |
| 3,200,380 | 8/1965 | MacDonald | 340—172.5 |

PAUL J. HENON, *Primary Examiner.*

G. D. SHAW, *Assistant Examiner.*